United States Patent
Chang et al.

(10) Patent No.: US 7,429,818 B2
(45) Date of Patent: Sep. 30, 2008

(54) PLASMA LAMP WITH BULB AND LAMP CHAMBER

(75) Inventors: Yian Chang, Hacienda Heights, CA (US); Frederick M. Espiau, Topanga, CA (US)

(73) Assignee: Luxim Corporation, Sunnyvale, CA (US)

( * ) Notice: Subject to any disclaimer, the term of this patent is extended or adjusted under 35 U.S.C. 154(b) by 128 days.

(21) Appl. No.: 10/947,800

(22) Filed: Sep. 23, 2004

(65) Prior Publication Data

US 2005/0057158 A1 Mar. 17, 2005

Related U.S. Application Data

(63) Continuation-in-part of application No. 10/771,788, filed on Feb. 4, 2004, now Pat. No. 7,348,732, which is a continuation of application No. 09/809,718, filed on Mar. 15, 2001, now Pat. No. 6,737,809.

(60) Provisional application No. 60/222,028, filed on Jul. 31, 2000.

(51) Int. Cl.
    *H01J 17/26* (2006.01)

(52) U.S. Cl. ............... 313/231.31; 313/231.01; 313/231.41; 313/231.51

(58) Field of Classification Search ............ 313/231.31, 313/231.01, 231.41, 231.51, 484, 634, 635, 313/110, 113; 315/248, 241 S, 111.51, 111.71
See application file for complete search history.

(56) References Cited

U.S. PATENT DOCUMENTS 3,641,389 A 2/1972 Leidigh (Continued)

FOREIGN PATENT DOCUMENTS

DE 195 32 780 A1 3/1997

(Continued)

OTHER PUBLICATIONS

Counter Statement Under Rule 7(3) In the Matter of: European Patent Application No. 01957305.4 (EP 1307899), In the Name of: Luxim Corporation dated Jan. 21, 2006 And In the Matter of: An Application Under Section 12 and 82 of the Patents Act 1977 and Articles 1 and 3 of the Protocol on Recognition by Cervasion Limited ("Counterstatement").

(Continued)

*Primary Examiner*—Tuyet Vo
(74) *Attorney, Agent, or Firm*—Schwegman, Lundberg & Woessner P.A.

(57) ABSTRACT

A dielectric waveguide integrated plasma lamp (DWIPL) with a body comprising at least one dielectric material having a dielectric constant greater than approximately 2, and having a shape and dimensions such that the body resonates in at least one resonant mode when microwave energy of an appropriate frequency is coupled into the body. A dielectric bulb within a lamp chamber in the body contains a fill which when receiving energy from the resonating body forms a light-emitting plasma. The bulb is transparent to visible light and infrared radiation emitted by the plasma. Radiative energy lost from the plasma is recycled by reflecting the radiation from thin-film, multi-layer coatings on bulb exterior surfaces and/or lamp chamber surfaces back into the bulb. The lamp further includes two- or three-microwave probe configurations minimizing power reflected from the body back to the microwave source when the source operates: (a) at a frequency such that the body resonates in a single mode; or (b) at one frequency such that the body resonates in a relatively higher mode before a plasma is formed, and at another frequency such that the body resonates in a relatively lower order mode after the plasma reaches steady state.

32 Claims, 27 Drawing Sheets

U.S. PATENT DOCUMENTS

| | | |
|---|---|---|
| 3,787,705 A | 1/1974 | Bolin et al. |
| 3,826,950 A | 7/1974 | Hruda et al. |
| 3,860,854 A | 1/1975 | Hollister |
| 3,942,058 A | 3/1976 | Haugsjaa et al. |
| 3,943,401 A | 3/1976 | Haugsjaa et al. |
| 3,993,927 A | 11/1976 | Haugsjaa et al. |
| 4,001,631 A | 1/1977 | McNeill et al. |
| 4,041,352 A | 8/1977 | McNeill et al. |
| 4,053,814 A | 10/1977 | Regan et al. |
| 4,206,387 A | 6/1980 | Kramer et al. |
| 4,359,668 A | 11/1982 | Ury |
| 4,485,332 A | 11/1984 | Ury et al. |
| 4,498,029 A | 2/1985 | Yoshizawa et al. |
| 4,504,768 A | 3/1985 | Ury et al. |
| 4,507,587 A | 3/1985 | Wood et al. |
| 4,507,597 A | 3/1985 | Trost |
| 4,607,242 A | 8/1986 | Cozzie |
| 4,633,128 A | 12/1986 | Roberts et al. |
| 4,633,140 A | 12/1986 | Lynch et al. |
| 4,652,790 A | 3/1987 | Wood |
| 4,673,846 A | 6/1987 | Yoshizawa et al. |
| 4,691,179 A | 9/1987 | Blum et al. |
| 4,749,915 A | 6/1988 | Lynch et al. |
| 4,795,658 A | 1/1989 | Kano et al. |
| 4,887,192 A | 12/1989 | Simpson et al. |
| 4,902,935 A | 2/1990 | Wood |
| 4,908,492 A | 3/1990 | Okamoto et al. |
| 4,950,059 A | 8/1990 | Roberts |
| 4,954,755 A | 9/1990 | Lynch et al. |
| 4,975,625 A | 12/1990 | Lynch et al. |
| 4,978,891 A | 12/1990 | Ury |
| 5,021,704 A | 6/1991 | Walker et al. |
| 5,039,903 A | 8/1991 | Farrall |
| 5,051,663 A | 9/1991 | Ury et al. |
| 5,070,277 A | 12/1991 | Lapatovich |
| 5,072,157 A | 12/1991 | Greb et al. |
| 5,077,822 A | 12/1991 | Cremer |
| 5,086,258 A | 2/1992 | Mucklejohn et al. |
| 5,227,698 A | 7/1993 | Simpson et al. |
| 5,313,373 A | 5/1994 | Bjorner et al. |
| 5,334,913 A | 8/1994 | Ury et al. |
| 5,361,274 A | 11/1994 | Simpson et al. |
| 5,404,076 A | 4/1995 | Dolan et al. |
| 5,438,242 A | 8/1995 | Simpson |
| 5,448,135 A | 9/1995 | Simpson |
| 5,498,937 A | 3/1996 | Korber et al. |
| 5,525,865 A | 6/1996 | Simpson |
| 5,541,475 A | 7/1996 | Wood et al. |
| 5,548,182 A | 8/1996 | Bunk et al. |
| 5,594,303 A | 1/1997 | Simpson et al. |
| 5,786,667 A | 7/1998 | Simpson et al. |
| 5,789,863 A | 8/1998 | Takahashi et al. |
| 5,814,951 A | 9/1998 | Smolka et al. |
| 5,831,386 A | 11/1998 | Turner et al. |
| 5,841,242 A | 11/1998 | Simpson et al. |
| 5,866,980 A | 2/1999 | Dolan et al. |
| 5,903,091 A | 5/1999 | MacLennan et al. |
| 5,910,710 A | 6/1999 | Simpson |
| 5,910,754 A | 6/1999 | Simpson et al. |
| 5,923,116 A | 7/1999 | Mercer et al. |
| 5,926,079 A | 7/1999 | Heine et al. |
| 5,949,180 A | 9/1999 | Walker |
| 6,005,332 A | 12/1999 | Mercer |
| 6,016,766 A | 1/2000 | Pirkle et al. |
| 6,020,800 A | 2/2000 | Arakawa et al. |
| 6,031,333 A | 2/2000 | Simpson |
| 6,049,170 A | 4/2000 | Hochi et al. |
| 6,084,348 A | 7/2000 | Love |
| 6,084,356 A | 7/2000 | Seki et al. |
| 6,137,237 A | 10/2000 | MacLennan et al. |
| 6,181,054 B1 | 1/2001 | Levin et al. |
| 6,196,297 B1 | 3/2001 | Campbell et al. |
| 6,246,160 B1 | 6/2001 | MacLennan et al. |
| 6,252,346 B1 | 6/2001 | Turner et al. |
| 6,265,813 B1 | 7/2001 | Knox et al. |
| 6,291,936 B1 | 9/2001 | MacLennan et al. |
| 6,310,443 B1 | 10/2001 | MacLennan et al. |
| 6,313,587 B1 | 11/2001 | MacLennan et al. |
| 6,326,739 B1 | 12/2001 | MacLennan et al. |
| 6,424,099 B1 | 7/2002 | Kirkpatrick et al. |
| 6,476,557 B1 | 11/2002 | Leng et al. |
| 6,509,675 B2 | 1/2003 | MacLennan et al. |
| 6,566,817 B2 | 5/2003 | Lapatovich |
| 6,617,806 B2 | 9/2003 | Kirkpatrick et al. |
| 6,664,842 B1 | 12/2003 | Pobanz |
| 6,856,092 B2 | 2/2005 | Pothoven et al. |
| 6,922,021 B2 | 7/2005 | Espiau et al. |
| 6,949,887 B2 | 9/2005 | Kirkpatrick et al. |
| 6,962,426 B2 | 11/2005 | Slobodin |
| 6,980,021 B1 | 12/2005 | Srivastava et al. |
| 7,034,464 B1 | 4/2006 | Izadian et al. |
| 7,253,091 B2 | 8/2007 | Brewer et al. |
| 2001/0030509 A1 | 10/2001 | Pothoven et al. |
| 2001/0035720 A1 | 11/2001 | Guthrie et al. |
| 2002/0001056 A1 | 1/2002 | Sandberg et al. |
| 2002/0001135 A1 | 1/2002 | Berman et al. |
| 2002/0105274 A1 | 8/2002 | Pothoven et al. |
| 2005/0057158 A1 | 3/2005 | Chang et al. |
| 2005/0099130 A1 | 5/2005 | Espiau et al. |
| 2005/0212456 A1 | 9/2005 | Espiau et al. |
| 2005/0248281 A1 | 11/2005 | Espiau et al. |
| 2005/0286263 A1 | 12/2005 | Champion et al. |
| 2006/0208645 A1 | 9/2006 | Espiau et al. |
| 2006/0208648 A1 | 9/2006 | Espiau et al. |
| 2007/0075652 A1 | 4/2007 | Espiau et al. |

FOREIGN PATENT DOCUMENTS

| | | | |
|---|---|---|---|
| EP | 0 035 898 | A1 | 3/1981 |
| EP | 0 419 947 | A2 | 9/1990 |
| JP | 8-148127 | | 6/1996 |
| JP | 8148127 | | 6/1996 |
| WO | WO 97/09748 | A1 | 3/1997 |
| WO | WO-9828780 | | 7/1998 |
| WO | WO-9936940 | A2 | 7/1999 |
| WO | WO 00/16365 | A1 | 3/2000 |
| WO | WO-0211181 | A1 | 2/2002 |
| WO | WO 03/083900 | A1 | 10/2003 |

OTHER PUBLICATIONS

Order to Show Cause Bd. R. 202(d), of Patent Interference No. 105,393 between U.S. Appl. No. 09/818,092 (Guthrie, junior party) and U.S. Patent 6,737,809 (Espiau, senior party) by Administrative Patent Judge S. Medley mailed on Jan. 24, 2006 (Schedule 1 of Counterstatement).

Guthrie, C., Drawings Submitted with Suggestion of Interference filed Nov. 29, 2004 in U.S. Appl. No. 09/818,092, and Cited in and Available from Order to Show Cause (OSC) in Patent Interference No. 105,393 mailed from Administrative Patent Judge S. Medley on Jan. 24, 2006. (See p. 10 Lines 1-7 and FN4 of OSC).

Decision of Hon. Thomas WM. Cain, Judge of the Superior Court of California, in *Robert P. Schiro* v. *Digital Reflection, Inc.*, dated May 11, 2004, (Schedule 2 of Counterstatement).

Mr. Turner's 31st Mar. 2000 Memorandum and Agreement Referred to in Paragraph 19 of the Statement of Case, DRI-00-01 and BNDA (Schedule 3 of Counterstatement).

Fusion's International Patent Application WO 99/36940 published Jul. 22, 1999 (Schedule 4 of Counterstatement).

DRI's Schematic dated Apr. 12, 2000 (Schedule 5 of Counterstatement).

Mr. Turner's Notes from the Apr. 11, 2000 Meeting (Schedule 6 of Counterstatement).

Mr. Turner's Apr. 14, 2000 Memorandum and its Attachments including the Second Statement of Work(DRI-00-02), (Schedule 7 of Counterstatement).

DRI's Apr. 2000 Presentation Materials "Dielectric Resonator Concept for Plasma Lamps" (Schedule 8 of Counterstatement).

Excerpt from Professor Joshi's Notebook dated Apr. 20, 2000, (Schedule 9 of Counterstatement).

Mr. Turner's May 12, 2000 Plasma Lamp Development Plan Memorandum, Email and other Attachments thereto, (Schedule 10 of Counterstatement).

Mr. Turner's Oct. 27, 2000 Email, (Schedule 11 of Counterstatement).

Mr. Turner's Nov. 3, 2000 Letter, (Schedule 12 of Counterstatement).

Mr. Turner's May 22, 2001 Letter, (Schedule 13 of Counterstatement).

Declaration of Patent Interference No. 105,393 between U.S. Appl. No. 09/818,092 (Guthrie, junior party) and U.S. Patent 6,737,809 (Espiau, senior party) by Administrative Patent Judge S. Medley mailed on Jan. 24, 2006.

Pisano, N.A., Amendment and Request for Interference (12pp) and Appendix A (9pp) submitted in U.S. Appl. No. 09/818,092 Guthrie, et al., to the USPTO on Nov. 29, 2004, and available via USPTO Public Pair on or after Nov. 29, 2004.

Prior, G.A., Declaration (6pp) submitted in U.S. Appl. No. 09/818,092 Guthrie, et al., to the USPTO on Nov. 29, 2004, and available via USPTO Public PAIR on or after Nov 29, 2004.

Sandberg, E., Declaration (5pp) submitted in U.S. Appl. No. 09/818,092 Guthrie, et al., to the USPTO on Nov. 29, 2004, and available via USPTO Public PAIR on or after Nov. 29, 2004.

Turner, D., Letter to Greg Prior (3pp) dated Mar. 31, 2003 submitted in U.S. Appl. No. 09/818,092 Guthrie, et al., to the USPTO on Nov. 29, 2004, and available via USPTO Public PAIR on or after Nov. 29, 2004.

Turner, D. Engineering Service Agreeement (3pp); Statement of Work (1p) dated Mar. 31, 2002 submitted in U.S. Appl. No. 09/818,092 Guthrie, et al., to the USPTO on Nov. 29, 2004, and available via USPTO Public PAIR on or after Nov. 29, 2004.

Turner, D., electronic mail message to Wayne Catlett (2pp) sent on Jun. 26, 2002 submitted in U.S. Appl. No. 09/818,092 Guthrie, et al., to the USPTO on Nov. 29, 2004, and available via USPTO Public Pair on or after Nov. 29, 2004.

Espiau, Frederick M., et al., U.S. Appl. No. 11/084,069 "Plasma Lamp with Dielectric Waveguide" filed Mar. 18, 2005.

Espiau, Frederick M., et al., U.S. Appl. No. 11/083,552 "Plasma Lamp with Dielectric Waveguide" filed Mar. 18, 2005.

Espiau, Frederick M., et al., U.S. Appl. No. 11/083,557 "Plasma Lamp with Dielectric Waveguide" filed Mar. 18, 2005.

Espiau, Frederick M., et al., U.S. Appl. No. 11/083,558 "Plasma Lamp with Dielectric Waveguide" filed Mar. 18, 2005.

Espiau, Frederick M., et al., U.S. Appl. No. 11/083,559 "Plasma Lamp with Dielectric Waveguide" filed Mar. 18, 2005.

Kirkpatrick, Douglas A., U.S. Appl. No. 60/133,885 "High Brightness Microwave Lamp" filed May 12, 1999.

Kirkpatrick, Douglas A., U.S. Appl. No. 60/177,271 "High Brightness Microwave Lamp" filed Jan. 21, 2000.

Prior, Greg, U.S. Appl. No. 60/224,059 "Wave-Guide Used for the Excitation of an Electrode-less Metal Halide Plasma Lamp Incorporating a Solid Dielectric Material" filed Aug. 9, 2000.

Prior, Greg, U.S. Appl. No. 60/224,298 "Wave-Guide Used for the Excitation of an Electrode-less Metal Halide Plasma Lamp Incorporating a Solid Dielectric Material" filed Aug. 10, 2000.

Prior, Greg, U.S. Appl. No. 60/234,415 "Quartz Bulb Enclosed in a Wave-Guide" filed Sep. 21, 2000.

Sandberg, Ed, U.S. Appl. No. 60/192,731 "Light Source for Use in Microdisplay Based Light Engines" filed Mar. 27, 2000.

Wilson, Don, U.S. Appl. No. 60/224,257 "R.F. Wave-Guide into which an Insert of a Hermetic Material that has been Either Molded or Plasma Deposited" filed Aug. 10, 2000.

Wilson, Don, U.S. Appl. No. 60/224,289 "Light Source Consisting of an Electrode-less Metal Halide Plasma Bulb that is Integrated into a Wave-Guide" filed Aug. 10, 2000.

Wilson, Don, U.S. Appl. No. 60/224,290 "Electrode-less Metal Halide Plasma Lamp with Integrated Electronics" filed Aug. 10, 2000.

Wilson, Don, U.S. Appl. No. 60/224,291 "High Temperature, Low Cost Window Sealing Technique for Plasma Lamps" filed Aug. 10, 2000.

Wilson, Don, U.S. Appl. No. 60/224,866 "Use of a Coating to Prevent the Reduction of Ceramic to Elemental Metal in the Bulb of a Wave-Guide Lamp" filed Aug. 11, 2000.

U.S. Appl. No. 60/192,731, E. Sandberg et al., p. 3, pgh. 4.1, p. 4, pgh. 4.6.

"'Coating Definition', from www.answers.com", *Espiau Exhibit 1019, in Board of Patent Appeals and Interferences* (Interference No. 105,393), (Mar. 31, 2006),5 pgs.

"'Coating' Definition from online dictionary, www.thefreedictionary.com/coating", *Espiau Exhibit 1020, in Board of Patent Appeals and Interferences* (Interference No. 105,393), (Mar. 21, 2006),4 pgs.

"'Coating' Definition from www.WordReference.com", *Espiau Exhibit 1021, in Board of Patent Appeals and interferences* (Interference No. 105,393), (Mar. 21, 2006), 2 pgs.

"Chapter 4—Cavity Resonators, Department of the Army Technical Manual, TM 11-673—Generation and Transmission of Microwave Energy", *Guthrie Exhibit 2104, Board of Patent Appeals and Interferences* (Interference No. 105,393), (Jun. 1953), 12 pgs.

"Definition of 'Waveguide'", *Webster's II New College Dictionary (3rd Edition), Guthrie Exhibit 2047, Board of Patent Appeals and Interferences* (Interference No. 105,393), 2 pgs.

"Diligence Calendar", *Guthrie Exhibit 2044, Board of Patent Appeals and Interferences* (Interference No. 105,393), (Jul. 2000 and Aug. 2000), 1 pg.

"File History of US 6,566,817, for High Intensity Discharge Lamp With Only One Electrode, filed Sep. 24, 2001 by Lapatovich, et al.", *Espiau Exhibit 1097, Board of Patent Appeals and Interferences* (Interference No. 105,393), 94 pgs.

"File History of US 6,922,021 for a Microwave Energized Plasma Lamp With Solid Dielectric Waveguide, filed by Jul. 26, 2005 by Espiau, et al.", *Guthrie Exhibit 2078, Board of Patent Appeals and Interferences* (Interference No. 105,393), 468 pgs.

"File History of US 6,962,426 for Recirculation of Reflected Source Light in An Image Projection System, filed Nov. 29, 2001 by Slobodin", *Espiau Exhibit 1096, Board of Patent Appeals and Interferences* (Interference No. 105,393), 116 pgs.

"Fusion Lighting's Website / Lamps for Special Applications", http://www.web.archive.org/web/20010602134016/fusionlighting.com/special.htm; *Guthrie Exhibit 2125, Board of Patent Appeals and Interferences* (Interference No. 105,393), (archived Jun. 2, 2001),2 pgs.

"Google "Coating" Definition Search Results", *Espiau Exhibit 1018, in Board of Patent Appeals and Interferences* (Interference No. 105,393), (Mar. 31, 2006),2 pgs.

"Handout for Experiment 1: "Cavity Resonator", Electrical Engineering Department School of Engineering and Applied Science, University of California, Los Angeles", *Espiau Exhibit 1026, in Board of Patent Appeals and Interferences* (Interference No. 105,393), (Winter, 1995),5 pgs.

"Handout for Experiment 3: "Cavity Resonator", Electrical Engineering Department, School of Engineering and Applied Science, University of California, Los Angeles", *Espiau Exhibit 1025, in Board of Patent Appeals and Interferences* (Interference No. 1025), (Winter, 1991), 15 pgs.

"Luxim Corporation Consulting Agreement", *Espiau Exhibit 1090, Board of Patent Appeals and Interferences* (Interference No. 105,393), (Jun. 12, 2006),6 pgs.

"Luxim Corporation's Website", *Guthrie Exhibit 2114, Board of Patent Appeals and Interferences* (Interference No. 105,393), (Apr. 11, 2006),50 pgs.

"Luxim Corporation, "Microwave Energized Plasma Lamps"; MiPL: Product Development Plan", *Guthrie Exhibit 2009, Board of Appeals and Interferences* (Interference No. 105,393), (Aug. 2002),14 pgs.

"Other Disclosure Materials—File: "An External Heat Sink"", *Guthrie Exhibit 2025, Board of Patent Appeals and Interferences* (Interference No. 105,393), (Jul. 28, 2000),3 pgs.

"Other Disclosure Materials—File: Light Source 2.1", *Guthrie Exhibit 2021, Board of Patent Appeals and Interferences* (Interference No. 105,393), (Aug. 8, 2000),4 pgs.

"Other Disclosure Materials—file: Light Source 2.11", *Guthrie Exhibit 2026, Board of Patent Appeals and Interferences* (Interference No. 105,393), (Jul. 28, 2000),2 pgs.

"Other Disclosure Materials—File: Light Source 2.2A", *Guthrie Exhibit 2022, Board of Patent Appeals and Interferences* (Interference No. 105,393), (Jul. 27, 2000),4 pgs.

"Other Disclosure Materials—File: Light Source 2.6", *Guthrie Exhibit 2023, Board of Patent Appeals and Interferences* (Interference No. 105,393), (Aug. 8, 2000),2 pgs.

"Other Disclosure Materials—File: Light Source 2.9", *Guthrie Exhibit 2024, Board of Patent Appeals and Interferences* (Interference No. 2024), (Jul. 27, 2000),3 pgs.

"Photograph of Gas-Filled Quartz Bulbs", *Guthrie Exhibit 2042, Board of Patent Appeals and Interferences* (Interference No. 105,393), 1 pg.

"Photographs of Full Wavelength Waveguide", *Guthrie Exhibit 2040, Board of Patent Appeals and Interferences* (Interference No. 105,393), 1 pg.

"Photographs of Half Wavelength Ceramic Waveguide", *Guthrie Exhibit 2041, Board of Patent Appeals and Interferences* (Interference No. 105,393), 1 pg.

"Picture of Lamp Fixture", *Guthrie Exhibit 2036, Board of Patent Appeals and Interferences* (Interference No. 105,393), 1 pg.

"Presentation Materials—Wave Guide Material", *Guthrie Exhibit 2067, Board of Patent Appeals and Interferences* (Interference No. 105,393), 7 pgs.

"Priority-Claimed Disclosure Materials—File: Light Source 2.13", *Guthrie Exhibit 2020, Board of Patent Appeals and Interferences* (Interference No. 105,393), (Aug. 3, 2000),2 pgs.

"Priority-Claimed Disclosure Materials—File: Light Source 2.2", *Guthrie Exhibit 2014, Board of Patent Appeals and Interferences* (Interference No. 105,393), (Jul. 27, 2000),3 pgs.

"Priority-Claimed Disclosure Materials—File: Light Source 2.3", *Guthrie Exhibit 2015, Board of Patent Appeals and Interferences* (Interference No. 105,393), (Jul. 19, 2000),4 pgs.

"Priority-Claimed Disclosure Materials—File: Light Source 2.7", *Guthrie Exhibit 2018, Board of Patent Appeals and Interferences* (Interference No. 105,393), (Jul. 27, 2000),4 pgs.

"Priority-Claimed Disclosure Materials—File: Light Source 2.4", *Guthrie Exhibit 2016, Board of Patent Appeals and Interferences* (Interference No. 105,393), (Aug. 8, 2000),4 pgs.

"Priority-Claimed Disclosure Materials—File: Light Source 2.5", *Guthrie Exhibit 2017, Board of Patent Appeals and Interferences* (Interference No. 105,392), (Jul. 28, 2000),4 pgs.

"Priority-Claimed Disclosure Materials—File: Light Source 2.8", *Guthrie Exhibit 2019, Board of Patent Appeals and Interferences* (Interference No. 105,393), (Jul. 26, 2000),5 pgs.

"Synonyms for the Word 'Direct', from Thesaurus.com", *Guthrie Exhibit 2110, Board of Patent Appeals and Interferences* (Interference No. 105,393), (Jun. 18, 2006),1 pg.

"Turner Engineering Company; Conceptual Design: Final PowerPoint Presentation", *Guthrie Exhibit 2070, Board of Patent Appeals and Interferences* (Interference No. 105,393), (May 22, 2000),30 pgs.

"Turner Engineering Corporation's Website", *Guthrie Exhibit 2113, Board of Patent Appeals and Interferences* (Interference No. 105,393), (Jun. 13, 2006),25 pgs.

Bergan, D. A., "E-Mail to N. Pisano With Espiau's Objections to Guthrie's Reply Exhibits (Exhibits 2123, 2124, 2125 and 2126)", *Espiau Exhibit 1103, Board of Patent Appeals and Interferences* (Interference No. 105,393), (Sep. 8, 2006),5 pgs.

Berman, A., "Declaration", *Guthrie Exhibit 2071, Board of Patent Appeals and Interferences* (Interference No. 105,393), (Feb. 20, 2006),6 pgs.

Bleaney, B. J., et al., "Electricity and Magnetism, Second Edition, 1965, Oxford at the Clarendon Press", *Guthrie Exhibit 2108, Board of Patent Appeals and Interferences* (Interference No. 105,393), (1965),8 pgs.

Catlett, F. W., "Deposition Transcript", *Guthrie Exhibit 2007, Board of Patent Appeals and Interferences* (Interference No. 105,393), (Jun. 1, 2005),181 pgs.

Chang, Y., et al., "Plasma Lamp, U.S. Appl. No. 60/222,028, filed Jul. 31, 2000", *Espiau Exhibit 1012, in Board of Patent Appeals and Interferences* (Interference No. 105,393), (Jul. 31, 2000),28 pgs.

Espiau, F. M., et al., "File History, Plasma Lamp With Dielectric Waveguide (U.S. Appl. No. 09/809,718, filed Mar. 15, 2001)", *Espiau Exhibit 1013, in Board of Patent Appeals and Interferences* (Interference No. 105,393), (Mar. 15, 2001),46 pgs.

Everett, S., "Declaration", *Guthrie Exhibit 2075, Board of Patent Appeals and Interferences* (Interference No. 105,393), (Mar. 13, 2006),3 pgs.

Ghandi, O. P., "Microwave Engineering and Applications, Pergamon Press, Inc.", *Guthrie Exhibit 2119, Board of Patent Appeals and Interferences* (Interference No. 105,393), (1981),6 pgs.

Gray, E., "Reply to Office Action of Nov. 3, 2002, in Plasma Lamp With Dielectric Waveguide, U.S. Appl. No. 09/809,718, filed Mar. 11, 2001", *Guthrie Exhibit 2088, Board of Patent Appeals and Interferences* (Interference No. 105,393), (Mar. 6, 2003),76 pgs.

Gray, E., "Reply to Office Communication for Plasma Lamp With Dielectric Waveguide, U.S. Appl. No. 09/809,718 (Espiau)", *Guthrie Exhibit 2097, Patent Appeals and Interferences* (Interference No. 105,393), (Sep. 27, 2003),66 pgs.

Gupta, M. S., "Corrected Third Declaration", *Guthrie Exhibit 2121, Board of Patent Appeals and Interferences* (Interference No. 105,393), (Aug. 1, 2006),34 pgs.

Gupta, M. S., "Curriculum Vitae", *Guthrie Exhibit 2090, Board of Patent Appeals and Interferences* (Interference No. 105,393), 36 pgs.

Gupta, M. S., "Declaration", *Guthrie Exhibit 2089, Board of Patent Appeals and Interferences* (Interference No. 105,393), (May 1, 2006),28 pgs.

Gupta, M. S., "Deposition Transcript", *Guthrie Exhibit 2122, Board of Patent Appeals and Inteferences,* (Interference No. 105,393),(Aug. 16, 2006),71 pgs.

Gupta, M., "Deposition Transcript", *Guthrie Exhibit 2117, Board of Patent Appeals and Interferences* (Interference No. 105,393), (Jun. 22, 2006),48 pgs.

Gupta, M. S., "Espiau Errata to the Transcript of the Aug. 16, 2006 Deposition of Madhu S. Gupta, Ph.D.", *Espiau Exhibit 1089, Board of Patent Appeals and Interferences* (Interference No. 105,393), (Aug. 16, 2006),2 pgs.

Gupta, M. S., "Fourth Declaration of Madhu S. Gupta, Ph.D.", *Guthrie Exhibit 2124, Board of Patent Appeals and Interferences* (Interference No. 105,393), (Sep. 5, 2006),17 pgs.

Gupta, M. S., "Second Declaration", *Guthrie Exhibit 2105, Board of Patent Appeals and Interferences* (Interference No. 105,393), (May 22, 2006),24 pgs.

Gupta, M. S., "Transcription of Deposition of Madhu S. Gupta, Ph.D. (vol. III)", *Guthrie Exhibit 2132, Board of Patent Appeals and Interferences* (Interference No. 105,393), (Oct. 3, 2006), 106 pgs.

Guthrie, C., "'Correction Documentation' to Light Source Files 2.1-2.13", *Guthrie Exhibit 2032, Board of Patent Appeals and Interferences* (Interference No. 105,393), (Aug. 3, 2000),2 pgs.

Guthrie, C., et al., "A Corregated Wave-guide Used for the Excitation of an Electrode-less Metal Halide Plasma Lamp Incorporating a Solid Dielectric Material", U.S. Appl. No. 60/224,060, filed Aug. 9, 2000 (*Guthrie Exhibit 2028, Board of Patent Appeals and Interferences* (Interference No. 105,393)), 9 pgs.

Guthrie, C., et al., "A Method for Connecting the Antenna on a Printed Wiring Board to a Wave-Guide in a Light Source in Which an Electrode-less Lamp is Built into the Wave-Guide Structure", U.S. Appl. No. 60/224,061, filed Aug. 9, 2000 (*Guthrie Exhibit 2027, Board of Patent Appeals and Interferences* (Interference No. 105,393), 9 pgs.

Guthrie, C., "Ceramic Test Sample; SPL002 Engineering Drawing", *Guthrie Exhibit 2061, Board of Patent Appeals and Interferences* (Interference No. 105,383), (Apr. 27, 2000), 1 pg.

Guthrie, C., "Concept 3 With Heat Sink; WGC003 Engineering Drawing"; *Guthrie Exhibit 2064, Board of Patent Appeals and Interferences* (Interference No. 105,393), (May 16, 2000),1 pg.

Guthrie, C., et al., "Declaration", *Guthrie Exhibit 2006, Board of Patent Appeals and Interferences* (Interference No. 105,393), (Feb. 20, 2006),14 pgs.

Guthrie, C., "Half Wavelength Waveguide Drawing (CTS010)", *Guthrie Exhibit 2048, Board of Patent Appeals and Interferences* (Interference No. 105,393), (Jul. 20, 2000), 1 pg.

Guthrie, C., "Lamp With Integrated Waveguide Version I; LWG001 Engineering Drawing", *Guthrie Exhibit 2060, Board of Patent Appeals and Interferences* (Interference No. 105,393), (Apr. 27, 2000),1 pg.

Guthrie, C., "SPL020: Engineering Drawing", *Guthrie Exhibit 2043, Board of Patent Appeals and Interferences* (Interference No. 105,393), (Nov. 3, 2000),2 pgs.

Guthrie, C., "Waveguide Lamp Concept3; WGC003 Engineering Drawing", *Guthrie Exhibit 2062, Board of Patent Appeals and Interferences* (Interference No. 105,393), (May 10, 2000),1 pg.

Guthrie, C., "Waveguide Lamp Concept 3; WGC003 Engineering Drawing-Waveguide Package", *Guthrie Exhibit 2063, Board of Patent Appeals and Interferences* (Interference No. 105,393), (May 10, 2000),1 pg.

Hoover, E., "Declaration", *Guthrie Exhibit 2011, Board of Patent Appeals and Interferences* (Interference No. 105,393), (Feb. 17, 2006),5 pgs.

Johnson, A., "E-Mail Message to D. Bergan with Espiau's Objections to Guthrie's Opposition Motion Exhibits (Exhibits 2119 and 2120)", *Espiau Exhibit 1102, Board of Patent Appeals and Interferences* (Interference No. 105,393), (Oct. 16, 2006),7 pgs.

Joshi, C. J., "Declaration", *Espiau Exhibit 1051, Board of Patent Appeals and Interferences* (Interference No. 105,393), (May 22, 2006),3 pgs.

Joshi, C. J., "Deposition Transcript", *Espiau Exhibit 1068, Board of Patent Appeals and Interferences* (Interference No. 105,393), (Jul. 7, 2006),50 pgs.

Joshi, C. J., "Handwritten "Integrated Lamp-Waveguide concept", with attached note", *Espiau Exhibit 1031, Board of Patent Appeals and Interferences* (Interference No. 105,393), (Jul. 11, 2000),13 pgs.

Joshi, C. J., "Notebook Entries", *Espiau Exhibit 1029, Board of Patent Appeals and Interferences* (Interference No. 105,393), (Apr. 12, 2000 through Apr. 20, 2000),16 pgs.

Joshi, C. J., "Provisional Draft "Integrated Lamp Waveguide Concept", attached to E-Mail from Simon, N.", *Espiau Exhibit 1032, Board of Patent Appeals and Interferences* (Interference No. 105,393), (Jul. 11, 2000),13 pgs.

Kipling, K., et al., "High Brightness Electrodeless Lamp for Projection Display, Society for Information Display", *Espiau Exhibit 1079, Board of Patent Appeals and Interferences* (Interference No. 105,393), (May 1999),4 pgs.

Kirkpatrick, D. A., "Aperture Lamps", *Proceedings, 9th International Symposium on Science & Technology of Light Sources, Espiau Exhibit 1082, Board of Patent Appeals and Interferences* (Interference No. 105,393), (Aug. 2001),10 pgs.

Lee, B. T., "Final Office Action, for U.S. Appl. No. 09/818,092, filed Mar. 26, 2001", *Espiau Exhibit 1048, Board of Patent Appeals and Interferences* (Interference No. 105,393), (Feb. 2, 2004),6 pgs.

Lee, B. T., "Office Action for U.S. Appl. No. 09/818,092, filed Mar. 26, 2001", *Guthrie Exhibit 2002, Board of Patent Appeals and Interferences* (Interference No. 105,393), (Jul. 27, 2004),6 pgs.

Lohse, T., "Declaration", *Guthrie Exhibit 2013, Board of Patent Appeals and Interferences* (Interference No. 105,393), (Feb. 20, 2006),3 pgs.

Mancuso, M. J., "Petition to Accept Unintentionally Delayed Claim for Priority Under 35 U.S.C. 119(e) for the Benefit of Prior Filed Provisional Applications", *Guthrie Exhibit 2092, Board of Patent Appeals and Interferences* (Interference No. 105,393), (Apr. 27, 2006),6 pgs.

Mitcheson, T., et al., "Statement of Case, Ceravision Filing in UK Entitlement", *Guthrie Exhibit 2037, Board of Patent Appeals and Interferences* (Interference No. 105,393), 52 pgs.

Morgan, R. C., "Espiau Opposition 1", *Board of Patent Appeals and Interferences* (Interference No. 105,393), (Jul. 18, 2006),51 pgs.

Morgan, R. C., "Espiau Opposition 2", *Board of Appeals and Patent Interferences* (Interference No. 105,393), (Jul. 18, 2006),50 pgs.

Morgan, R. C., "Espiau Opposition 3", *Board of Patent Appeals and Interferences* (Interference No. 105,393), (Jul. 18, 2006),45 pgs.

Morgan, R. C., "Espiau Opposition 4", *Board of Patent Appeals and Interferences* (Interference No. 105,393), (Jul. 18, 2006),97 pgs.

Morgan, R. C., "Espiau Reply 2 Re: Espiau's Motion 2", *Board of Patent Appeals and Interferences* (Interference No. 105,393), (Sep. 5, 2006),101 pgs.

Morgan, R. C., "Espiau Reply 4", *Board of Patent Appeals and Interferences* (Interference No. 105,393), (Sep. 5, 2005),95 pgs.

Morgan, R., "Espiau Reply on Motion 3", *Board of Patent Appeals and Interferences* (No. 105,393), (Sep. 5, 2006),83 pgs.

Morgan, M., "Order Approving Trustee's Sale of Debtor's Assets to Wilson/Guthrie (United States Bankruptcy Court—Northern District of California", *Espiau Exhibit 1086, Board of Patent Appeals and Interferences* (Interference No. 105,393), (Mar. 10, 2004),29 pgs.

Neate, A., "Declaration", *Guthrie Exhibit 2057, Board of Patent Appeals and Interferences* (Interference No. 105,393), (Feb. 21, 2006),4 pgs.

Neate, A., "DRI Dielectric Waveguide Analysis Results Engineering Report", *Guthrie Exhibit 2058, Board of Patent Appeals and Interferences* (Interference No. 105,393), 5 pgs.

Neifeld, R., "E-Mail Message to T. Kearney, et al. With Espiau's Objections to Guthrie's Preliminary Motion Exhibits", *Espiau Exhibit 1100, Board of Patent Appeals and Interferences* (Interference No. 105,393), (May 9, 2006),7 pgs.

Neifeld, R., "E-Mail to T. Kearney, et al. With Espiau's Objections to Guthrie's Responsive Motion Exhibits", *Espiau Exhibit 1101, Board of Patent Appeals and Interferences* (Interference No. 105,393), (May 30, 2006),5 pgs.

Neifeld, R., "Espiau Motion 2, Espiau's Claims are not patentable to Guthrie", *Board of Patent Appeals and Interferences* (Interference No. 105,393), (May 2, 2006),49 pgs.

Neifeld, R., "Espiau Motion 3 to Deny Guthrie Benefit of Provisionals", *Board of Patent Appeals and Interferences* (Interference No. 105,393), (May 2, 2006),42 pgs.

Neifeld, R., "Espiau Motion 4 to Add Count 2", *Board of Patent Appeals and Interferences* (Interference No. 105,393), (May 2, 2006),83 pgs.

Patel, M., "Declaration", *Guthrie Exhibit 2073, Board of Patent Appeals and Interferences* (Interference No. 105,393), (Mar. 14, 2006),5 pgs.

Pisano, N. A., "Amendment and Request Under 35 U.S.C. Sec. 1.604 For Interference With Application", *Guthrie Exhibit 2001, Board of Patent Appeals and Interferences* (Interference No. 105,393), (Apr. 30, 2004),25 pgs.

Pisano, N. A., "Declaration", *Guthrie Exhibit 2072, Board of Patent Appeals and Interferences* (Interference No. 105,393), (Feb. 21, 2006),14 pgs.

Pisano, N. A., "Guthrie Contingent Responsive Motion 4", *Board of Patent Appeals and Interferences* (Interference No. 105,393), (May 23, 2006),57 pgs.

Pisano, N. A., "Guthrie Miscellaneous Motion 2", *Board of Patent Appeals and Interferences* (Interference No. 105,393), (May 2, 2006),64 pgs.

Pisano, N. A., "Guthrie Opposition to Espiau Motion 2", *Board of Patent Appeals and Interferences* (Interference No. 105,393), (Jul. 18, 2006),84 pgs.

Pisano, N. A., "Guthrie Opposition to Espiau Motion 3", *Board of Patent Appeals and Interferences* (Interference No. 105,393), (Jul. 18, 2006),70 pgs.

Pisano, N.A., "Guthrie Opposition to Espiau Motion 4", *Board of Patent Appeals and Interferences* (Interference No. 105,393), (Jul. 18, 2006),92 pgs.

Pisano, N. A., "Guthrie Preliminary Motion 1", *Board of Patent Appeals and Interferences* (Interference No. 105,393), (May 2, 2006),27 pgs.

Pisano, N. A., "Guthrie Preliminary Motion 3", *Board of Patent Appeals and Interferences* (Interference No. 105,393), (May 2, 2006),18 pgs.

Pisano, N. A., "Guthrie Reply 1", *Board of Patent Appeals and Interferences* (Interference No. 105,393), (Sep. 5, 2006),52 pgs.

Pisano, N. A., "Guthrie Reply 2", *Board of Patent Appeals and Interferences* (Interference No. 105,393), (Sep. 5, 2006),47 pgs.

Pisano, N.A., "Guthrie Reply 3", *Board of Patent Appeals and Interferences* (Interference No. 105,393), (Sep. 5, 2006),45 pgs.

Pisano, N. A., "Guthrie Reply 4", *Board of Patent Appeals and Interferences* (Interference No. 105,393), (Sep. 5, 2006),93 pgs.

Pisano, N. A., "Guthrie's Objections to Espiau's Opposition Exhibits", *Guthrie Exhibit 2129, Board of Patent Appeals and Interferences* (Interference No. 105,393), (Jul. 25, 2006),12 pgs.

Pisano, N. A., "Guthrie's Objections to Espiau's Preliminary Motion Exhibits", *Guthrie Exhibit 2127, Board of Patent Appeals and Interferences* (Interference No. 105,393), (May 9, 2006),10 pgs.

Pisano, N. A., "Guthrie's Objections to Espiau's Reply Exhibits", *Guthrie Exhibit 2130, Board of Patent Appeals and Patent Interferences* (Interference No. 105,393), (Sep. 12, 2006),11 pgs.

Pisano, N. A., "Guthrie's Objections to Espiau's Supplemental Preliminary Motion Exhibits", *Guthrie Exhibit 2128, Board of Patent Appeals and Interferences* (Interference No. 105,393), (May 31, 2006),7 pgs.

Pisano, N. A., "Guthrie's Objections to Exhibits Introduced in Espiau's Motion to Exclude", *Guthrie Exhibit 2134, Board of Patent Appeals and Interferences* (Interference No. 105,393), (Oct. 23, 2006),4 pgs.

Pisano, N. A., "Second Declaration", *Guthrie Exhibit 2076, Board of Patent Appeals and Interferences* (Interference No. 105,393), (Mar. 14, 2006),3 pgs.

Pisano, N. A., et al., "Transcript of Mar. 21, 2006 Telephone Conference", *Espiau Exhibit 1069, Board of Patent Appeals and Interferences* (Interference No. 105,393), (Mar. 21, 2006),117 pgs.

Pisano, N. A., et al., "Transcript of Telephonic Hearing before Administrative Patent Judge Sally C. Medley", *Guthrie Exhibit 2123, Board of Patent Appeals and Interferences* (Interference No. 105,393), (Aug. 24, 2006),33 pgs.

Pobanz, C. J., "Declaration", *Espiau Exhibit 1030, Board of Patent Appeals and Interferences* (Interference No. 105,393), (Apr. 27, 2006),7 pgs.

Pobanz, C. W., "MasterCard Statement", *Espiau Exhibit 1052, Board of Patent Appeals and Interferences* (Interference No. 105,393), (Apr. 7, 2000),3 pgs.

Pobanz, C. W., "MasterCard Statement", *Espiau Exhibit 1053, Board of Patent Appeals and Interferences* (Interference No. 105,393), (May 8, 2000),2 pgs.

Pobanz, C. W., "Second Declaration", *Espiau Exhibit 1054, Board of Patent Appeals and Interferences* (Interference No. 105,393), (May 20, 2006),3 pgs.

Pozar, D. M., "Curriculum Vitae", *Exhibit 1035, Board of Patent Appeals and Interferences* (Interference No. 105,393), 3 pgs.

Pozar, D. M., "Declaration", *Espiau Exhibit 1056, Board of Patent Appeals and Interferences* (Interference No. 105,393), (Apr. 29, 2006),14 pgs.

Pozar, D. M., "Deposition Transcript", *Espiau Exhibit 1063, Board of Patent Appeals and Interferences* (Interference No. 105,393), (Jun. 19, 2006),67 pgs.

Pozar, D. M., "Errata to the Transcript of the Jun. 19, 2006 Deposition of David M. Pozar", *Espiau Exhibit 1064, Board of Patent Appeals and Interferences* (Interference No. 105,393), (Jul. 6, 2006),3 pgs.

Pozar, D. M., "Fourth Declaration of David M. Pozar", *Espiau Exhibit 1085, Board of Patent appeals and Interferences* (Interference No. 105,393), (Aug. 31, 2006),14 pgs.

Pozar, D. M., "Second Declaration", *Espiau Exhibit 1057, Board of Patent Appeals and Interferences* (Interference No. 105,393), (May 21, 2006),4 pgs.

Pozar, D. M., "Section 4.7 Excitation of Waveguides—Electric and Magnetic Currents", In: Microwave Engineering, 3rd Edition, 2005 (John Wiley & Sons, Inc.), *Espiau Exhibit. No. 105,393*), (2005),8 pgs.

Pozar, D. M., "Section 5.8 Tapered Lines", In: Microwave Engineering, 3rd Edition, 2005 (John Wiley & Sons, Inc.), *Espiau Exhibit 1036, Board of Patent Appeals and Interferences* (Interference No. 105,393), (2005),9 pgs.

Pozar, D. M., "Section 6.4 Circular Waveguide Cavities", In: Microwave Engineering, 3rd Edition, 2005 (John Wiley & Sons, Inc.), *Espiau Exhibit 1076, Board of Patent Appeals and Interferences* (Interference No. 105,393), (2005),8 pgs.

Pozar, D. M.,"Third Declaration", *Espiau Exhibit 1078, Board of Patent Appeals and Interferences* (Interference No. 105,393), (Jul. 13, 2006),9 pgs.

Prior, G.A. , *Patent Disclosure Summary* (undated), 2 pgs.

Prior, G. A., et al., *Patent Disclosure Summary*, (Aug. 10, 2000),3 pages.

Prior, G. , et al., "Quartz Bulb Enclosed in a Wave-Guide", U.S. Appl. No. 60/234,415, filed Sep. 21, 2000 (*Espiau Exhibit 1006, Board of Patent Appeals and Interferences* (Interference No. 105,393)).

Prior, G. , et al., "Wave-Guide Used for the Excitation of an Electrode-less Metal Halide Plasma Lamp Incorporating a Sold Dielectric Material", U.S. Appl. No. 60/224,059, filed Aug. 9, 2000 (*Guthrie Exhibit 2049, Board of Patent Appeals and Interferences* (Interference No. 105,393)).

Prior, G. , et al., "Wave-Guide Used for the Excitation of an Electrode-less Metal Halide Plasma Lamp Incorporating a Solid Dielectric Material", U.S. Appl. No. 60/224,298, filed Aug. 10, 2000 (*Guthrie Exhibit 2054, Board of Patent Appeals and Interferences* (Interference No. 105,393)).

Sandberg, E. , et al., "A Mechanical Means of Sealing the Window to an Electrode-less Metal Halide Bulb that is Integrated into a Waveguide", U.S. Appl. No. 60/252,536, filed Jan. 17, 2001 (*Guthrie Exhibit 2094, Board of Patent Appeals and Interferences* (Interference No. 105,393)), 6 pgs.

Sandberg, E. , "An Improved Drive Circuit for an Electrode-less Plasma Lamp that is Embedded in a Waveguide", U.S. Appl. No. 60/241,198, filed Oct. 17, 2000 (*Guthrie Exhibit 2093, Board of Patent Appeals and Interferences* (Interference No. 105,393)), 7 pgs.

Sandberg, E. , "Declaration", *Guthrie Exhibit 2035, Board of Patent Appeals and Interferences* (Interference No. 105,393), (Dec. 12, 2005),3 pgs.

Sandberg, E. , "Declaration of Edmund Sandberg", *Guthrie Exhibit 2010, Board of Patent Appeals and Interferences* (Interference No. 105,393), (Feb. 20, 2006),14 pgs.

Sandberg, E. , et al., "High Efficiency Prism Assembly for Image Projection", U.S. Appl. No. 60/192,258, filed Mar. 27, 2000 (*Espiau Exhibit 1094, Board of Patent Appeals and Interferences* (Interference No. 1094)), 21 pgs.

Sandberg, E. , "Light Source for use in Microdisplay Based Light Engines", U.S. Appl. No. 60/192,731, filed Mar. 27, 2000 (*Guthrie Exhibit 2045, Board of Patent Appeals and Interferences* (Interference No. 105,393)).

Shatz, N. , et al., "Optimal Design of Nonimagine Projector Lens for Use With an RF-Powered Source and a Rectangular Target", *Proceedings of SPIE, vol. 4446, Espiau Exhibit 1080, Board of Patent Appeals and Interferences* (Interference No. 105,393), (2002),14 pgs.

Simon, N. , "Declaration", *Espiau Exhibit 1055, Board of Patent Appeals and Interferences* (Interference No. 105,393), (May 18, 2006),4 pgs.

Smoler, D. E., "Declaration", *Guthrie Exhibit 2074, Board of Patent Appeals and Interferences* (Interference No. 105,393), (Mar. 13, 2006),6 pgs.

Stallman, M. , "Declaration", *Guthrie Exhibit 2012, Board of Patent Appeals and Interferences* (Interference No. 105,393), (Feb. 21, 2006),4 pgs.

Thomas, T. , "Guthrie Declaration of Tony Thomas", *Guthrie Exhibit 2008, Board of Patent Appeals and Interferences* (Interference No. 105,393), (Feb. 19, 2006),4 pgs.

Turner, B. P., "Curriculum Vitae of Brian P. Turner, Ph.D.", *Espiau Exhibit 1065, Board of Patent Appeals and Interferences* (Interference No. 105,393), 4 pgs.

Turner, B. P., "Declaration", *Espiau Exhibit 1066, Board of Patent Appeals and Interferences* (Interference No. 105,393), (Jul. 12, 2006),4 pgs.

Turner, D. , "Declaration", *Espiau Exhibit 1034, Board of Patent Appeals and Interferences* (Interference No. 105,393), (Apr. 27, 2006),5 pgs.

Turner, B. P., "Deposition Transcript of Brian P. Turner, Ph.D.", *Espiau Exhibit 1099, Board of Patent Appeals and Interferences* (Interference No. 105,393), (Oct. 6, 2006),85 pgs.

Turner, D. B., "Deposition Transcript of David B. Turner", *Espiau Exhibit 1067, Board of Patent Appeals and Interferences* (Interference No. 105,393), (Jul. 6, 2006),56 pgs.

Turner, D. , "E-Mail Message to Chan Joshi, et al.", *Guthrie Exhibit 2065, Board of Patent Appeals and Interferences* (Interference No. 105,393), (May 15, 2000),1 pg.

Turner, D. , "E-Mail Message to Chan Joshi, et al., with attached PowerPoint Presentation", *Guthrie Exhibit 2069, Board of Patent Appeals and Interferences* (Interference No. 105,393), (May 18, 2000),32 pgs.

Turner, D. , "E-Mail Message to Charles Guthrie", *Guthrie Exhibit 2068, Board of Patent Appeals and Interferences* (Interference No. 105,393), (May 17, 2000),1 pgs.

Turner, D. , "E-Mail Message to Charlie Guthrie", *Guthrie Exhibit 2066, Board of Patent Appeals and Interferences* (Interference No. 105,393), (May 15, 2000),1 pg.

Turner, D. , "E-Mail Message to Greg Prior", *Guthrie Exhibit 2059, Board of Patent Appeals and Interferences* (Interference No. 105,393), (Apr. 16, 2000),1 pg.

Turner, B. P., "Second Declaration of Brian P. Turner", *Espiau Exhibit 1091, Board of Patent Appeals and Interferences* (Interference No. 105,393), (Sep. 19, 2006),2 pgs.

Vu, D. H., "Notice of Allowability for "Plasma Lamp With Dielectric Waveguide", U.S. Appl. No. 09/809,718, filed Mar. 15, 2001", *Espiau Exhibit 1047, Board of Patent Appeals and Interferences* (Interference No. 105,393), (Dec. 12, 2003),3 pgs.

Vu, D. H., "Office Action re: Plasma Lamp With Dielectric Waveguide, U.S. Appl. No. 09/809,718, filed Mar. 15, 2001", *Guthrie Exhibit 2087, Board of Patent Appeals and Interferences* (Interference No. 105,393), (Nov. 6, 2002),18 pgs.

Vu, D. H., "Office Communication for U.S. Appl. No. 09/0809718, filed Jul. 18, 2003", *Guthrie Exhibit 2096, Board of Patent Appeals and Interferences* (Interference No. 105,393), (Jul. 18, 2006),2 pgs.

Westberg, D. J., "Response to Office Action Mailed Jun. 17, 2002 (in Improved High Intensity Light Source, U.S. Appl. No. 09/818,092, filed Mar. 26, 2001)", *Espiau Exhibit 1043, Board of Patent Appeals and Interferences* (Interference No. 105,393), (Jun. 5, 2003),27 pgs.

Wharmby, D. O., "Chapter 11—Electrodeless Lamps", In: Lamps & Lighting, 4th Edition, 1997 (Arnold & John Wiley & Sons, Inc., *Espiau Exhibit 1039, Patent Appeals and Interferences* (Interference No. 105,393), (1997),13 pgs.

Wharmby, D. O., "Corrected Third Declaration of David O. Wharmby", *Espiau Exhibit 1083, Board of Patent Appeals and Interferences* (Interference No. 105,393), (Aug. 3, 2006),28 pgs.

Wharmby, D. O., "Curriculum Vitae", *Espiau Exhibit 1038, Board of Patent Appeals and Interferences* (Interference No. 105,393), (Nov. 2005),7 pgs.

Wharmby, D. O., "Declaration", *Espiau Exhibit 1040, Board of Patent Appeals and Interferences* (Interference No. 105,393), (May 2, 2006),20 pgs.

Wharmby, D. O., "Deposition Transcript", *Espiau Exhibit 1061, Board of Patent Appeals and Interferences* (Interference No. 105,393), (Jun. 15, 2006),57 pgs.

Wharmby, D. O., "Electrodeless Lamps for Lighting: A Review", *IEE Proceedings-A*, vol. 140(6), *Guthrie Exhibit 2085, Board of Patent Appeals and Interferences* (Interference No. 105,393), (Nov. 1993),9 pgs.

Wharmby, D. O., "Errata to the Transcript of the Jun. 15, 2006 Deposition of David O Wharmby", *Espiau Exhibit 1062, Board of Patent Appeals and Interferences* (Interference No. 105,393), (Jul. 7, 2006),4 pgs.

Wharmby, D. O., "Fourth Declaration of David O. Wharmby", *Espiau Exhibit 1084, Board of Patent Appeals and Interferences* (Interference No. 105,393), (Aug. 31, 2006),18 pgs.

Wharmby, D. O., "Second Declaration", *Espiau Exhibit 1058, Board of Patent Appeals and Interferences* (Interference No. 105,393), (May 23, 2006),5 pgs.

Wilson, D. , "Declaration", *Guthrie Exhibit 2034, Board of Patent Appeals and Interferences* (Interference No. 105,393), (Dec. 12, 2005),3 pgs.

Wilson, D. , et al., "Electrode-less Metal Halide Plasma Lamp With Integrated Electronics", U.S. Appl. No. 60/224,290, filed Aug. 10, 2000 (*Guthrie Exhibit 2052, Board of Patent Appeals and Interferences* (Interference No. 105,393)).

Wilson, D. , "Guthrie Declaration of Donald Wilson", *Guthrie Exhibit 2039, Board of Patent Appeals and Interferences* (Interference No. 105,393), (Feb. 18, 2006),10 pgs.

Wilson, D. , et al., "High Temperature, Low Cost Window Sealing Technique for Plasma Lamps", U.S. Appl. No. 60/224,291, filed Aug. 10, 2000 (*Guthrie Exhibit 2053, Board of Patent Appeals and Interferences* (Interference No. 105,393)).

Wilson, D. , et al., "Light Source Consisting of an Electrode-less Metal Halide Plasma Bulb that is Integrated Into a Wave-Guide", U.S. Appl. No. 60/224,289, filed Aug. 10, 2000 (*Guthrie Exhibit 2051, Board of Patent Appeals and Interferences* (Interference No. 105,393)).

Wilson, D. , et al., "Means to Reduce EMI in a Wave-Guide", U.S. Appl. No. 60/224,503, filed Aug. 10, 2000 (*Guthrie Exhibits 2029 and 2102, Board of Patent Appeals and Interferences* (Interference No. 105,393)), 20 pgs.

Wilson, D. , et al., "R.F. Wave-Guide into which an Insert of a Hermetric Material that has been either Molded or Plasma Deposited", U.S. Appl. No. 60/224,257, filed Aug. 10, 2000 (*Guthrie Exhibit 2050, Board of Patent Appeals and Interferences* (Interference No. 105,393)).

Wilson, D, , et al., "Use of a Coating to Prevent the Reduction of Ceramic to Elemental Metal in the Bulb of a Wave-Guide Lamp", U.S. Appl. No. 60/224,866, filed Aug. 11, 2000 (*Guthrie Exhibit 2055, Board of Patent Appeals and Interferences* (Interference No. 105,393)).

Wilson, D. , et al., "Use of a Heat Sink in a Plasma Light Source (Located between a Wave Guide that Incorporates the Bulb and the Drive Electronics", U.S. Appl. No. 60/224,962, filed Aug. 11, 2000 (*Guthrie Exhibit 2030, Board of Patent Appeals and Interferences* (Interference No. 105,393)), 6 pgs.

Wilson, D. , et al., "Use of a Heat Sink in a Plasma Light Source (Located Externally and Surrounding the Lamp Assembly)", U.S. Appl. No. 60/224,617, filed Aug. 11, 2000 (*Guthrie Exhibits 2031, and 2103, Board of Patent Appeals and Interferences* (Interference No. 105,393)), 20 pgs.

"A Ceramic Wave-Guide Lamp—From a Concept to Reality", *Espiau Exhibit 1208, Board of Patent Appeals and Interferences*(Interference No. 105,393), (Aug. 4, 2000),12 pgs.

"An Integrated Lamp—Waveguide Concept", *Espiau Exhibit 1032, Board of Patent Appeals and Interferences*(Interference No. 105,393), (Jul. 11, 2000),13 pgs.

"U.S. Appl. No. 09/809,718, Amendments Under 37 C.F.R. Sec. 1.312 mailed Dec. 15, 2003", 9 pgs.

"U.S. Appl. No. 10/356,340, Non-Final Office Action mailed Jun. 10, 2004", 6 pgs.

"U.S. Appl. No. 10/356,340, Notice of Allowance mailed Oct. 21, 2004", 4 pgs.

"U.S. Appl. No. 10/356,340, Notice of Allowance mailed Feb. 23, 2005)", 4 pgs.

"U.S. Appl. No. 10.356,340, Reply filed Oct. 7, 2004 to Office Action mailed Jun. 10, 2004)", 95 pgs.

"U.S. Appl. No. 10/947,800 Non Final Office Action mailed Jul. 12, 2007", 16 pgs.

"U.S. Appl. No. 11/010,093 Non Final Office Action mailed Apr. 4, 2007", 22 pgs.

"U.S. Appl. No. 11/010,093 Non Final Office Action mailed Jun. 14, 2006", 25 pgs.

"U.S. Appl. No. 11/010,093 Response filed Dec. 13, 2006 to Non Final Office Action mailed Jun. 14, 2006)", 13 pgs.

"U.S. Appl. No. 10/771,788 Non-Final Action mailed Mar. 27, 2007", 4 pgs.

"U.S. Appl. No. 10/771,788 Non-Final Action mailed Jun. 19, 2006", 5 pgs.

"U.S. Appl. No. 10/771,788 Response filed Sep. 27, 2007 to Ex Parte Quayle Action mailed on Mar. 27, 2007", 8 pgs.

U.S. Appl. No. 10/771,788 Amendment and Response filed Dec. 18, 2006 to Non-Final Office Action mailed Jun. 19, 2006.

"U.S. Appl. No. 11/083,552 Non Final Office Action mailed Aug. 10, 2007",34 pgs.

"U.S. Appl. No. 11/083,552 Preliminary Amendment filed Jul. 15, 2005", 4 pgs.
"U.S. Appl. No. 11/083,557 Non Final Office Action mailed Aug. 30, 2006)", 18 pgs.
"U.S. Appl. No. 11/083,557 Notice of Allowance mailed May 3, 2007", 19 pgs.
"U.S. Appl. No. 11/083,557 Preliminary Amendment filed Jul. 15, 2005", 4 pgs.
"U.S. Appl. No. 11/083,557 Response filed Jan. 19, 2007 to Non Final Office Action mailed Aug. 30, 2006", 13 pgs.
"U.S. Appl. No. 11/083,558 Preliminary Amendment filed Apr. 26, 2007", 5 pgs.
"U.S. Appl. No. 11/083,558 Preliminary Amendment filed Jul. 15, 2005", 4 pgs.
"U.S. Appl. No. 11/084,069, Non-Final Office Action mailed Aug. 9, 2007", 35 pgs.
"U.S. Appl. No. 11/084,177 Non Final Office Action mailed Aug. 9, 2007", ,34 pgs.
"U.S. Appl. No. 11/084,177 Preliminary Amendment filed Jul. 15, 2005", 4 pgs.
"U.S. Appl. No. 11/618,673 Preliminary Amendment filed Dec. 29, 2006", 8 pgs.
"Channel Microwave Quote No. 100102 re: Various Items", *Espiau Exhibit 1162, Board of Patent Appeals and Interferences*(Interference No. 105,393), (May 18, 200),2 pgs.
"Complaint for Damages and Injunctive and Other Relief", *Guthrie Exhibit 2229, Board of Patent Appeals and Interferences* (Interference No. 105,393), (Oct. 23, 2001),38 pgs.
"Conference Call", *Guthrie Exhibit 2230, Board of Patent Appeals and Interferences* (Interference No. 105,393), (Feb. 9, 2006),25 pgs.
"Conference Call", *Guthrie Exhibit 2225, Board of Patent Appeals and Interferences* (Interference No. 105,393), (Mar. 8, 2007),24 pgs.
"Coorstek Quotation", *Espiau Exhibit 1197, Board of Patent Appeals and Interferences*(Interference No. 105,393), (Aug. 2, 2000),3 pgs.
"Cross-Examination of Carl W., Pobanz", *Espiau Exhibit 1236, Board of Patent Appeals and Interferences* (Interference No. 105,393), Merrill Legal Solutions,(Aug. 19, 2007),68 pgs.
"Cross-Examination of David Pozar", *Espiau Exhibit 1063, Board of Patent Appeals and Interferences*(Interference No. 105,393), (Jun. 19, 2006),196 pgs.
"Cross-Examination of Matt Espiau (Videotaped )", *Espiau Exhhibit 1239, Board of Patent Appeals and Interferences*(Interference No. 105,393), Merrill Legal Solutions,(Aug. 17, 2007),225 pgs.
"Declaration of Carl W. Pobanz", *Espiau Exhibit 1030, Board of Patent Appeals and Interferences*(Interference No. 105,393), (Apr. 27, 2006),7 pgs.
"Declaration of Chandrashekhar J. Joshi", *Espiau Exhibit 1051, Board of Patent Appeals and Interferences*(Interference No. 105,393), (May 22, 2006),3 pgs.
"Declaration of David Turner", *Espiau Exhibit 1034, Board of Patent Appeals and Interferences*(Interference No. 105,393), (Apr. 27, 2006),5 pgs.
"Declaration of Ellen Thotus", *Espiau Exhibit 1242, Board of Patent Appeals and Interferences* (Interference No. 105,393), (Aug. 29, 2007),3 pgs.
"Declaration of Frederick Matthew Espiau", *Guthrie Exhibit 2227, Board of Patent Appeals and Interferences* (Interference No. 105,393), (Jun. 9, 2000),68 pgs.
"Declaration of Frederick Matthew Espiau", *Espiau Exhibit 1168, Board of Patent Appeals and Interferences*(Interference No. 105,393), (Jul. 29, 2007), 17 pgs.
"Declaration of Penny Ortega", *Espiau Exhibit 1244, Board of Patent Appeals and Interferences* (Interference No. 105,393), (Aug. 29, 2007),3 pgs.
"Declaration of Regis C. Worley, Jr.", *Guthrie Exhibit 2234, Board of Patent Appeals and Interferences* (Interference No. 105,393), (Aug. 20, 2007),3 pgs.
"Deposition (video transcript) of Chandrashekhar Joshi, M.D.", *Espiau Exhibit 1234, Board of Patent Appeals and Interferences*(Interference No. 105,393), Merrill Legal Solutions,(Aug. 13, 2007),152 pgs.
"Deposition of Anthony Cooper", *Guthrie Exhibit 2218, Board of Patent Appeals and Interferences* (Interference No. 105,393), (Aug. 9, 2007),27 pgs.
"Deposition of Chandrashekhar J. Joshi", *Espiau Exhibit 1068, Board of Patent Appeals and Interferences*(Interference No. 105,393), (Jul. 7, 2006),139 pgs.
"Deposition of Charles Guthrie", *Guthrie Exhibit 2222, Board of Patent Appeals and Interferences* (Interference No. 105,393), (Aug. 14, 2007),23 pgs.
"Deposition of David B. Turner", *Espiau Exhibit 1237 Board of Patent Appeals and Interferences* (Interference No. 105,393), Merrill Legal Services,(Aug. 20, 2007),201 pgs.
"Deposition of David Smoler", *Guthrie Exhibit 2223, Board of Patent Appeals and Interferences* (Interference No. 105,393), (Aug. 15, 2007),19 pgs.
"Deposition of Dennis R. Nunes", *Guthrie Exhibit 2214, Board of Patent Appeals and Interferences* (Interference No. 105,393), (Aug. 6, 2007),24 pgs.
"Deposition of Donald M. Wilson", *Guthrie Exhibit 2215, Board of Patent Appeals and Interferences* (Interference No. 105,393), (Aug. 6, 2007),77 pgs.
"Deposition of Floyd Pothoven", *Guthrie Exhibit 2219, Board of Patent Appeals and Interferences* (Interference No. 105,393), (Aug. 9, 2007),23 pgs.
"Deposition of Gregory Prior", *Guthrie Exhibit 2216, Board of Patent Appeals and Interferences* (Interference No. 105,393), (Aug. 7, 2007),43 pgs.
"Deposition of Joseph Bennett", *Guthrie Exhibit 2221, Board of Patent Appeals and Interferences* (Interference No. 105,393), (Aug. 12, 2007),17 pgs.
"Deposition of Madhu S. Gupta, Ph.D.", *Guthrie Exhibit 2220, Board of Patent Appeals and Interferences* (Interference No. 105,393), (Aug. 10, 2007),38 pgs.
"Deposition of Shelby Katz", *Guthrie Exhibit 2224, Board of Patent Appeals and Interferences* (Interference No. 105,393), (Aug. 16, 2007),15 pgs.
"Deposition of Vivek Gandhi", *Guthrie Exhibit 2217, Board of Patent Appeals and Interferences* (Interference No. 105,393), (Aug. 8, 2007),14 pgs.
"Diagram", *Guthrie Exhibit 2205, Board of Patent Appeals and Interferences*(Interference. No. 105,393), (No date listed),1 pg.
"Diagram", *Guthrie Exhibit 2200, Board of Patent Appeals and Interferences*(Interference No. 105,393), (No date listed),1 pg.
"Dielectric Resonator Concept for Plasma Lamps", *Espiau Exhibit 1138, Board of Patent Appeals and Interferences*(Interference No. 105,393), (Apr. 20, 2000),5 pgs.
"DRI—Tenco Team Plasma Lamp Business Model", *Espiau Exhibit 1145, Board of Patent Appeals and Interferences*(Interference No. 105,393), (prior to Jul. 30, 2007),1 pgs.
"DRI Schematic", *Espiau Exhibit 1132, Board of Patent Appeals and Interferences*(Interference No. 105,393), (Jul. 30, 2007),2 pgs.
"E-mail to D. Turner et al", *Espiau Exhibit 1228, Board of Patent Appeals and Interferences*(Interference No. 105,393), (May 14, 2002),1 pg.
"E-mail to Espiau re: Lamp Project", *Espiau Exhibit 1226, Board of Patent Appeals and Interferences*(Interference No. 105,393), (Apr. 23, 2002),1 pg.
"E-mail to Espiau re: Meeting", *Espiau Exhibit 1227, Board of Patent Appeals and Interferences*(Interference No. 105,393), (Apr. 26, 2002),1 pg.
"E-mail to Nicola A Pisano", *Guthrie Exhibit 2232, Board of Patent Appeals and Interferences* (Interference No. 105,393), (May 23, 2007),1 pg.
"E-mail to Nicola A Pisano", *Guthrie Exhibit 2233, Board of Patent Appeals and Interferences* (Interference No. 105,393), (Aug. 21, 2007),1 pg.
"E-mail to Wayne Catlett et al, re Lamp Schedule", *Espiau Exhibit 1224, Board of Patent Appeals and Interferences*(Interference No. 105,393), (Jul. 21, 2000),1 pg.
"Errata to the transcript of the Aug. 13, 2007 deposition of Chandrashekhar J. Joshi", *Espiau Exhibit 1235, Board of Patent Appeals and Interferences* (Interference No. 105,393), (Aug. 28, 2007),5 pgs.

"Errata to the transcript of the Aug. 14, 2007 deposition of Charles Guthrie", *Guthrie Exhibit 2238, Board of Patent Appeals and Interferences* (Interference No. 105,393), (Aug. 30, 2007),3 pgs.
"Errata to the transcript of the Aug. 15, 2007 deposition of David Smoler", *Guthrie Exhibit 2237, Board of Patent Appeals and Interferences* (Interference No. 105,393), (Aug. 29, 2007),3 pgs.
"Errata to the transcript of the Aug. 17, 2007 Deposition of Frederick "Matt" Espiau", *Espiau Exhibit 1240, Board of Patent Appeals and Interferences* (Interference No. 105,393), (Aug. 28, 2007),4 pgs.
"Errata to the transcript of the Aug. 20, 2007 Deposition of David B. Turner", *Espiau Exhibit 1238, Board of Patent Appeals and Interferences* (Interference No. 105,393), (Aug. 27, 2007),3 pgs.
"Errata to the transcript of the Aug. 6, 2007 deposition of Donald M. Wilson", *Guthrie Exhibit 2236, Board of Patent Appeals and Interferences* (Interference No. 105,393), (Aug. 29, 2007),3 pgs.
"Errata to the transcript of the Aug. 9, 2007 Deposition of Anthony Cooper", *Guthrie Exhibit 2239, Board of Patent Appeals and Interferences* (Interference No. 105,393), (Aug. 30, 2007),3 pgs.
"Errata to the transcript of the Aug. 9, 2007 of Floyd Pothoven", *Guthrie Exhibit 2235, Board of Patent Appeals and Interferences* (Interference No. 105,393), (Aug. 29, 2007),3 pgs.
"Espiau Motion 7 for Priority", *Guthrie, et al. v. Espiau, et al., Board of Patent Appeals and Interferences* (Interference No. 105,393), (Jul. 30, 2007),94 pgs.
"Espiau notice of deposition for cross examination and intent to vido record the deposition of Dennis Nunes", *Espiau Exhibit 1223, Board of Patent Appeals and Interferences*(Interference No. 105,393), (Aug. 6, 2007),3 pgs.
"Espiau Opposition 7 (to Guthrie Priority Motion 7)", *Espiau, Board of Patent Appeals and Interferences* (Interference No. 105,393), (Aug. 31, 2007),121 pgs.
"Espiau Third Declaration of David B. Turner", *Espiau Exhibit 1233, Board of Patent Appeals and Interferences* (Interference No. 105,393), (Aug. 21, 2007),10 pgs.
"Experiment 1: Cavity Resonator, School of Engineering and Applied Science", *Espiau Exhibit 1026, Board of Patent Appeals and Interferences*(Interference No. 105,393), (Winter, 1995),5 pgs.
"Experiment 3: Cavity Resonator, School of Engineering and Applied Science", *Espiau Exhibit 1025, Board of Patent Appeals and Interferences*(Interference No. 105,393), (Oct. 24, 1990),15 pgs.
"Fifth Declaration of David M. Pozar", *Espiau Exhibit 1183, Board of Patent Appeals and Interferences*(Interference No. 105,393), (Jul. 30, 2007),17 pgs.
"Financial Ledger", *Espiau Exhibit 1241, Board of Patent Appeals and Interferences* (Interference No. 105,393), (1999-2001),3 pgs.
"FWH of U.S. Appl. No. 60/222,028 for Plasma Lamp", *Espiau Exhibit 1012, Board of Patent Appeals and Interferences*(Interference No. 105,393), 28 pgs.
"Graph With Handwritten Notes", *Espiau Exhibit 1155, Board of Patent Appeals and Interferences*(Interference No. 105,393), (prior to Jul. 30, 2007),3 pgs.
"Guthrie Exhibit List", *Espiau, Board of Patent Appeals and Interferences* (Interference No. 105,393), (Aug. 31, 2007),13 pgs.
"Guthrie Opposition 7", *Espiau, Board of Patent Appeals and Interferences* (Interference No. 105,393), (Aug. 31, 2007),122 pgs.
"Handwitten Provisional Draft for An Integrated Lamp Waveguide Concept", *Espiau Exhibit 1031, Board of Patent Appeals and Interferences*(Interference No. 105,393), (Jul. 30, 2007),13 pgs.
"Handwritten Notes re: Discussion with Wayne, Ingmar, David and Chan", *Espiau Exhibit 1207, Board of Patent Appeals and Interferences*(Interference No. 105,393), (prior to Jul. 30, 2007),1 pg.
"http://www.laseraware.com/history.html", *Guthrie Exhibit 2206, Board of Patent Appeals and Interferences*(Interference No. 105,393), (Apr. 11, 2006),1 pg.
"In Re Digital Reflections, Inc.—Chapter 7 Bankruptcy", *Espiau Exhibit 1243, Board of Patent Appeals and Interferences* (Interference No. 105,393), (May 28, 2002),57 pgs.
"Invoice relating to DRI Plasma Lamp Project", *Exhibit 1219, Board of Patent Appeals and Interferences*(Interference No. 105,393), (Jun. 6, 2000),3 pgs.
"IPLDWC Design I Drawings", *Espiau Exhibit 1180, Board of Patent Appeals and Interferences*(Interference No. 105,393), (Jul. 14, 2000),2 pgs.

"Luxim Corporation Project Summit", *Guthrie Exhibit 2201, Board of Patent Appeals and Interferences*(Interference No. 105,393), (Jun. 17, 2007),20 pgs.
"MasterCard Statement—TravelersBank", *Espiau Exhibit 1027, Board of Patent Appeals and Interferences*(Interference No. 105,393), (Apr. 2000),1 pgs.
"May 21, 2007 Hearing", *Guthrie Exhibit 2231, Board of Patent Appeals and Interferences* (Interference No. 105,393), (May 21, 2007),33 pgs.
"Miscellaneous Handwritten Notes", *Espiau Exhibit 1213, Board of Patent Appeals and Interferences*(Interference No. 105,393), (prior to Jul. 30, 2007),1 pg.
"Miscellaneous Handwritten Notes", *Espiau Exhibit 1189, Board of Patent Appeals and Interferences*(Interference No. 105,393), (Jul. 28, 2000),2 pgs.
"Miscellaneous Handwritten Notes", *Espiau Exhibit 1153, Board of Patent Appeals and Interferences*(Interference No. 105,393), (May 3, 2000),4 pgs.
"Miscellaneous Handwritten Notes", *Espiau Exhibit 1137, Board of Patent Appeals and Interferences*(Interference No. 105,393), (Apr. 20, 2000),3 pgs.
"Miscellaneous Handwritten Notes", *Espiau Exhibit 1169, Board of Patent Appeals and Interferences*(Interference No. 105,393), (Jun. 12, 2000),1 pg.
"Miscellaneous Handwritten Notes", *Espiau Exhibit 1190, Board of Patent Appeals and Interferences*(Interference No. 105,393), (Jul. 28, 2000),2 pgs.
"Notebook Pages from Matt Espiau", *Espiau Exhibit 1127, Board of Patent Appeals and Interferences*(Interference No. 105,393), (Apr. 27, 2000),13 pgs.
"Notebook Pages from Yian Chang", *Espiau Exhibit 1126, Board of Patent Appeals and Interferences*(Interference No. 105,393), (Aug. 2000),57 pgs.
"Notes", *Espiau Exhibit 1229, Board of Patent Appeals and Interferences*(Interference No. 105,393), (May 14, 2002),2 pgs.
"Notes from Meeting withh Joshi, Turner, Espiau regarding Review of Samples", *Espiau Exhibit 1209, Board of Patent Appeals and Interferences*(Interference No. 105,393), (Aug. 8, 2000),2 pgs.
"Notes re: Alumina Puck and Testing of Puck", *Espiau Exhibit 1125, Board of Patent Appeals and Interferences*(Interference No. 105,393), (Aug. 8, 2000),143 pgs.
"Notes Regarding Lighting of Lamp", *Espiau Exhibit 1210, Board of Patent Appeals and Interferences*(Interference No. 105,393), (Aug. 12, 2000),1 pg.
"Patent Disclosure Summary", *Espiau Exhibit 1225, Board of Patent Appeals and Interferences*(Interference No. 105,393), (Apr. 22, 2000),4 pgs.
"Photo", *Guthrie Exhibit 2207, Board of Patent Appeals and Interferences*(Interference No. 105,393), (No date listed),1 pg.
"Photo", *Guthrie Exhibit 2208, Board of Patent Appeals and Interferences*(Interference No. 105,393), (No date listed),1 pg.
"Photo", *Guthrie Exhibit 2213, Board of Patent Appeals and Interferences*(Interference No. 105,393), (Aug. 20, 2007),1 pg.
"Photograph", *Espiau Exhibit 1222, Board of Patent Appeals and Interferences*(Interference No. 105,393), (prior to Jul. 30, 2007),1 pgs.
"Photograph", *Espiau Exhibit 1221, Board of Patent Appeals and Interferences*(Interference No. 105,393), (prior to Jul. 30, 2007),1 pg.
"Schematic", *Espiau Exhibit 1173, Board of Patent Appeals and Interferences*(Interference No. 105,393), (prior to Jul. 30, 2007),1 pg.
"Schematic re: Plasma Lamp Concept", *Espiau Exhibit 1150, Board of Patent Appeals and Interferences*(Interference No. 105,393), (prior to Jul. 30, 2007),1 pg.
"Schematics re: Retangular Waveguide", *Espiau Exhibit 1166, Board of Patent Appeals and Interferences*(Interference No. 105,393), (Jun. 6, 2000),2 pgs.
"Second Declaration of Carl W. Pobanz", *Espiau Exhibit 1054, Board of Patent Appeals and Interferences*(Interference No. 105,393), (May 20, 2006),3 pgs.
"Second Declaration of Chandrashekhar J. Joshi", *Espiau Exhibit 1160, Board of Patent Appeals and Interferences*(Interference No. 105,393), (Jul. 29, 2007),15 pgs.

"Second Declaration of David B. Turner", *Espiau Exhibit 1158, Board of Patent Appeals and Interferences*(Interference No. 105,393), (Jul. 24, 2007),19 pgs.
"Sixth Declaration of David M. Pozar", *Espiau Exhibit 1254, Board of Patent Appeals and Interferences* (Interference No. 105,393), (Aug. 31, 2007),15 pgs.
"Sound Deposition Services, Inc., Guthrie vs. Espiau: Exhibit 1211", *Guthrie Exhibit 2226, Board of Patent Appeals and Interferences* (Interference No. 105,393), (Aug. 23, 2007),14 pgs.
"The Center for High Frequency Electronics", *Guthrie Exhibit 2228, Board of Patent Appeals and Interferences* (Interference No. 105,393), http://www.chfe.ee.ucla.edu/8/26/2007,(2007),1 pg.
"Trip Report—Chan, Don, Matt", *Espiau Exhibit 1220, Board of Patent Appeals and Interferences*(Interference No. 105,393), (Jul. 30, 2007),1 pg.
"Turner Engineering Purchase Order T62801 / Trade References / T. Weaver's Quote", *Espiau Exhibit 1175, Board of Patent Appeals and Interferences*(Interference No. 105,393), (prior to Jul. 30, 2007),3 pgs.
"United States Securities and Exchange Commission Form D", *Guthrie Exhibit 2202, Board of Patent Appeals and Interferences*(Interference No. 105,393), (May 16, 2007),6 pgs.
Brougher, S. , "E-Mail to D. Turner re: Lamp Project Schedule", *Espiau Exhibit 1146, Board of Patent Appeals and Interferences*(Interference No. 105,393), (Apr. 17, 2000),1 pg.
Catlett, W. , "E-Mail to D. Turner re: DRI Luxim Waveguide Project", *Espiau Exhibit 1186, Board of Patent Appeals and Interferences*(Interference No. 105,393), (Jul. 22, 2000),2 pgs.
Chang, Y. , "E-Mail to D. Turner enclosing June Invoice", *Espiau Exhibit 1177, Board of Patent Appeals and Interferences*(Interference No. 105,393), (Jul. 5, 2000),2 pgs.
Chang, Y. , "E-Mail to D. Turner re: Time and Expenses for July", *Espiau Exhibit 1204, Board of Patent Appeals and Interferences*(Interference No. 105,393), (Aug. 1, 2000),14 pgs.
Chang, Y. , "E-Mail to Espiau re: Integrated Lamp Waveguide Concept", *Espiau Exhibit 1192, Board of Patent Appeals and Interferences*(Interference No. 105,393), (Jul. 24, 2000),1 pg.
Chang, Y. , "E-Mail to Espiau re: Lamp Assy. Figures", *Espiau Exhibit 1201, Board of Patent Appeals and Interferences*(Interference No. 105,393), (Jul. 30, 2000),3 pgs.
Chang, Y. , "E-Mail to J. Chandrashekhar, et al. re: Integrated Lamp Waveguide Concept", *Espiau Exhibit 1200, Board of Patent Appeals and Interferences*(Interference No. 105,393), (Jul. 30, 2000),1 pg.
Chang, Y. , "E-Mail to M. Espiau re: Drawings", *Espiau Exhibit 1181, Board of Patent Appeals and Interferences*(Interference No. 105,393), (Jul. 16, 2000),1 pg.
Chang, Y. , "E-Mail to M. Espiau re: Integrated Lamp Waveguide Concept w/Lastest Revisions With Drawings", *Espiau Exhibit 1198, Board of Patent Appeals and Interferences*(Interference No. 105,393), (Jul. 27, 2000),1 pg.
Chang, Y. , "E-Mail to M. Espiau re: New Figures / Patent Drawings", *Espiau Exhibit 1194, Board of Patent Appeals and Interferences*(Interference No. 105,393), (Jul. 25, 2000),1 pg.
Chang, Y. , "E-Mail to M. Espiau re: Figures / Patent Drawings", *Espiau Exhibit 1193, Board of Patent Appeals and Interferences*(Interference No. 105,393), (Jul. 25, 2000),1 pg.
Chang, Y. , "E-Mail to M. Espiau, et al. re: Integrated Lamp Waveguide Concept w/ Latest Revisions With Drawings", *Espiau Exhibit 1196, Board of Patent Appeals and Interferences*(Interference No. 105,393), (Jul. 26, 2000),1 pg.
Chang, Y. , "Notes re: The Integrated Dielectric Waveguide Plasma Lamp Concept", *Espiau Exhibit 1152, Board of Patent Appeals and Interferences*(Interference No. 105,393), (2000),32 pgs.
Espiau, M. , "E-Mail to D. Turner re: Three Phase Service", *Espiau Exhibit 1176, Board of Patent Appeals and Interferences*(Interference No. 105,393), Jun. 29, 2000),2 pgs.
Espiau, M. , "E-Mail to Y. Chang re: Integrated Lamp Waveguide Concept", *Espiau Exhibit 1199, Board of Patent Appeals and Interferences*(Interference No. 105,393), (Jul. 28, 2000),1 pgs.
Espiau, M. , "E-Mail to Y. Chang, et al. re: Integrated Lamp Waveguide Concept", *Espiau Exhibit 1195, Board of Patent Appeals and Interferences*(Interference No. 105,393), (Jul. 26, 2000),1 pg.
Espiau, M. , "E-Mail to Y. Chang, et al. re: Integrated Lamp Waveguide Concept", *Espiau Exhibit 1191, Board of Patent Appeals and Interferences*(Interference No. 105,393), (Jul. 24, 2000),1 pg.
Espiau, M. , "E-Mail to Y. Chang, et al. re: Integrated Lamp Waveguide Concept", *Espiau Exhibit 1182, Board of Patent Appeals and Interferences*(Interference No. 105,393), (Jul. 16, 2000),1 pg.
Espiau, M. , "E-Mail to Y. Chang, et al. re: Integrated Lamp Waveguide Concept", *Espiau Exhibit 1179, Board of Patent Appeals and Interferences*(Interference No. 105,393), (Jul. 13, 2000),1 pg.
Guthrie, C. , "E-Mail to D. Turner re: Amplifier for Development", *Espiau Exhibit 1144, Board of Patent Appeals and Interferences*(Interference No. 105,393), (May 6, 2000),1 pg.
Guthrie, C. , "E-Mail to D. Turner re: Dielectric Constants from Trans Tech", *Espiau Exhibit 1154, Board of Patent Appeals and Interferences*(Interference No. 105,393), (May 6, 2000),1 pg.
Guthrie, C. , "E-Mail to D. Turner re: Visit / Potential Meeting", *Espiau Exhibit 1156, Board of Patent Appeals and Interferences*(Interference No. 105,393), (May 6, 2000),1 pg.
Ishii, T. K., "Microwave Engineering (Second Edition)", *Guthrie Exhibit 2204, Board of Patent Appeals and Interferences*(Interference No. 105,393), (1989),3 pgs.
Ishii, T. K., "Microwave Engineering (Second Edition)", *Espiau Exhibit 1232, Board of Patent Appeals and Interferences*(Interference No. 105,393), (1989),3 pgs.
Joshi, C. , "E-Mail to M. Espiau re: ILWC Patent Paper", *Espiau Exhibit 1178, Board of Patent Appeals and Interferences*(Interference No. 105,393), (Jul. 13, 2000),2 pgs.
Mullen, D. , "E-Mail to D. Turner re: DRI Meeting", *Espiau Exhibit 1139, Board of Patent Appeals and Interferences*(Interference No. 105,393), (Apr. 20, 2000),1 pg.
Mullen, D. , "E-Mail to Joshi, et al. re: First Pass Thermal Model of Lamp Housing (attaching plasma lamp geometry)", *Espaiu Exhibit 1151, Board of Patent Appeals and Interferences*(Interference No. 105,393), (May 1, 2000),2 pgs.
Pozar, David M., "Microwave Engineering, Third Edition", *Espiau Exhibit 1250, Board of Patent Appeals and Interferences* (Interference No. 105,393), From Chapter 2,(2005),10 pgs.
Pozar, David M., "Microwave Engineering, Third Edition", *Espiau Exhibit 1251, Board of Patent Appeals and Interferences* (Interference No. 105,393), Chapter 5—Impedance Matching and Tuning,(2005),46 pgs.
Pozar, David M., "Microwave Engineering, Third Edition", *Espiau Exhibit 1252, Board of Patent Appeals and Interferences* (Interference No. 105,393), Chapter 6, Microwave Resonators,(2005),14 pgs.
Rizzi, Peter A., "Microwave Engineering Passive Circuits", *Espiau Exhibit 1231, Board of Patent Appeals and Interferences*(Interference No. 105,393), (1988),4 pgs.
Turner, D. , "E-Mail to D. Mullen confirming DRI Meeting", *Espiau Exhibit 1136, Board of Patent Appeals and Interferences*(Interference No. 105,393), (Apr. 18, 2000),1 pg.
Turner, D. , "E-Mail to C. Joshi re: Property Info", *Espiau Exhibit 1143, Board of Patent Appeals and Interferences*(Interference No. 105,393), (Apr. 25, 2000),2 pgs.
Turner, D. , "E-Mail to C. Joshi, et al. re: DRI—Resume, etc.", *Espiau Exhibit 1142, Board of Patent Appeals and Interferences*(Interference No. 105,393), (Apr. 24, 2000),3 pgs.
Turner, D. , "E-Mail to C. Joshi, et al. re: Material Specification", *Espiau Exhibit 1167, Board of Patent Appeals and Interferences*(Interference No. 105,393), (Jun. 9, 2000),3 pgs.
Turner, D. , "E-Mail to J. Joshi, et al. re: DRI / Luxim Agreements", *Espiau Exhibit 1170, Board of Patent Appeals and Interferences*(Interference No. 105,393), (Jun. 20, 2000),14 pgs.
Turner, D. , "E-Mail to C. Joshi, et al. re: First Dielectric Donut Tests", *Espiau Exhibit 1165, Board of Patent Appeals and Interferences*(Interference No. 105,393), (Jun. 8, 2000),1 pg.
Turner, D. , "E-Mail to D. Mullen re: Dielectric Constants from Trans Tech", *Espiau Exhibit 1157, Board of Patent Appeals and Interferences*(Interference No. 105,393), (May 6, 2000),1 pg.
Turner, D. , "E-Mail to S. Brougher re: DRI Plasma Lamp Schedule Update", *Espiau Exhibit 1147, Board of Patent Appeals and Interferences*(Interference No. 105,393), (Apr. 28, 2000),1 pg.

Turner, D., "E-Mail to S. Brougher re: Lamp Schedule", *Espiau Exhibit 1184, Board of Patent Appeals and Interferences*(Interference No. 105,393), (Jul. 19, 2000),5 pgs.

Turner, D., "E-Mail to S. Brougher, et al. re: DRI Luxim Waveguide Schedule", *Espiau Exhibit 1206, Board of Patent Appeals and Interferences*(Interference No. 105,393), (Aug. 2, 2000),5 pgs.

Turner, D., "E-Mail to W. Catlett re: DRI—Luxim Business Structure", *Espiau Exhibit 1214, Board of Patent Appeals and Interferences*(Interference No. 105,393), (Aug. 29, 2000),2 pgs.

Turner, D., "E-Mail to W. Catlett re: DRI Luxim License Business Structure", *Espiau Exhibit 1217, Board of Patent Appeals and Interferences*(Interference No. 105,393), (Sep. 13, 2000),2 pgs.

Turner, D., "E-Mail to W. Catlett re: DRI Plasma Lamp Business Meeting", *Espiau Exhibit 1149, Board of Patent Appeals and Interferences*(Interference No. 105,393), (Apr. 28, 2000),6 pgs.

Turner, D., "E-Mail to W. Catlett re: DRI-Tenco Product Development—Next Steps", *Espiau Exhibit 1161, Board of Patent Appeals and Interferences*(Interference No. 105,393), (May 12, 2000),7 pgs.

Turner, D., "E-Mail to W. Catlett re: Plasma Lamp Project", *Espiau Exhibit 1163, Board of Patent Appeals and Interferences*(Interference No. 105,393), (May 22, 2000),1 pg.

Turner, D., "E-Mail to W. Catlett re: DRI—Luxim License Business Structure", *Espiau Exhibit 1215, Board of Patent Appeals and Interferences*(Interference No. 105,393), (Sep. 11, 2000),2 pgs.

Turner, D., "E-Mail to W. Catlett re: DRI—Luxim License Framework", *Espiau Exhibit 1216, Board of Patent Appeals and Interferences*(Interference No. 105,393), (Sep. 11, 2000),2 pgs.

Turner, D., "Memorandum to G. Prior re: Tenco Proposal to Develop a Plasma Lamp Excitor and Waveguide", *Espiau Exhibit 1134, Board of Patent Appeals and Interferences*(Interference No. 105,393), (Apr. 14, 2000),7 pgs.

Turner, D., "Memorandum to G. Prior re: Tenco Engineering Serviice for Digital Reflection", *Espiau Exhibit 1130, Board of Patent Appeals and Interferences*(Interference No. 105,393), (Mar. 31, 2000),10 pgs.

Turner, D., "Memorandum to J. Legge re: Production Engineering for DRI Components", *Espiau Exhibit 1133, Board of Patent Appeals and Interferences*(Interference No. 105,393), (Mar. 31, 2000),5 pgs.

Turner, D., "Memorandum to T. Alton re: Issuing Purchase Order to Kyocera", *Espiau Exhibit 1172, Board of Patent Appeals and Interferences*(Interference No. 105,393), (Jun. 22, 2000),5 pgs.

Turner, D., "Memorandum to W. Catlett re: Business Structures for Joint DRI—Luxim Development", *Espiau Exhibit 1212, Board of Patent Appeals and Interferences*(Interference No. 105,393), (Aug. 10, 2000),3 pgs.

Turner, D., "Memorandum to W. Catlett re: Non-Disclosure Agreement and Interim Product Development Agreement", *Espiau Exhibit 1174, Board of Patent Appeals and Interferences*(Interference No. 105,393), (Jun. 23, 2000),12 pgs.

Turner, D., "Memorandum to W. Catlett re: Termination of Development Activities relating to Projection Light Engine Waveguide Development", *Espiau Exhibit 1218, Board of Patent Appeals and Interferences*(Interference No. 105,393), (Nov. 3, 2000),1 pg.

Turner, D., "Notes", *Espiau Exhibit 1131, Board of Patent Appeals and Interferences*(Interference No. 105,393), (Apr. 11, 2000),3 pgs.

Turner, "Notes", *Espiau Exhibit 1128, Board of Patent Appeals and Interferences*(Interference No. 105,393), (Mar. 6,2000),1 pg.

Turner, "Notes", *Espiau Exhibit 1129, Board of Patent Appeals and Interferences*(Interference No. 105,393), (Mar. 8, 2000),1 pg.

Turner, "Notes", *Espiau Exhibit 1135, Board of Patent Appeals and Interferences*(Interference No. 105,393), (Apr. 17, 2000),3 pgs.

Turner, "Notes", *Espiau Exhibit 1141, Board of Patent Appeals and Interferences*(Interference No. 105,393), (Apr. 24, 2000),2 pgs.

Turner, "Notes", *Espiau Exhibit 1148, Board of Patent Appeals and Interferences*(Interference No. 105,393), (May 1, 2000),1 pg.

Turner, "Notes from the Jun. 21, 2000 Meeting", *Espiau Exhibit 1171, Board of Patent Appeals and Interferences*(Interference No. 105,393), (Jun. 21, 2000),6 pgs.

Turner, "Notes re: DRI Plasma Light from the the May 9, 2000 Meeting", *Espiau Exhibit 1159, Board of Patent Appeals and Interferences*(Interference No. 105,393), (May 9, 2000),3 pgs.

"Amended Assignment and Bill of Sale", *Guthrie Exhibit 2148, Board of Patent Appeals and Interferences* (Interference No. 105,393), (Jan. 12, 2007), 1 pg.

"Chapter 6.3—Rectangular Waveguide Cavities in: Microwave Engineering, Pozar, D. M., Editor (John Wiley & Sons, Inc.)", *Guthrie Exhibit 2143, Board of Patent Appeals and Interferences* (Interference No. 105,393), 313-318.

"Collection of Correspondence", *Guthrie Exhibit 2163, Board of Patent Appeals and Interferences* (Interference No. 105,393), (2000),23 pgs.

"Coors Tek Engineering Drawings", *Guthrie Exhibit 2142, Board of Patent Appeals and Interferences* (Interference No. 105,393), (Aug. 10, 200),6 pgs.

CoorsTek Invoice No. 1016307, *Guthrie Exhibit 2140, Board of Patent Appeals and Interferences* (Interference No. 105,393), (Oct. 12, 2000), 1 pg.

CoorsTek Invoice No. 1017845, *Guthrie Exhibit 2141, Board of Patent Appeals and Interferences* (Interference No. 105,393, (Oct. 18, 2001), 1 pg.

"Decision—Motions—Bd. R. 125(a) (Paper 83)", *Guthrie, et al. v. Espiau, et al., Board of Patent Appeals and Interferences* (Interference No. 105,393), (Feb. 27, 2007),51 pgs.

"Decision—On Rehearing—Bd. R. 125(c) (Paper 89)", *Guthrie, et al. v. Espiau, et al., Board of Patent Appeals and Interferences* (Interference No. 105,393), (Mar. 20, 2007), 13 pgs.

Decision—Rehearing—Bd. R. 127(d) (Paper 94), *Guthrie, et al. v. Espiau, et al., Board of Patent Appeals and Interferences* (Interference No. 105,393), (Apr. 18, 2007),5 pgs.

"Declaration of David Smoler", *Guthrie Exhibit 2136, Board of Patent Appeals and Interferences*(Interference No. 105,393), (Dec. 5, 2005), 17 pgs.

"Declaration of Donald M. Wilson (Corrected)", *Espiau Exhibit 1106, Board of Patent Appeals and Interferences*(Interference No. 105,393), (Dec. 12, 2005),3 pgs.

"Declaration of Tim R. Russell", *Guthrie Exhibit 2145, Board of Patent Appeals and Interferences* (Interference No. 105,393), (Feb. 1, 2006),3 pgs.

"Draft of Charles Guthries' Expense Report", *Guthrie Exhibit 2192, Board of Patent Appeals and Interferences* (Interference No. 105,393), (May 10, 2000),2 pgs.

"E-Mail between C. Guthrie and C. Lee", *Guthrie Exhibit 2167, Board of Patent Appeals and Interferences* (Interference No. 105,393), (2000),6 pgs.

"E-Mails Between T. Russell and T. Kearney", *Guthrie Exhibit 2187, Board of Patent Appeals and Interferences* (Interference No. 105,393), (2006),7 pgs.

"Engineering Sketches (faxed to Coorstek)", *Guthrie Exhibit 2137, Board of Patent Appeals and Interferences*(Interference No. 105,393), (Jul. 20, 2000),2 pgs.

"Espiau Declaration of Janet Brant", *Espiau Exhibit 1118, Board of Patent Appeals and Interferences*(Interference No. 105,393), (May 25, 2007), 3 pgs.

"Espiau Declaration of Matthew A. Argenti", *Espiau Exhibit 1121, Board of Patent Appeals and Interferences*(Interference No. 105,393), (May 28, 2007),3 pgs.

"Espiau Declaration of Michael J. Murphy", *Espiau Exhibit 1120, Board of Patent Appeals and Interferences*(Interference No. 105,393), (May 29, 2007),4 pgs.

"Espiau Declaration of Terry Kearney", *Espiau Exhibit 1122, Board of Patent Appeals and Interferences*(Interference No. 105,393), (May 28, 2007),6 pgs.

"Espiau Declaration of W. Benjamin Glenn", *Espiau Exhibit 1119, Board of Patent Appeals and Interferences*(Interference No. 105,393), (May 28, 2007),8 pgs.

"Espiau Miscellaneous Motion 6 (Request for Rehearing of Espiau's Request for Leave to Prove Derivation by Guthrie)", *Guthrie, et al. v. Espiau, et al., Board of Patent Appeals and Interferences* (Interference No. 105,393), (Mar. 22, 2007), 11 pgs.

"Espiau Opposition 6", *Guthrie, et al. v. Espiau, et al.* (Interference No. 105,393), (May 29, 2007),31 pgs.

"Guthrie Declaration of Anthony Cooper", *Guthrie Exhibit 2184, Board of Patent Appeals and Interferences* (Interference No. 105,393), (Jun. 14, 2007),6 pgs.

"Guthrie Declaration of Dennis R. Nunes", *Guthrie Exhibit 2199, Board of Patent Appeals and Interferences* (Interference No. 105,393), 3 pgs.
"Guthrie Declaration of Floyd Pothoven", *Guthrie Exhibit 2183, Board of Patent Appeals and Interferences* (Interference No. 105,393), (Jun. 15, 2007), 5 pgs.
"Guthrie Declaration of Joe Bennett", *Guthrie Exhibit 2186, Board of Patent Appeals and Interferences* (Interference No. 105,393), (Jun. 14, 2007), 5 pgs.
"Guthrie Declaration of Shelby Katz", *Guthrie Exhibit 2144, Board of Patent Appeals and Interferences* (Interference No. 105,393), (May 24, 2007), 3 pgs.
"Guthrie Declaration of Vivek Gandhi", *Guthrie Exhibit 2164, Board of Patent Appeals and Interferences* (Interference No. 105,393), (May 18, 2007), 3 pgs.
"Guthrie Fifth Declaration of Madhu S. Gupta, Ph.D.", *Guthrie Exhibit 2182, Board of Patent Appeals and Interferences* (Interference No. 105,393), (Jun. 14, 2007), 23 pgs.
"Guthrie Miscellaneous Motion 6 (To Compel Testimony of Tim Russell)", *Guthrie, et al. v. Espiau, et al., Board of Patent Appeals and Interferences* (Interference No. 105,393), (May 23, 2006), 23 pgs.
"Guthrie Miscellaneous Motion 6 (Request for Rehearing)", *Guthrie, et al. v. Espiau, et al., Board of Appeals and Interferences* (Interference No. 105,393), (Mar. 13, 2007), 11 pgs.
"Guthrie Opposition 6 (Opposing Espiau Motion 6 to Request Rehearing)", *Guthrie, et al. v. Espiau, et al., Board of Patent Appeals and Interferences* (Interference No. 105,393), (Apr. 3, 2007), 12 pgs.
"Guthrie Priority Motion 7", *Guthrie, et al. v. Espiau, et al., Board of Patent Appeals and Interferences* (Interference No. 105,393), (Jun. 15, 2007), 81 pgs.
"Guthrie Second Declaration of Charles Guthrie", *Guthrie Exhibit 2180, Board of Patent Appeals and Interferences* (Interference No. 105,393), (Jun. 14, 2007), 12 pgs.
"Guthrie Second Declaration of David E. Smoler", *Guthrie Exhibit 2150, Board of Patent Appeals and Interferences* (Interference No. 105,393), (May 21, 2007), 8 pgs.
"Guthrie Third Declaration of Donald Wilson", *Guthrie Exhibit 2181, Board of Patent Appeals and Interferences* (Interference No. 105,393), (Jun. 13, 2007), 22 pgs.
"Guthrie Third Declaration of Greg Prior", *Guthrie Exhibit 2185, Board of Patent Appeals and Interferences* (Interference No. 105,393), (Jun. 15, 2007), 11 pgs.
"Guthrie Third Declaration of Nicola Pisano", *Guthrie Exhibit 2189, Board of Patent Appeals and Interferences* (Interference No. 105,393), (May 23, 2007), 8 pgs.
"Manufacturing Order Documentation Form", *Guthrie Exhibit 2139, Board of Patent Appeals and Interferences* (Interference No. 105,393), (Aug. 8, 2000), 3 pgs.
"Manufacturing Quote from Coorstek", *Guthrie Exhibit 2138, Board of Patent Appeals and Interferences* (Interference No. 105,393), (Jul. 27, 2000), 2 pgs.
"Petition to Correct Inventorship in U.S. Appl. No. 09/818,092, filed Mar. 26, 2001", *Guthrie Exhibit 2166, Board of Patent Appeals and Interferences* (Interference No. 105,393), (Dec. 22, 2004), 21 pgs.
"Photograph of Lighted Half-Wavelength", *Guthrie Exhibit 2178, Board of Patent Appeals and Interferences* (Interference No. 105,393), (2002), 2 pgs.
"Photographs of CoorsTek Full Wavelength Ceramic Waveguide", *Guthrie Exhibit 2162, Board of Patent Appeals and Interferences* (Interference No. 105,393), 1 pg.
"Smoler Voicemail Transcript", *Espiau Exhibit 1109, Board of Patent Appeals and Interferences* (Interference No. 105,393), (Nov. 21, 2005), 1 pg.
"Transcript of Deposition of Tim Russell", *Exhibit 2198, Board of Patent Appeals and Interferences* (Interference No. 105,393), (Jun. 6, 2007), 79 pgs.
"Wilson Handwritten Notes", *Espiau Exhibit 1107, Board of Patent Appeals and Interferences* (Interference No. 105,393), (Nov. 7, 2005), 2 pgs.
"Wilson Handwritten Notes", *Espiau Exhibit 1108, Board of Patent Appeals and Interferences* (Interference No. 105,393), (Nov. 15, 2005), 11 pgs.

"Wilson Technical Consulting Agreement", *Espiau Exhibit 1105, Board of Patent Appeals and Interferences* (Interference No. 105,393), (Oct. 17, 2005), 2 pgs.
Bennett, J., "E-Mail to C. Guthrie Re: Kyocera Quote for Waveguide Samples", *Guthrie Exhibit 2176, Board of Patent Appeals and Interferences* (Interference No. 105,393), (Jul. 10, 2000), 1 pg.
Brant, J., "E-Mail to Tony McGettigan", *Espiau Exhibit 1104, Board of Patent Appeals and Interferences* (Interference No. 105,393), (Oct. 20, 2005), 1 pg.
Guthrie, C., "Collection of Waveguide Drawings", *Guthrie Exhibit 2169, Board of Patent Appeals and Interferences* (Interference No. 105,393), (2000), 7 pgs.
Guthrie, C., "D.R.I. Drawing—Ceramic Substrate (SMPL004)", *Guthrie Exhibit 2171, Board of Patent Appeals and Interferences* (Interference No. 105,393), (Jun. 19, 2000), 1 pg.
Guthrie, C., "D.R.I. Drawing—Dielectric Test Sample", *Guthrie Exhibit 2154, Board of Patent Appeals and Interferences* (Interference No. 105,393), (Apr. 26, 2000), 1 pg.
Guthrie, C., "D.R.I. Drawing—High Bright Picture Element (WGC006)", *Guthrie Exhibit 2170, Board of Patent Appeals and Interferences* (Interference No. 105,393), (Jun. 14, 2000), 1 pg.
Guthrie, C., "D.R.I. Drawing—Wave Guide Lamp Concept 3d (WGC003)", *Guthrie Exhibit 2175, Board of Patent Appeals and Interferences* (Interference No. 105,393), (Jul. 3, 2000), 1 pg.
Guthrie, C., "D.R.I. Drawings—R. F. Connector Details (Versions 1 and 2)", *Guthrie Exhibit 2174, Board of Patent Appeals and Interferences* (Interference No. 105,393), (2000), 2 pgs.
Guthrie, C., "D.R.I. Drawings—Wave Guide Lamp Concept 5 (WGC005); Wave Guide Lamp Concept 6 (WGC006); and Wave Guide Concept 7 (WGC007)", *Guthrie Exhibit 2172, Board of Patent Appeals and Interferences* (Interference No. 105,393), (Jun. 27, 2000), 3 pgs.
Guthrie, C., "D.R.I. Drawings—Wave Guide Lamp Concept 8 (WGC008); Wave Guide Lamp Concept 9 (WGC009); and Wave Guide Lamp Concept 10 (WGC010)", *Guthrie Exhibit 2173, Board of Patent Appeals and Interferences* (Interference No. 105,393), (Jun. 28, 2000), 3 pgs.
Guthrie, C., "E-Mail to E. Sandberg, et al. re: Meeting at ITW", *Guthrie Exhibit 2179, Board of Patent Appeals and Interferences* (Interference No. 105,393), (Mar. 23, 2000), 2 pgs.
Joshi, C., "E-Mail to C. Guthrie", *Guthrie Exhibit 2177, Board of Patent Appeals and Interferences* (Interference No. 105,393), (Jul. 13, 2000), 1 pg.
Russell, T., "E-Mail to N. Pisano (Guthrie's Counsel) Re: DRI Patent Application", *Guthrie Exhibit 2188, Board of Patent Appeals and Interferences* (Interference No. 105,393), (May 19, 2007), 2 pgs.
Smoler, D., "E-Mail to C. Guthrie re: Ridged Waveguide Ideas", *Gutrhie Exhibit 2149, Board of Patent Appeals and Interferences* (Interference No. 105,393), (Jun. 27, 2000), 2 pgs.
Turner, D., "E-Mail to C. Guthrie re: Dielectric Constants from Trans Tech", *Guthrie Exhibit 2168, Board of Patent Appeals and Interferences* (Interference No. 105,393), (May 7, 2000), 1 pg.
Turner, D., "E-Mail to D. Wilson and C. Guthrie (attaching Lamp Plasma Schedule)", *Guthrie Exhibit 2197, Board of Patent Appeals and Interferences* (Interference No. 105,393), (Jun. 28, 2000), 3 pgs.
Turner, D., "E-Mail to D. Wilson and C. Guthrie re: Wavelength Project List (attaching Updated Contact List)", *Guthrie Exhibit 2159, Board of Patent Appeals and Interferences* (Interference No. 105,393), (Jul. 6, 2000), 3 pgs.
Turner, D., et al., "E-Mail to D. Wilson, et al. Re: DRI Plasma Lamp—Updated Address List", *Guthrie Exhibit 2152, Board of Patent Appeals and Interferences* (Interference No. 105,393), (Apr. 24, 2000), 3 pgs.
Turner, D., "E-Mail to G. Prior Re: DRI Tasks", *Guthrie Exhibit 2165, Board of Patent Appeals and Interferences* (Interference No. 105,393), (Apr. 10, 2000), 2 pgs.
Turner, D., "E-Mail to G. Prior, et al. Re: Action Item List", *Guthrie Exhibit 2157, Board of Patent Appeals and Interferences* (Interference No. 105,393), (Jun. 28, 2000), 2 pgs.
Turner, D., "E-Mail to G. Prior, et al. Re: DRI Plasma Lamp Schedule Update", *Guthrie Exhibit 2156, Board of Patent Appeals and Interferences* (Interference No. 105,393), (Apr. 28, 2000), 4 pgs.

Turner, D., "E-Mail to G. Prior, et al. Re: Proposal to Develop Plasma Lamp Exciter and Waveguide", *Guthrie Exhibit 2151, Board of Patent Appeals and Interferences* (Interference No. 105,393), (Apr. 16, 2000),8 pgs.

Turner, D., "E-Mail to G. Prior, et al. Re: DRI Plasma Lamp—Laser Bonding", *Guthrie Exhibit 2153, Board of Patent Appeals and Interferences* (Interference No. 105,393), (Apr. 26, 2000),2 pgs.

Turner, D., et al., "E-Mail to J. Chan, et al. Re: Waveguide Meeting", *Guthrie Exhibit 2195, Board of Patent Appeals and Interferences* (Interference No. 105,393), (Jun. 2, 2000), 1 pg.

Turner, D., "E-Mail to W. Catlett", *Guthrie Exhibit 2160, Board of Patent Appeals and Interferences* (Interference No. 105,393), (Jul. 17, 2000), 2 pgs.

Turner, D., et al., "E-Mail to W. Catlett Re: Lamp Project Budget", *Guthrie Exhibit 2194, Board of Patent Appeals and Interferences* (Interference No. 105,393), (Jun. 1, 2000), 4 pgs.

Turner, D., "E-Mail to W. Catlett Re: Office/Lab and Deposit Account for Lamp Project", *Guthrie Exhibit 2193, Board of Patent Appeals and Interferences* (Interference No. 105,393), (May 31, 2000),2 pgs.

Turner, D., "E-Mail to W. Catlett re: Luxim Waveguide Status Update", *Guthrie Exhibit 2158, Board of Patent Appeals and Interferences* (Interference No. 105,393), (Jul. 6, 2000),3 pgs.

Turner, D., "E-Mail to W. Catlett re: Waveguide Lamp Status Report", *Guthrie Exhibit 2161, Board of Patent Appeals and Interferences* (Interference No. 105,393), (Aug. 1, 2000),2 pgs.

Turner, D., "E-Mail to W. Catlett, et al. Re: Luxim Waveguide Status and Meeting", *Guthrie Exhibit 2196, Board of Patent Appeals and Interferences* (Interference No. 105,393), (Jun. 26, 2000),2 pgs.

Pisano, N.; Guthrie Miscellaneous Motion 6 (Request for Rehearing) dated Mar. 13, 2007 (11 pp), submitted to the USPTO in Patent Interference No. 105,393.

Decision—Motions—Bd. R. 125(a) (Paper 83) filed Feb. 27, 2007 (51 pp) by Trial Division Merits Panel (USPTO) in Patent Interference No. 105,393.

Decision—On Rehearing—Bd. R. 125(c) (Paper 89) filed Mar. 20, 2007 (13 pp) by Trial Division Merits Panel (USPTO) in Patent Interference No. 105,393.

Morgan, R.C.; Espiau Miscellaneous Motion 6 dated Mar. 22, 2007 (11pp), submitted to the USPTO in Patent Interference No. 105,393.

Pisano, N.; Guthrie Opposition 6 (Opposing Espiau Motion 6 To Request Rehearing) dated Apr. 3, 2007 (12 pp), submitted to the USPTO in Patent Interference No. 105,393.

Decision—Rehearing—Bd. R. 127(d) (Paper 94) filed Apr. 18, 2007 (5 pp) by Board of Patent Appeals and Interferences (USPTO) in Patent Interference No. 105,393.

Exhibit No. 1104, Brandt email Oct. 20, 2005.
Exhibit No. 1105, Wilson Consulting Agreement.
Exhibit No. 1106, Corrected Wilson Declaration.
Exhibit No. 1107, Wilson handwritten notes Nov. 7, 2005.
Exhibit No. 1108, Wilson handwritten notes Nov. 15, 2005.
Exhibit No. 1109, Smoler voicemail transcript Nov. 21, 2005.
Exhibit No. 1110, Wilson invoice Nov. 2, 2005.
Exhibit No. 1111, Wilson invoice Nov. 11, 2005.
Exhibit No. 1112, Wilson invoice Nov. 14, 2005.
Exhibit No. 1113, Wilson invoice Dec. 26, 2005.
Exhibit No. 1114, Wilson check Nov. 4, 2005.
Exhibit No. 1115, Wilson check Nov. 15, 2005.
Exhibit No. 1116, Wilson check Nov. 22, 2005.
Exhibit No. 1117, Wilson check Jan. 3, 2006.
Exhibit No. 1118, Espiau Declaration of Janet Brant.
Exhibit No. 1119, Espiau Declaration of Benjamin Glenn.
Exhibit No. 1120, Espiau Declaration of Michael J.Murphy.
Exhibit No. 1121, Espiau Declaration of Matthew Argenti.
Exhibit No. 1122, Espiau Declaration of Terry Kearney.
Exhibit No. 1123, E-mail dated May 25, 2007 from David Bergan to Nicola Pisano re Guthrie Miscellaneous Motion 6.
Exhibit No. 1124, *Ashurst v. Brugger*, Patent Interference No. 105,482, Decision—Miscellaneous Bd.R. 104(a).
Exhibit No. 2135, IPO Appellate/Interference Practice in the New Millennium conference materials: Table of Contents and Tab 6.
Exhibit No. 2136, Declaration of David Smoler executed Dec. 5, 2005.
Exhibit No. 2137, Engineering sketches faxed to CoorsTek.
Exhibit No. 2138, Manufacturing quote from CoorsTek.
Exhibit No. 2139, Manufacturing Order documentation from CoorsTek dated Aug. 8, 2000.
Exhibit No. 2140, Invoice from CoorsTek dated Oct. 13, 2000.
Exhibit No. 2141, Invoice from CoorsTek dated Oct. 17, 2000.
Exhibit No. 2142, CoorsTek engineering drawings No. 516133 through 516138.
Exhibit No. 2143, Chapter 6.3 from David M. Pozar, Microwave Engineering, Second Edition, John Wiley & Sons, Inc. (1998).
Exhibit No. 2144, Declaration of Shelby Katz.
Exhibit No. 2145, Declaration of Tim Russell dated Feb. 1, 2006 prepared by Wilson Sonsini Goodrich & Rosati.
Exhibit No. 2146, David Smoler notebook entries dated Oct. 25, 1999.
Exhibit No. 2147, Dec. 16, 1999 e-mail form David Smoler to Greg Prior and Ed Sandberg.
Exhibit No. 2148, Amended Assignment and Bill of Sale dated Jan. 12, 2007.
Exhibit No. 2149, Jun. 27, 2000 e-mail from David Smoler to Charles Guthrie.
Exhibit No. 2150, Second Declaration of David E. Smoler dated May 21, 2007.
Exhibit No. 2151, Apr. 16, 2000 e-mail from David Turner to Greg Prior, Jim Legge and Don Wilson enclosing proposal dated Apr. 14, 2000.
Exhibit No. 2152, Apr. 24, 2000 e-mail from David Turner.
Exhibit No. 2153, Apr. 26, 2000 e-mail from David Turner to Greg Prior.
Exhibit No. 2154, DRI Drawing SPL001.
Exhibit No. 2155, DRI Drawing SPL002.
Exhibit No. 2156, Apr. 28, 2000 e-mail form David Turner to Greg Prior.
Exhibit No. 2157, Jun. 28, 2000 e-mail from David Turner to Greg Prior.
Exhibit No. 2158, Jul. 6, 2000 e-mail from David Turner to Wayne Catlett.
Exhibit No. 2159, Jul. 6, 2000 e-mail from David Turner attaching updated contact list.
Exhibit No. 2160, Jul. 17, 2000 e-mail from David Turner to Wayne Catlett.
Exhibit No. 2161, Aug. 1, 2000 e-mail to from David Turner to Wayne Catlett.
Exhibit No. 2162, Photographs of full wavelength waveguide made by Coorstek.
Exhibit No. 2163, Collection of correspondence after Aug. 1 between Tenco and DRI.
Exhibit No. 2164, Declaration of Vivek Gandhi.
Exhibit No. 2165, Apr. 10, 2000 e-mail from David Turner to Greg Prior re: DRI Tasks.
Exhibit No. 2166, Petition to Correct Inventorship filed Dec. 22, 2004.
Exhibit No. 2167, Apr. 28, 2000 e-mail correspondence between Charles Guthrie and CT Lee.
Exhibit No. 2168, May 7, 2000 e-mail from David Turner to Charles Guthrie.
Exhibit No. 2169, Collection of waveguide drawings labeled WGC003.
Exhibit No. 2170, DRI drawing WGC006.
Exhibit No. 2171, DRI drawing SMPL004.
Exhibit No. 2172, Collection of irregularly shaped waveguides.
Exhibit No. 2173, DRI drawings WGC008, WGC009 and WGC010.
Exhibit No. 2174, DRI drawings RFCD001 and RFCD002.
Exhibit No. 2175, DRI drawing WGC003 including spring-loaded probe.
Exhibit No. 2176, Jul. 10, 2000 e-mail from Joe Bennett to Charles Guthrie.
Exhibit No. 2177, Jul. 13, 2000 e-mail form Chan Joshi to Charles Guthrie.
Exhibit No. 2178, 2002 photograph of lighted half-wavelength waveguide resonator.
Exhibit No. 2179, Mar. 23, 2000 e-mail from Charles Guthrie re: Meeting at ITW—Escondido.

Exhibit No. 2180, Declaration of Charles Guthrie dated Jun. 14, 2007.
Exhibit No. 2181, Declaration of Don Wilson dated Jun. 14, 2007.
Exhibit No. 2182, Declaration of Madhu Gupta dated Jun. 14, 2007.
Exhibit No. 2183, Declaration of Floyd Pothoven.
Exhibit No. 2184, Declaration of Anthony Cooper.
Exhibit No. 2185, Declaration of Greg Prior dated Jun. 15, 2007.
Exhibit No. 2186, Declaration of Joe Bennett.
Exhibit No. 2187, Collection of e-mails between Tim Russell and Terry Kearney, WSGR.
Exhibit No. 2188, E-mail dated May 19, 2007 from Tim Russell to Guthrie's counsel.
Exhibit No. 2189, Declaration of Nicola Pisano dated May 21, 2007.
Exhibit No. 2190, Subpoena for Tim Russell.
Exhibit No. 2191, Notice of Deposition of Tim Russell.
Exhibit No. 2192, Draft of Charles Guthrie's May 10, 2000 expense report.
Exhibit No. 2193, May 31, 2000 e-mail from David Turner to Wayne Catlett and Greg Prior.
Exhibit No. 2194, Jun. 1, 2000 e-mail from David Turner to DRI re: Lamp Project Budget.
Exhibit No. 2195, Jun. 2, 2000 e-mail from David Turner.
Exhibit No. 2196, Jun. 26, 2000 e-mail from David Turner to DRI.
Exhibit No. 2197, Jun. 28, 2000 e-mail from David Turner to Don Wilson and Charles Guthrie.
Exhibit No. 2198, Transcript of Jun. 6, 2007 deposition of Tim Russell.
Exhibit No. 2199, Declaration of Dennis Nunes.
"E-mail from Morgan to Pisano", *Exhibit 2260, Guthrie v. Espiau,* Patent Interference 105,393, (Oct. 8, 2007), 1 pg.
"Espiau Opposition 8 (to Guthrie's Miscellaneous Motion 8 to exclude evidence)", *Guthrie v. Espiau,* Patent Interference 105,393, (Oct. 24, 2007), 71 pgs.
"Guthrie Opposition 8 (opposing Espiau miscellaneous motion 8)", *Guthrie v. Espiau,* Patent Interference 105,393, (Oct. 24, 2007), 63 pgs.
"Guthrie's objections to Espiau's exhibits served with its motion 8", *Exhibit 2254, Guthrie v. Espiau,* Patent Interference 105,393, (Oct. 18, 2007), 6 pgs.
"Katie Marie Nunes Death Certificate", *Exhibit 2258, Guthrie v. Espiau,* Patent Interference 015,393, (Jul. 10, 2000), 1 pg.
"Kearney to Pisano Letter", *Re. Guthrie v. Espiau,* (Oct. 19, 2007), 12 pgs.
"Modesto Bee Obituaries including Katie Marie Nunes", *Exhibit 2257, Guthrie v. Espiau,* Patent Interference 105,393, (Jul. 10, 2000), 3 pgs.
"*Nilssen et al. v. Osram Sylvania et al*", *Exhibit 2259, Guthrie v. Espiau,* Patent Interference 105,393, United States Court of Appeals for the Federal Circuit, (Oct. 10, 2007), 20 pgs.
"U.S. Appl. No. 60/337,057 Application Filing Material", (Nov. 6, 2001), 8 pgs.
"U.S. Appl. No. 09/818,092—Revocation of Power of Attorney with New Power of Attorney and Change of Correspondence Address", *Expiau Exhibit 1256, Board of Patent Appeals and Interfeences*(Interference No. 105,393), (Aug. 3, 2005), 3 pgs.
"Combination Diagram", *Expiau Exhibit 1270, Board of Patent Appeals and Interferences*(Interference No. 105,393), (Jul. 8, 2000), 1 pg.
"Decision—Interlocutory Motions—Bd.R. 125(b)", *Guthrie v. Espiau, Board of Patent Appeals and Interferences* (Interference No. 105,393), (Sep. 20, 2007), 3 pgs.
"Decision—Interlocutory Motions—Bd.R. 125(b)", *Guthrie v. Espiau, Board of Patent Appeals and Interferences* (Interference No. 105,393), (Oct. 16, 2007), 3 pgs.
"Deposition of Benjamin Glenn", *Espiau Exhibit 1260, Guthrie v. Espiau, Board of Patent Appeals and Interferences* (Interference No. 105,393), (Sep. 18, 2007), 66 pgs.
"Deposition of Ellen Thotus", *Espiau Exhibit 1259, Guthrie v. Espiau, Board of Patent Appeals and Interferences* (Interference No. 105,393), (Sep. 17, 2007), 42 pgs.
"Deposition of Penny Ortega", *Espiau Exhibit 1261, Guthrie v. Espiau, Board of Patent Appeals and Interferences* (Interference No. 105,393), (Sep. 18, 2007), 24 pgs.

"Errata to the Transcript of the Sep. 17, 2007 Deposition of Ellen Thotus", *Espiau Exhibit 1264, Guthrie v. Espiau, Board of Patent Appeals and Interferences* (Interference No. 105,393), (Sep. 26, 2007), 3 pgs.
"Errata to the Transcript of the Sep. 18, 2007 Deposition of Benjamin Glenn", *Espiau Exhibit 1263, Guthrie v. Espiau, Board of Patent Appeals and Interferences* (Interference No. 105,393), (Sep. 27, 2007), 3 pgs.
"Espiau List of Exhibits", *Guthrie v. Espiau, Board of Patent Appeals and Interferences* (Interference No. 105,393), (Oct. 11, 2007), 15 pgs.
"Espiau Miscellaneous Motion 8 (to Exclude Exhibits 2240 and 2242, and to Strike Exhibit 2244 and Corresponding Portions of Guthrie Reply 7 and Guthrie Substitute Reply 7)", *Guthrie v. Espiau, Board of Patent Appeals and Interferences* (Interference No. 105,393), (Oct. 11, 2007), 32 pgs.
"Espiau Reply 7", *Guthrie v. Espiau, Board of Patent Appeals and Interferences* (Interference No. 105,393), (Sep. 28, 2007), 129 pgs.
"Espiau Second Declaration of F. Matthew Espiau", *Espiau Exhibit 1257, Board of Patent Appeals and Interferences*(Interference No. 105,393), (Sep. 17, 2007), 5 pgs.
"Espiau Second Declaration of Matthew Argenti", *Espiau Exhibit 1271, Board of Patent Appeals and Interferences*(Interference No. 105,393), (Oct. 10, 2007), 5 pgs.
"Espiau Third Declaration of Brian P. Turner", *Espiau Exhibit 1262, Board of Patent Appeals and Interferences*(Interference No. 105,393), (Sep. 25, 2007), 4 pgs.
"Espiau's Objections to Guthrie's Exhibits Served with its Reply 7", *Espiau Exhibit 1273, Guthrie v. Espiau, Board of Patent Appeals and Interferences* (Interference No. 105,393), (Oct. 5, 2007), 12 pgs.
"Faxing 2 page Application to Lease 646 University Ave.", *Espiau Exhibit 1255, Board of Patent Appeals and Interferences*(Interference No. 105,393), To Vito Modugno From George Thotus, (Jul. 21, 2000), 1 pg.
"Guthrie Declaration of James E. King, Esq.", *Guthrie Exhibit 2244, board of Patent Appeals and Interferences* (Interference No. 105,393), (Sep. 27, 2007), 13 pgs.
"Guthrie Declaration of Ray Paquette", *Guthrie Exhibit 2241, Board of Patent Appeals and Interferences*(Interference No. 105,393), (Sep. 30, 2007), 22 pgs.
"Guthrie Motion 8 (To Exclude Evidence)", *Guthrie v. Espiau, Board of Patent Appeals and Interferences* (Interference No. 105,393), (Oct. 10, 2007), 49 pgs.
"Guthrie Reply 7", *Guthrie v. Espiau, Board of Patent Appeals and Interferences* (Interference No. 105,393), (Sep. 28, 2007), 176 pgs.
"Guthrie Second Declaration of Joe Bennett", *Guthrie Exhibit 2240, Board of Patent Appeals and Interferences* (Interference No. 105,393), (Sep. 24, 2007), 5 pgs.
"Guthrie Sixth Declaration of Madhu S. Gupta PhD", *Guthrie Exhibit 2243, Board of Patent Appeals and Interferences* (Interference No. 105,393), (Sep. 27, 2007), 24 pgs.
"Guthrie Third Declaration of Charles Guthrie", *Guthrie Exhibit 2242, Board of Patent Appeals and Interferences* (Interference No. 105,393), (Sep. 26, 2007), 8 pgs.
"Guthrie's Objections to Espiau's Evidence", *Guthrie Exhibit 2250, Board of Patent Appeals and Interferences* (Interference No. 105,393), (Aug. 14, 2007), 3 pgs.
"Guthrie's Objections to Espiau's Exhibits 1255 and 1256", *Guthrie Exhibit 2252, Board of Patent Appeals and Interferences* (Interference No. 105,393), (Sep. 24, 2007), 2 pgs.
"Guthrie's objections to Espiau's exhibits served with its opposition 7", *Guthrie Exhibit 2251, Board of Patent Appeals and Interferences* (Interference No. 105,393), (Sep. 10, 2007), 10 pgs.
"Guthrie's Objections to Espiau's Exhibits Served with its Reply 7", *Guthrie Exhibit 2253, Board of Patent Appeals and Interferences* (Interference No. 105,393), (Oct. 1, 2007), 4 pgs.
"Guthrie's Objections to Espiau's Motion 7 Evidence", *Guthrie Exhibit 2249, Board of Patent Appeals and Interferences* (Interference No. 105,393), (Aug. 7, 2007), 35 pgs.
"Guthrie's Objections to Espiau's Opposition 6 Evidence", *Guthrie Exhibit 2248, Board of Patent Appeals and Interferences* (Interference No. 105,393), (Jun. 5, 2007), 13 pgs.

"King Declaration E-Mail", *Espiau Exhibit 1272, Board of Patent Appeals and Interferences*(Interference No. 105,393), From Robert Morgan to Nicola Pisano,(Oct. 1,2007),1 pg.

"Photograph of basement of 644 University Avenue, Los Gatos, California", *Espiau Exhibit 1267, Board of Patent Appeals and Interferences*(Interference No. 105,393), (no date listed),1 pg.

"Photograph of basement of 644 University Avenue, Los Gatos, California", *Espiau Exhibit 1268, Board of Patent Appeals and Interferences*(Interference No. 105,393), (no date listed),1 pg.

"Photograph of basement of 644 University Avenue, Los Gatos, California", *Espiau Exhibit 1269, Board of Patent Appeals and Interferences*(Interference No. 105,393), (no date listed),1 pg.

"Picture of Facade of Building #644", *Espiau Exhibit 1265, Board of Patent Appeals and Interferences*(Interference No. 105,393), (no date listed),1 pg.

"Sketch of basement of 644 University Avenue, Los Gatos, California", *Espiau Exhibit 1266, Board of Patent Appeals and Interferences*(Interference No. 105,393), (no date listed),1 pg.

"Sound Deposition Services, Inc. Transcript", *Guthrie Exhibit 2247, Board of Patent Appeals and Interferences* (Interference No. 105,393), The transcript was derived from the video located at http://www.redherring.tv/luxim.htm,(Sep. 11, 2007),11 pgs.

"Teleconference Transcript for Call before Judge James Moore", *Guthrie v. Espiau, Board of Patent Appeals and Interferences* (Interference No. 105,393), (Oct. 4, 2007),22 pgs.

"Teleconference Transcript for Call before Judge Sally C. Medley", *Guthrie Exhibit 2245, Board of Patent Appeals and Interferences* (Interference No. 105,393), (Aug. 1, 2007),30 pgs.

"Teleconference Transcript for Call before Judge Sally C. Medley", *Guthrie v. Espiau, Board of Patent Appeals and Interferences* (Interference No. 105,393), (Mar. 8, 2007),27 pgs.

"Teleconference Transcript for Call before Judge Sally C. Medley", *Guthrie v. Espiau, Board of Patent Appeals and Interferences* (Interference No. 105,393), (Oct. 15, 2007),26 pgs.

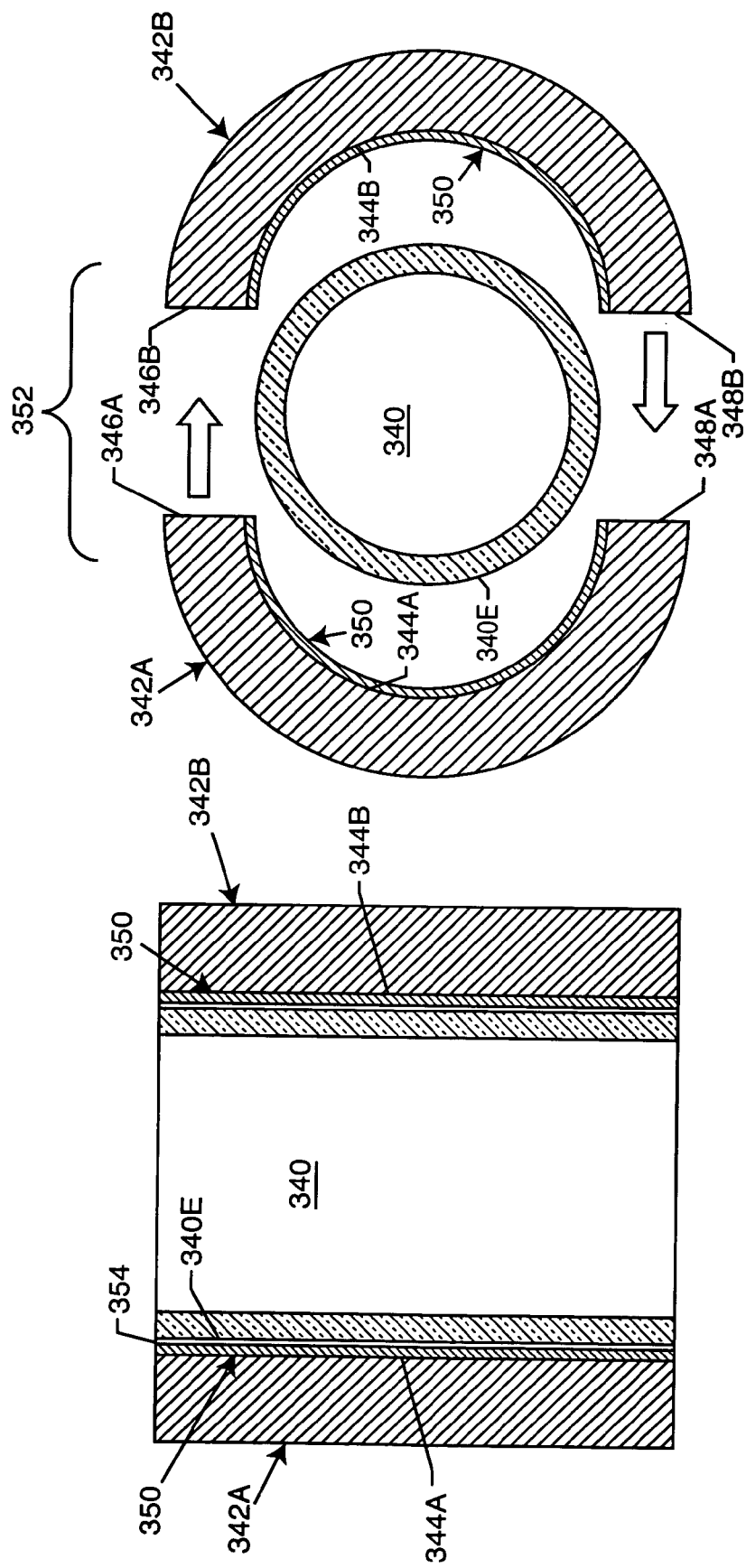

PLASMA LAMP WITH BULB AND LAMP CHAMBER

CROSS-REFERENCE TO RELATED APPLICATIONS

This application is a continuation-in-part of U.S. application Ser. No. 10/771,788 ("'788") filed on Feb. 4, 2004, now U.S. Pat. No. 7,348,732 entitled "Plasma Lamp With Dielectric Waveguide," which is a continuation of U.S. application Ser. No. 09/809,718 ("'718") filed on Mar. 15, 2001 and issued as U.S. Pat. No. 6,737,809 B2, also entitled "Plasma Lamp With Dielectric Waveguide," which claims priority to U.S. provisional application Ser. No. 60/222,028 ("'028") filed on Jul. 31, 2000, entitled "Plasma Lamp."

BACKGROUND OF THE INVENTION

1. Field of the Invention

The field of the present invention relates to devices and methods for generating light, and more particularly to electrodeless plasma lamps energized by microwave radiation and having a solid dielectric waveguide integrated with at least one transparent bulb, wherein heat energy from the plasma is recycled into the bulb(s), resulting in high efficiency operation.

2. Related Art

Our '718 application discloses a "dielectric waveguide integrated plasma" lamp (DWIPL) including a "dielectric waveguide," viz., a waveguide coupled by a microwave probe to a source of microwave power and having a body consisting essentially of dielectric material and a side with a lamp chamber extending into the body. The source operating frequency and waveguide body dimensions are selected such that the body resonates in at least one resonant mode having at least one electric field maximum. The lamp further includes a bulb disposed within the chamber. Thus the body, chamber and bulb are integrated as a unitary structure. The bulb contains a fill mixture ("fill") that forms a light-emitting plasma when microwave power is directed by the waveguide into the bulb. The '718 application also discloses a DWIPL including a dielectric waveguide and two microwave probes. One probe, connected to a feedback means coupled between the probe and microwave source, probes the waveguide body to instantaneously sample the field amplitude and phase and provides this information via the feedback means to the source which dynamically adjusts the operating frequency to maintain at least one resonant mode within the waveguide body, thereby operating the lamp in a "dielectric resonant oscillator" mode. The '718 application further discloses DWIPL embodiments which differ according to waveguide body shape, bulb type (a hermetically sealed envelope vis-a-vis a bulb which is self-enclosed), number of bulbs (one vis-a-vis two), number of lamp chambers (one vis-a-vis two), and number of probes (one vis-a-vis two).

A continuation-in-part application Ser. No. 10/356,340 ("'340"), published as Pub. No. 2003/0178943 A1 and entitled "Microwave Energized Plasma Lamp With Solid Dielectric Waveguide," discloses advances in design of the "drive probe" which supplies microwave power to the fill, and of the "feedback probe", as well as utilization of a "start probe" to mitigate over-coupling of the drive probe, and amplifier and control circuits for two- and three-probe configurations which minimize power reflected from the body back to the source both before a plasma is formed and after it reaches steady state. The '340 application further discloses techniques for sealing a waveguide body cavity (viz., a lamp chamber) with a window or lens allowing seals to withstand large thermomechanical stresses and chamber pressures which develop during lamp operation, alternative techniques for DWIPL assembly, and waveguide bodies having two solid dielectric materials.

The '718, '340 and '788 applications asserted that quartz bulbs are unsuitable for plasma lamps of the present invention because they would be prone to failure in the 1000° C. temperature regime a bulb wall containing a plasma would experience and, even if structural failure did not occur, would be unstable in their mechanical, optical and electrical properties over long periods when repeatedly cycled in temperature. The conclusion was that use of a quartz bulb would likely result in a lamp prone to early failure. However, we have recently demonstrated that quartz can be a suitable bulb material when used in the lamp embodiments disclosed herein, and moreover provides significant advantages that an opaque fill envelope or self-enclosed bulb cannot.

SUMMARY OF THE INVENTION

In one aspect a lamp according to the invention includes a waveguide having a body including at least one dielectric material with a dielectric constant greater than approximately 2, and at least one body surface determined by a waveguide outer surface. The lamp further includes a probe within the body coupling microwave energy into the body from a source operating in a frequency range from about 0.25 to about 30 GHz. The body resonates in at least one mode having at least one electric field maximum. The body has a lamp chamber depending from the waveguide outer surface, thus determining an aperture, and the chamber is determined by a bottom surface and at least one surrounding wall surface. The lamp further includes a transparent, dielectric bulb within the chamber, and a fill within the bulb which when receiving microwave energy from the resonating body forms a light-emitting plasma.

In a second aspect a lamp includes a self-enclosed bulb closely received within a lamp chamber in a dielectric waveguide body. The chamber is determined by an aperture, and an enclosure determined by a bottom surface and at least one surrounding wall surface. The bulb has a cylindrical wall consisting of transparent dielectric material, attached to a bottom consisting of the same material. The bulb wall has a circumferential upper edge hermetically sealed to a transparent window. The exterior surface of the bulb wall is in thermal contact with the chamber wall surface, and the exterior surface of the bulb bottom is in thermal contact with the bottom surface of the chamber.

In a third aspect a lamp includes a self-enclosed bulb disposed within a lamp chamber in a dielectric waveguide body. The chamber is determined by an aperture, and an enclosure determined by a bottom surface and at least one surrounding wall surface. The bulb includes a cylindrical wall, consisting of transparent dielectric material, which extends upwardly in a circumferential lip having opposed lower and upper surfaces, and is attached to a transparent bottom. The lip lower surface is hermetically sealed to a bulb support structure circumscribing the aperture and attached to the waveguide body. The bulb further includes a window hermetically sealed to the lip upper surface.

In a fourth aspect a lamp includes a lamp chamber in a dielectric waveguide body, determined by an aperture, and a shaped surface bounding a surrounding wall of dielectric material and tapering symmetrically to a bottom. The lamp further includes a self-enclosed bulb having a cylindrical, transparent wall attached to a bottom, and a window hermetically sealed to the wall. The bulb bottom is attached by a first adhesive layer to a ceramic pedestal attached by a second adhesive layer proximate to the chamber bottom. The chamber surface is shaped to direct light emitted by plasma in the bulb so as to satisfy ray-divergence specifications levied by an optical system receiving the lamp's output radiation.

BRIEF DESCRIPTION OF THE DRAWINGS

FIG. 6A is an elevational view of a bulb having a transparent, cylindrical wall concentric with and surrounded by an opaque dielectric sleeve split into two halves, and separated from the sleeve by an air gap. A multi-layer dielectric coating is on the interior surface of each sleeve-half.

FIG. 6B is an exploded plan view of the FIG. 6A configuration.

DETAILED DESCRIPTION OF THE PREFERRED EMBODIMENTS

Figure 1:
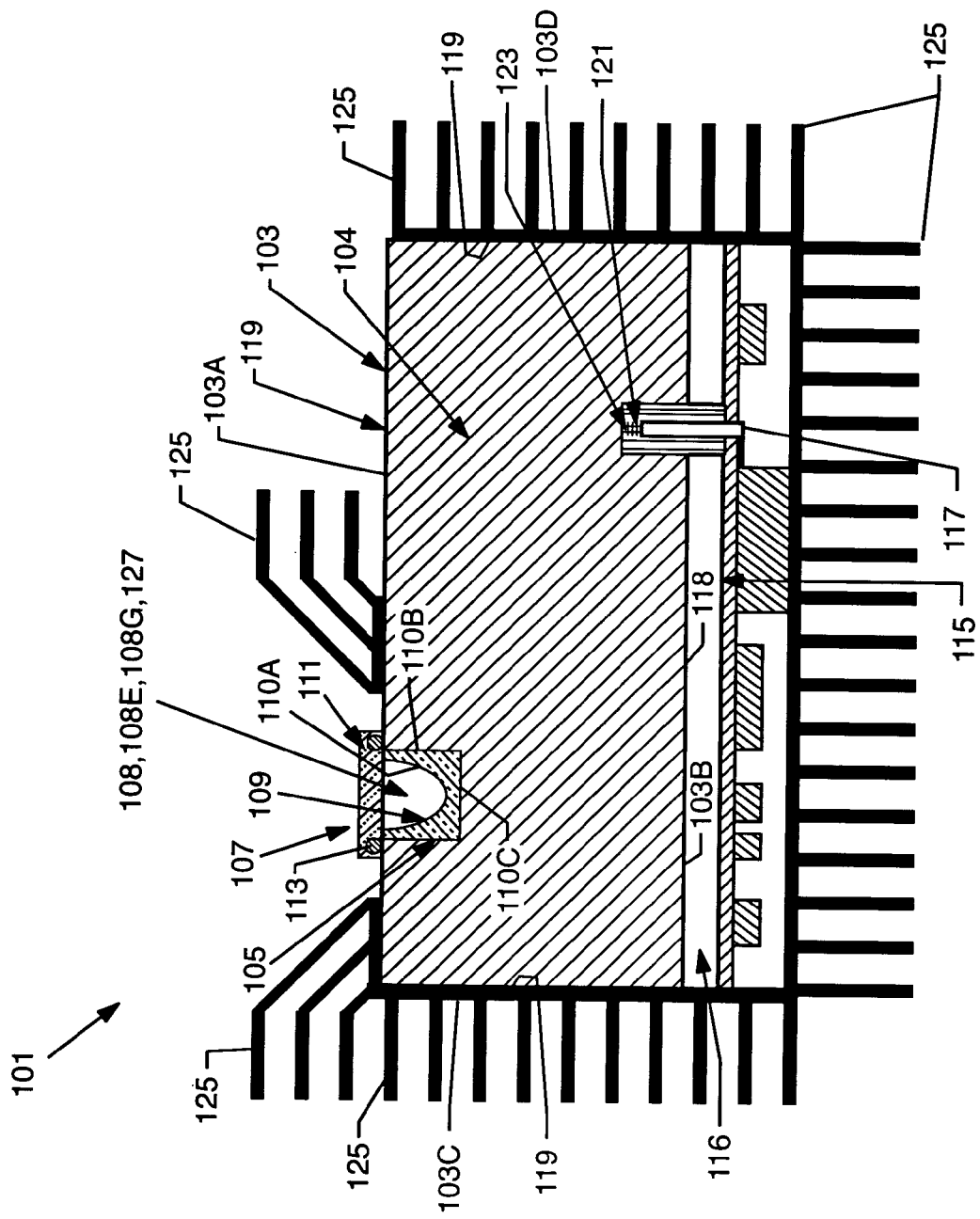
FIG. 1 illustrates a sectional view of a dielectric waveguide integrated plasma lamp (DWIPL) including a waveguide having a body consisting essentially of solid dielectric material, integrated with a bulb envelope having a transparent wall and containing a light-emitting plasma.

While the present invention is open to various modifications and alternative constructions, the preferred embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

As used herein, the terms "dielectric waveguide integrated plasma lamp", "DWIPL", "microwave energized plasma lamp with solid dielectric waveguide", and "lamp" are synonymous, the term "lamp body" is synonymous with "waveguide body." The term "probe" herein is synonymous with "feed" in the '718 application. The term "power", i.e., energy per unit time, is used herein rather than "energy" as in the '718 application. The terms "lamp chamber" and "hole" herein are synonymous with "cavity" in the '718 application, and are used in describing construction details, such as seals and materials, of the several DWIPL embodiments disclosed. A "lamp chamber" is defined herein as a receptacle, i.e., a hole, in a waveguide body having an aperture in a body surface which typically is coplanar with a waveguide surface exposed to the environment. The generic term "bulb" denotes (type-A) a self-enclosed, discrete structure containing a fill mixture and positioned within a lamp chamber; or (type-B) a "bulb envelope," viz., a chamber containing a fill mixture sealed from the environment by a window or lens. As used herein, the term "fill" is synonymous with "fill mixture." The term "self-enclosed bulb" is specific to type-A. The term "cavity" is used herein when describing microwave technology-related details such as probe design, coupling and resonant modes. From an electromagnetic point of view a DWIPL body is a resonant cavity. This change in terminology from the '718 application was first made in the '340 application. For simplicity and to facilitate comparison, most of the lamp chambers and/or bulbs of the lamp embodiments disclosed herein are cylindrical. However, other shapes such as rectangular prisms and ellipsoids are feasible.

FIG. 1, adapted from FIG. 1 of the '028, '718, '340 and '788 applications, shows a dielectric waveguide integrated plasma lamp with a bulb envelope made of a transparent dielectric material rather than an opaque material such as a ceramic. DWIPL 101 includes a source 115 of microwave radiation, a waveguide 103 having a body 104 consisting essentially of solid dielectric material, and a drive probe 117 coupling the source 115 to the waveguide, which is in the shape of a rectangular prism determined by opposed sides 103A, 103B, and opposed sides 103C, 103D generally transverse to sides 103A, 103B. DWIPL 101 further includes a type-B bulb 107 disposed proximate to side 103A and preferably generally opposed to probe 117, containing a fill 108 including a "starting" gas 108G, such as a noble gas, and a light emitter 108E, which when receiving microwave power at a predetermined operating frequency and intensity forms a plasma and emits light. Source 115 provides microwave power to waveguide 103 via probe 117. The waveguide contains and guides the energy flow to a lamp chamber 105, depending from side 103A into body 104, in which bulb 107 is closely received. This energy flow frees electrons from the starting gas atoms, thereby creating a plasma. In many cases the light emitter is solid at room temperature. It may contain any one of a number of elements or compounds known in the art, such as sulfur, selenium, a compound containing sulfur or selenium, or a metal halide such as indium bromide. The starting plasma vaporizes the light emitter, and the microwave powered free electrons excite the light emitter electrons to higher energy levels. De-excitation of the light emitter electrons results in light emission. Use of a starting gas in combination with a solid light emitter is not a necessity; a gas fill alone, such as xenon, can be used to start the plasma and to emit light. The preferred operating frequency range for source 115 is from about 0.25 to about 30 GHz. Source 115 may be thermally isolated from bulb 107 which during operation typically reaches temperatures between about 700° C. and about 1000° C., thus avoiding degradation of the source due to heating. Preferably, the waveguide body provides a substantial thermal mass which aids efficient distribution and dissipation of heat and provides thermal isolation between the lamp and source. Additional thermal isolation of the source may be accomplished by using an insulating material or vacuum gap occupying an optional space 116 between source 115 and waveguide 103. When the space 116 is included, appropriate microwave probes are used to couple the source to the waveguide.

Due to mechanical and other considerations such as heat, vibration, aging and shock, contact between the probe 117 and waveguide 103 preferably is maintained using a positive contact mechanism 121, shown in FIG. 1 as a spring-loaded device. The mechanism provides a constant pressure by the probe on the waveguide to minimize the possibility that microwave power will be reflected back through the probe rather than entering the waveguide. In providing constant pressure, the mechanism compensates for small dimensional changes in the probe and waveguide that may occur due to thermal heating or mechanical shock. Preferably, contact is made by depositing a metallic material 123 directly on the waveguide at its point of contact with probe 117 so as to eliminate gaps that may disturb the coupling.

While the waveguide body 104, being of dielectric material, can by itself confine the microwave field to resonant modes within it, presenting the field with a conducting boundary condition at each external body surface is desirable because the confined field amplitude is increased, improving lamp efficiency, and the evanescent field outside the waveguide body, characteristic of dielectric waveguides, is attenuated. Both the increased confined field amplitude and attenuated evanescent field make oscillation inside the waveguide body less sensitive to the outside environment, and suppress stray microwave interference. A conducting boundary condition can be effected in two ways, either singly or in combination. Sides 103A, 103B, 103C, 103D of waveguide 103, with the exception of those surfaces depending from side 103A into body 104 which form lamp chamber 105, can be coated with a thin metallic coating 119 which reflects microwaves in the operating frequency range. Alternatively, a tightly fitting metallic heatsink can serve the same purpose. A preferred coating is silver. Preferred materials for the heatsink include copper and aluminum.

Bulb 107 includes a wall 109 consisting of a transparent dielectric material, preferably quartz, and is determined by a concavely arcuate interior surface 110A, a generally cylindrical exterior surface 110B, and a generally planar bottom surface 110C. A window 111 attached to side 103A using a seal 113 hermetically seals and in combination with wall 109 determines a bulb envelope 127 which contains the fill 108, i.e., the emitter 108E and starting gas 108G. Because window 111 is sealed to a waveguide surface rather than to the wall 109, matching the coefficient of thermal expansion (CTE) of the materials used for the window and wall is not critical. Consequently, sapphire, which has high light transmissivity, is a feasible material for window 111. Preferably, surface 110A is contoured to maximize the amount of light reflected out of bulb envelope 127 through window 111. Window 111 may include a lens to collect and focus the emitted light. During operation when wall 109 may reach temperatures of up to about 1000° C., body 104 acts as a heatsink because wall surfaces 110B, 110C are in thermal contact with the waveguide body 104. Effective heat dissipation from body 104 is achieved by attaching a plurality of heat-sinking fins 125 to sides 103A, 103C and 103D. Much of the energy absorbed by a plasma eventually appears as heat. Because wall 109 is transparent, such heat continually exits envelope 127 in the form of infrared and visible radiation absorbed by body 104. Compared to a similar bulb envelope with a ceramic wall, a relatively large amount of power must be provided to maintain the plasma temperature. Consequently, lamp 101 has low efficiency.

High resonant energy within the waveguide body 104, corresponding to a high Q-value in the body (where Q is the ratio of the operating frequency to the frequency width of the resonance), results in high evanescent leakage of microwave energy into chamber 105. Such leakage leads to quasi-static breakdown of the gas within envelope 127, thereby generating the first free electrons. The oscillating energy of the free electrons scales as $I\lambda^2$, where I is the circulating intensity of the microwave energy and $\lambda$ is the wavelength. Thus, the higher the microwave energy, the greater is the oscillating energy of the free electrons. By making the oscillating energy greater than the ionization potential of the gas, electron-neutral collisions result in efficient build-up of plasma density.

Once a plasma is formed and the incoming power is absorbed, the waveguide body's Q-value drops due to the conductivity and absorption properties of the plasma. The drop in Q-value is generally due to a change in the impedance of the waveguide. After plasma formation, the presence of the plasma in the chamber makes the chamber absorptive to the resonant energy, thus changing the waveguide impedance. This change in impedance is effectively a reduction in the overall reflectivity of the waveguide. By matching the reflectivity of the probe to be close to the reduced reflectivity of the waveguide, a relatively low net reflection back into the energy source is realized.

Figure 2:
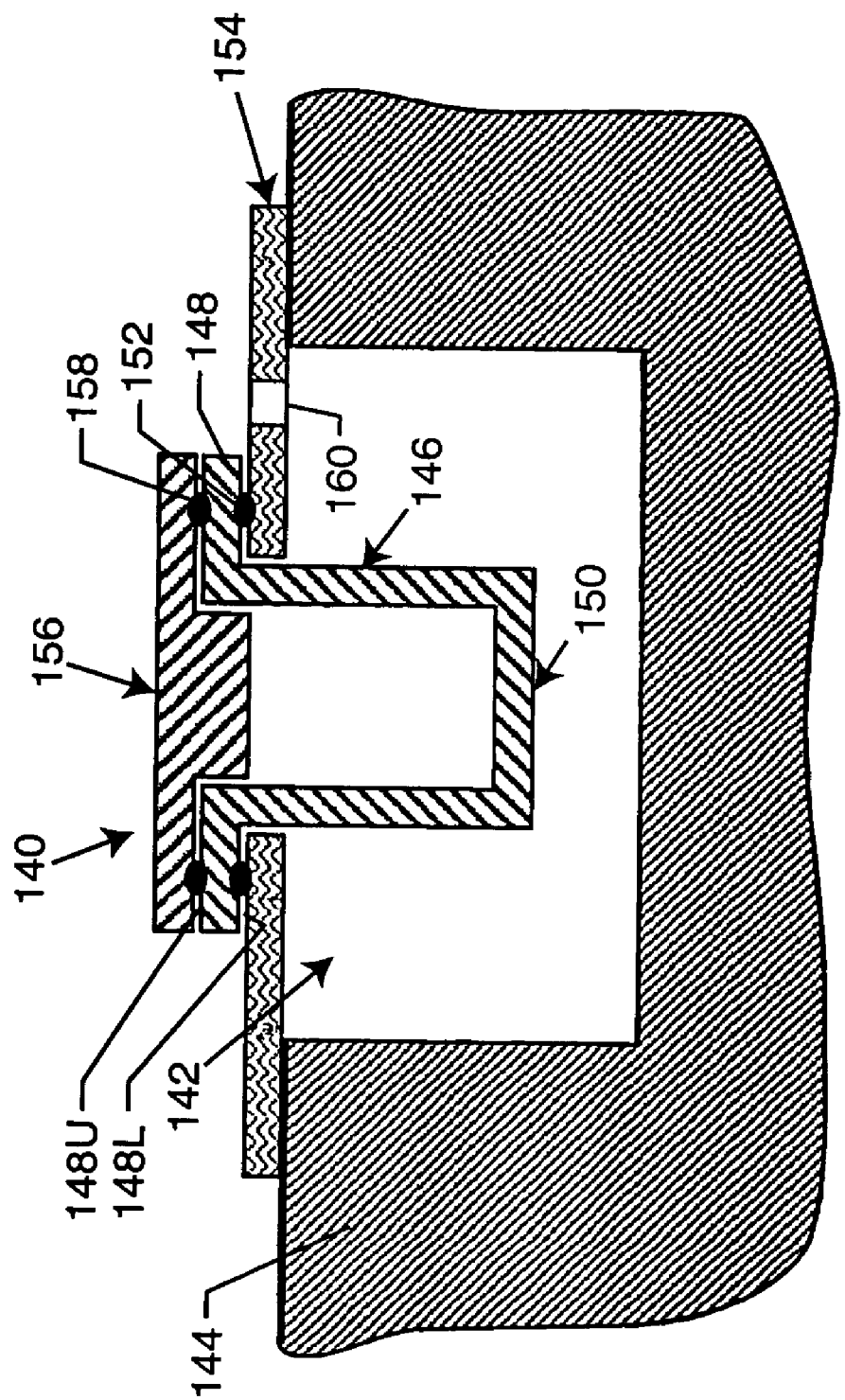
FIG. 2 illustrates a sectional view of a DWIPL having a self-enclosed ceramic bulb separated from the waveguide body by a vacuum gap, and a sapphire window.
Figure 3A:
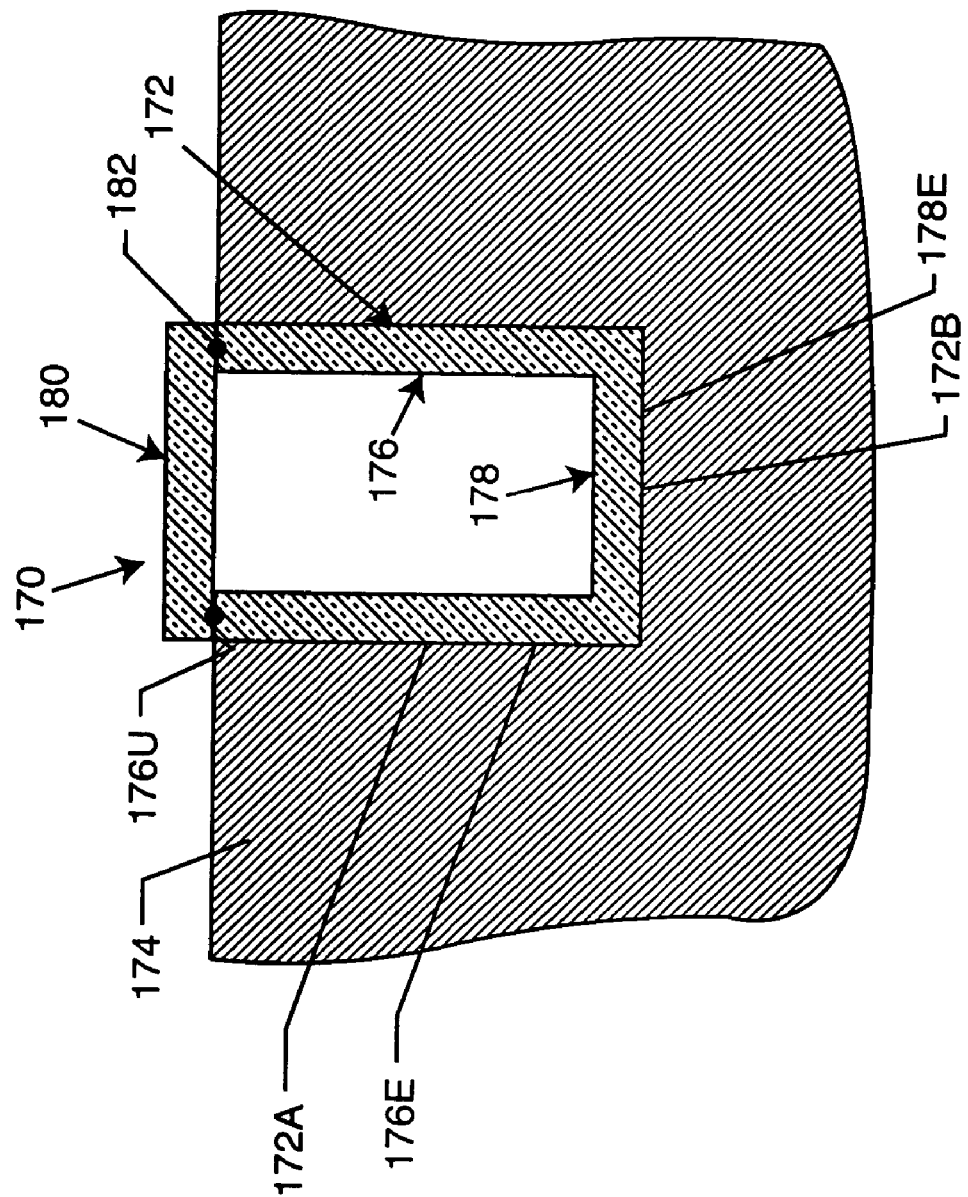
FIG. 3A illustrates a sectional view of a DWIPL self-enclosed bulb having a cylindrical, transparent wall and transparent bottom in thermal contact with a lamp chamber wall, and a window made of the same material as the wall and bottom.
Figure 3B:
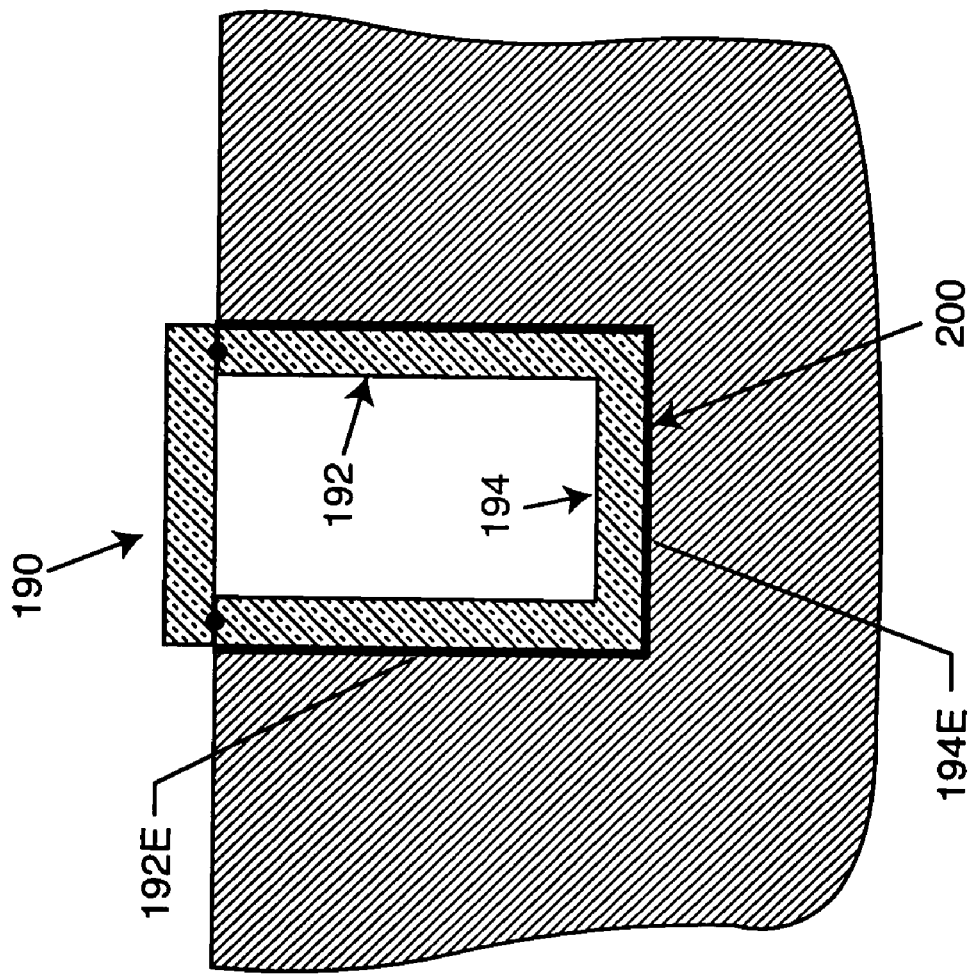
FIG. 3B shows the FIG. 3A bulb with a multi-layer dielectric coating on the exterior surfaces of the bulb wall and bottom.

FIG. 2, which is FIG. 3B in the '028, '718 and '788 applications, illustrates a type-A (i.e., self-enclosed) bulb 140 disposed within a lamp chamber 142 in a dielectric waveguide body 144. Bulb 140 includes a generally cylindrical wall 146 of opaque dielectric material terminating upwardly in a circumferential lip 148 having lower and upper surfaces 148L, 148U, respectively, and attached to an opaque bottom 150. Lower surface 148L is hermetically sealed by a seal 152 to a bulb support structure 154 attached to body 104. Bulb 140 further includes a window 156 hermetically sealed by a seal 158 to upper surface 148U. Embedded in support structure 154 is an access seal 160 through which air is evacuated from the chamber 142. Preferably, wall 146, lip 148 and bottom 150 are made of alumina. Support structure 154 is made of material having high thermal conductivity, such as alumina, to efficiently dissipate heat from the bulb. Once a vacuum is established in chamber 142, heat transfer between the bulb 140 and waveguide body 144 is substantially reduced.

FIG. 3A illustrates a type-A bulb and lamp chamber embodiment similar to the type-B embodiment shown in FIG. 1. A self-enclosed bulb 170 is closely received within a lamp chamber 172 in a dielectric waveguide body 174. Bulb 170 includes a generally cylindrical wall 176 of transparent dielectric material attached to a bottom 178 made of the same material. Wall 176 has a circumferential upper edge 176U hermetically sealed to a transparent window 180 by a seal 182. Window 180 either is made of the same material as the wall and bottom or has a CTE which is very close to the CTE of that material. Preferably, the wall, bottom and window are made of quartz. The exterior surfaces 176E, 178E, respectively, of wall 176 and bottom 178 are in thermal contact with the surfaces of lamp chamber 172 contiguous to them, surfaces 172A, 172B, respectively. Preferably, wall 176 has a thickness in a range between one millimeter and ten millimeters. As in the FIG. 1 embodiment, heat from the plasma exits the bulb wall and bottom and is absorbed by the waveguide body 174. Thus this "bulb cavity" embodiment has low efficiency.

Figure 9:
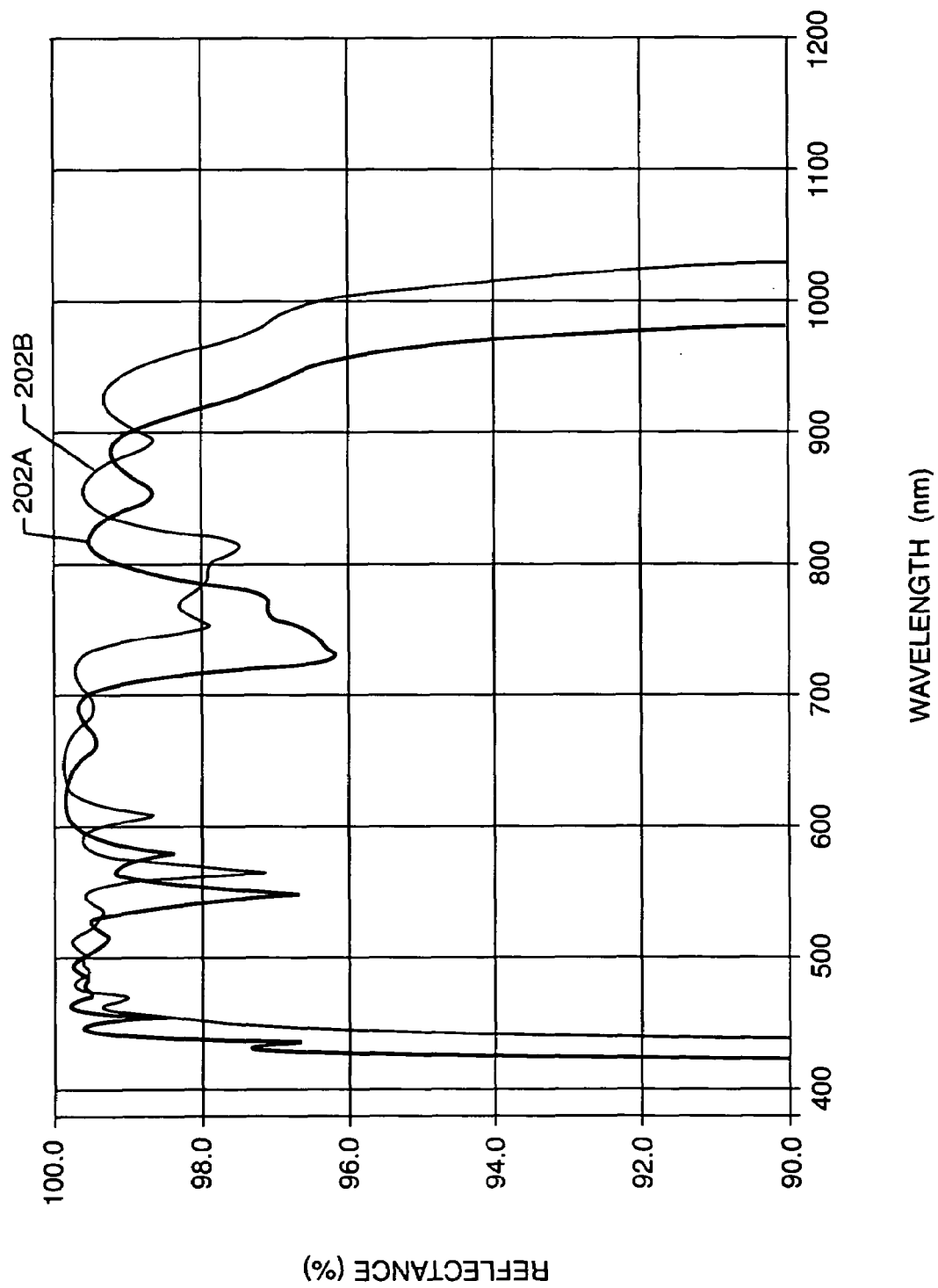
FIG. 9 shows the reflectance spectra of a preferred multi-layer coating consisting of $SiO_2$, which is transparent for wavelengths in the range 0.12-4.5 μm, for light incident normally and 30 degrees off normal.

FIG. 3B illustrates a bulb and lamp chamber embodiment which differs from the FIG. 3A embodiment in one respect. The exterior surfaces 192E, 194E, respectively, of generally cylindrical wall 192 and bottom 194 of self-enclosed bulb 190 are coated with a thin-film, multi-layer dielectric coating 200 which allows the plasma to retain a significant fraction of its emission spectrum at its steady state operating temperature by reflecting radiation exiting the wall 192 and bottom 194 back into the bulb. It should be emphasized that the coating is not made of reflective material which, in general, prevents microwave power from heating the light-emitting plasma. Tailored, broadband reflectivity over the emission range of the plasma is instead achieved by interference among electromagnetic waves propagating through thin-film layers presenting refractive index changes at length-scales on the order of their wavelength. The number of layers and their individual thicknesses are the primary design variables. This is a well understood technology in the optical industry [see Chapters 5 and 7, H. A. McLeod, "Thin-Film Optical Filters," 3rd edition, Institute of Physics Publishing (2001)], and such coatings having a reflectivity spectrum suitable for the present invention are available commercially. For ruggedness in the harsh environment proximate to bulb 190, a preferred embodiment of coating 200 consists of layers of silicon dioxide ($SiO_2$), which is transparent for wavelengths between 0.12 µm and 4.5 µm. Another preferred embodiment consists of layers of titanium dioxide ($TiO_2$), which is transparent to wavelengths between 0.43 µm and 6.2 µm. FIG. 9 shows the reflectance spectrum 202A, 202B, respectively, for light incident at 30 degrees off normal and at normal incidence on a $SiO_2$ multi-layer substrate. This coating was formulated according to our specifications by ZC&R Coatings for Optics Inc. of Torrance, Calif. Typically, coatings used in the present invention have approximately 10 to 100 layers with each layer having a thickness in a range between 0.1 µm and 10 µm. It is expected that a coating on the interior surface of a bulb would not survive the plasma environment.

Figure 4A:
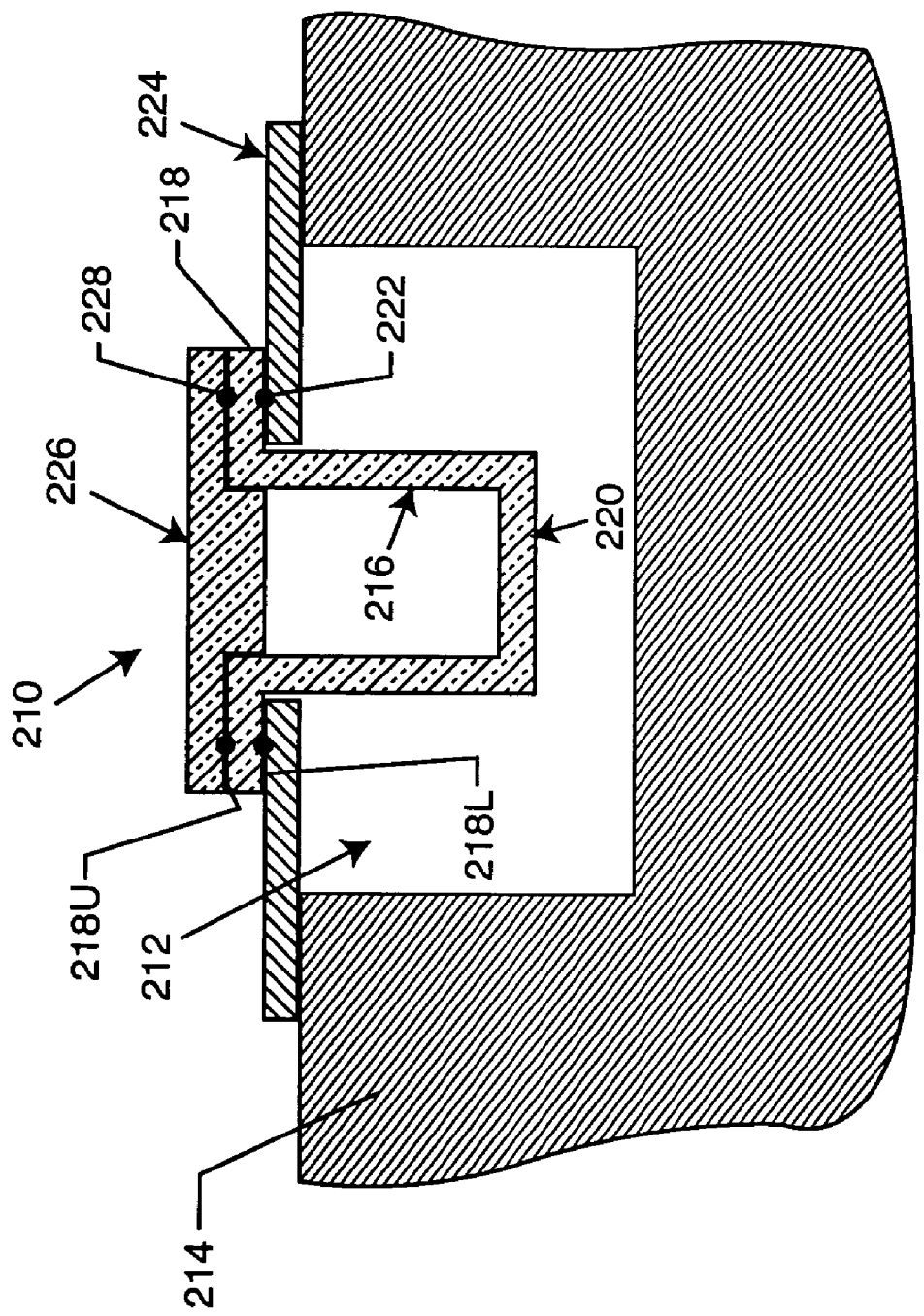
FIG. 4A illustrates a sectional view of a DWIPL self-enclosed bulb having a cylindrical, transparent wall extending upwardly in a lip and a transparent bottom, and separated from the waveguide body by an air gap, and a window made of the same material as the wall, lip and bottom.

FIG. 4A illustrates a bulb and lamp chamber embodiment similar to the FIG. 2 embodiment. A self-enclosed bulb 210 is disposed within a lamp chamber 212 in a dielectric waveguide body 214. Bulb 210 includes a generally cylindrical wall 216 of transparent dielectric material extending upwardly in a circumferential lip 218 having lower and upper surfaces 218L, 218U, respectively, and attached to a transparent bottom 220. Lower surface 218L is hermetically sealed by a seal 222 to a bulb support structure 224 attached to body 214. Bulb 210 further includes a window 226 hermetically sealed by a seal 228 to upper surface 218U. Preferably, wall 216, lip 218, bottom 220 and window 226 are made of quartz. Preferably, support structure 224 is made of dielectric or metallic material having high thermal conductivity, such as, respectively, alumina or copper. The support structure 224 can be transparent to varying degrees in the emission band of the plasma at operating conditions, or opaque. In contrast to the FIG. 2 embodiment, lamp chamber 212 is filled with air rather than evacuated. A lamp constructed according to this embodiment would have lower efficiency because heat lost from the bulb would not be recycled.

Figure 4B:
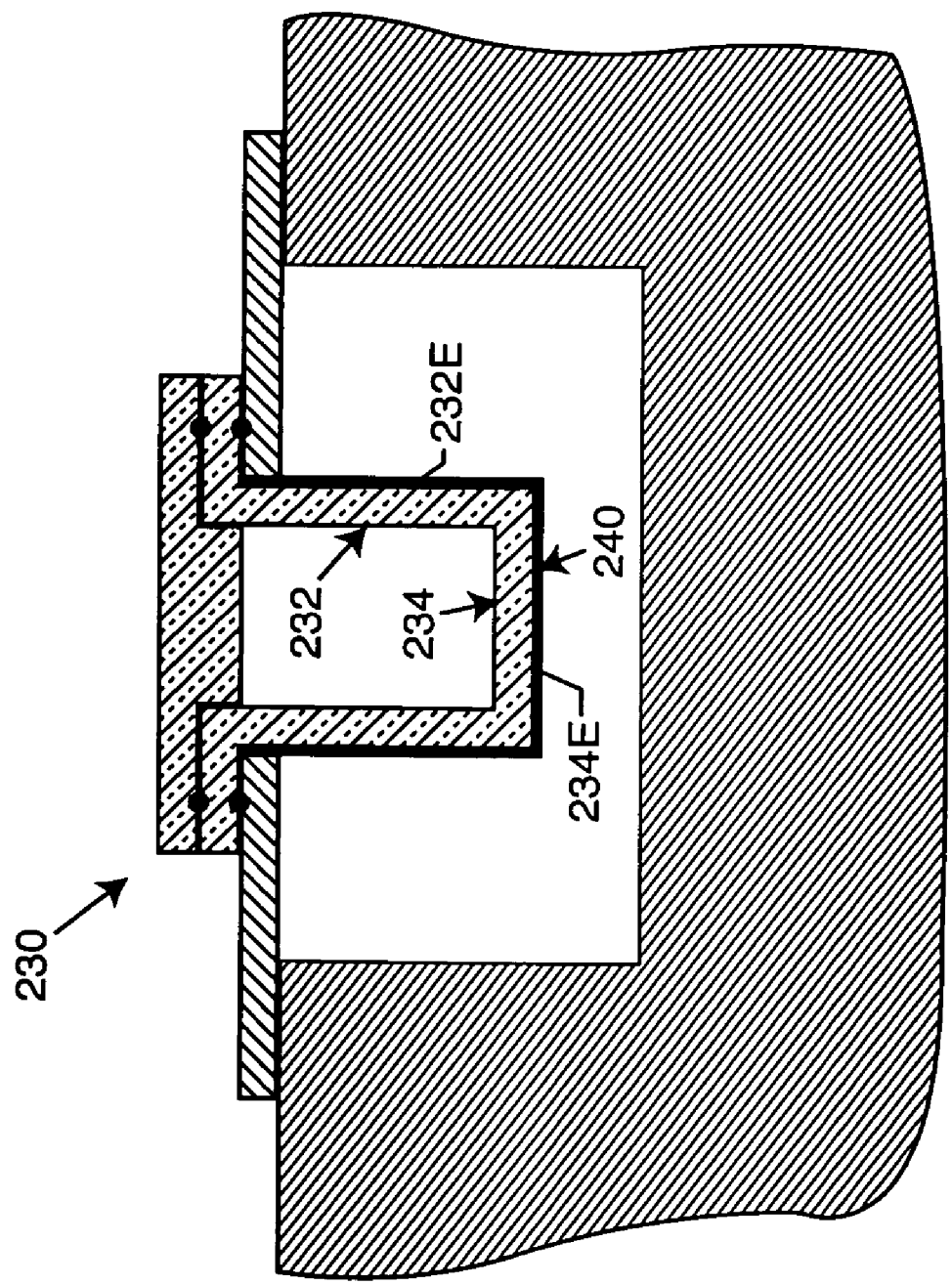
FIG. 4B shows the FIG. 4A bulb with a multi-layer dielectric coating on the exterior surfaces of the cylindrical bulb wall and bottom.

FIG. 4B illustrates a bulb and lamp chamber embodiment which differs from the FIG. 4A embodiment only in that the exterior surfaces 232E, 234E, respectively, of generally cylindrical wall 232 and bottom 234 of self-enclosed bulb 230 are coated with a thin-film, multi-layer dielectric coating 240 which allows the plasma to retain a significant fraction of its emission spectrum at its steady state operating temperature by reflecting radiation exiting the wall 232 and bottom 234 back into the bulb.

Figure 4C:
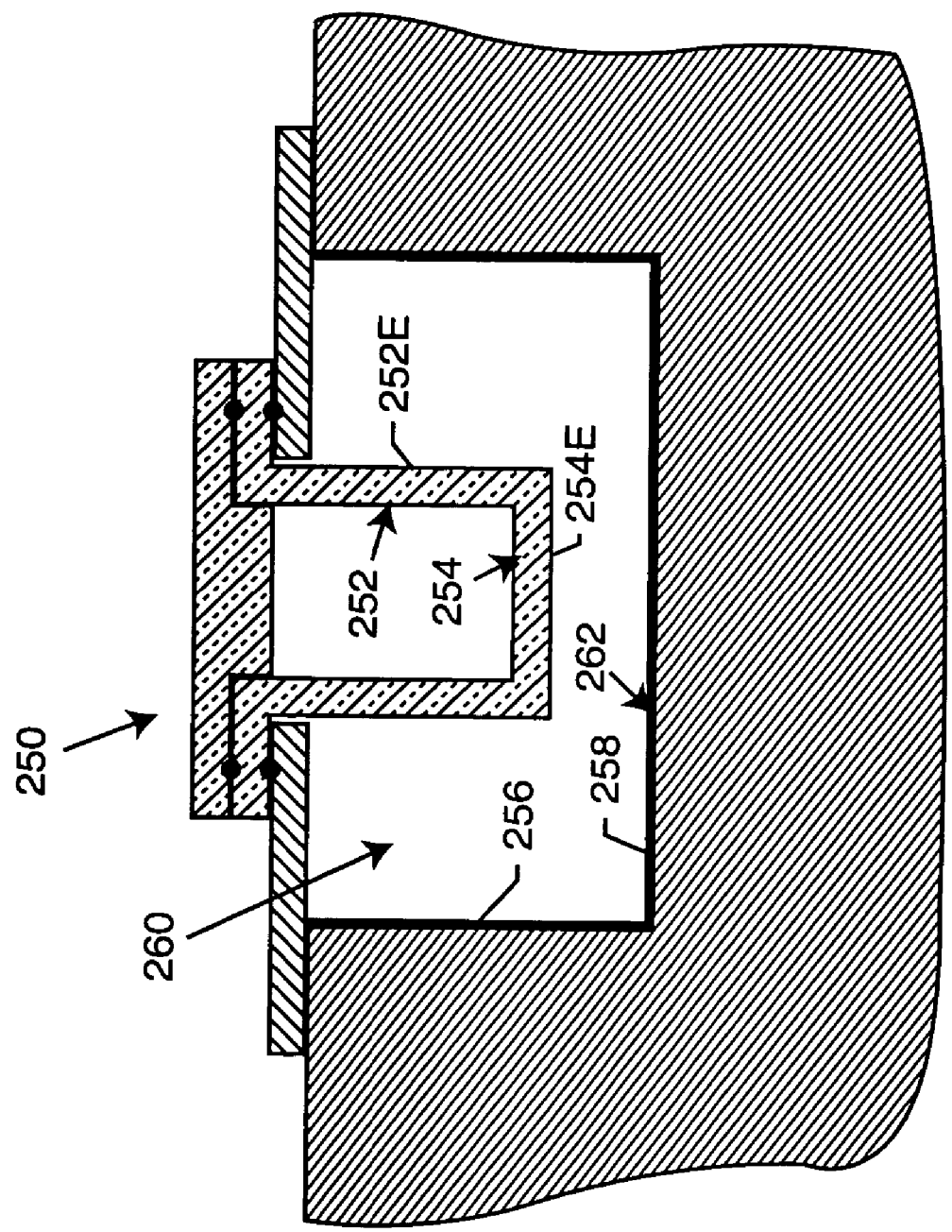
FIG. 4C shows the FIG. 4A configuration with a multi-layer dielectric coating on the wall and bottom of the cylindrical lamp chamber.

FIG. 4C illustrates a bulb and lamp chamber embodiment wherein the exterior surfaces 252E, 254E, respectively, of generally cylindrical wall 252 and bottom 254 of self-enclosed bulb 250 are uncoated, and generally cylindrical wall surface 256 and generally planar bottom surface 258 of lamp chamber 260 are coated with a thin-film, multi-layer dielectric coating 262. Radiation exiting the wall 252 and bottom 254 is reflected from coated surfaces 256 and 258 into bulb 250, thereby recycling heat energy.

Figure 4D:
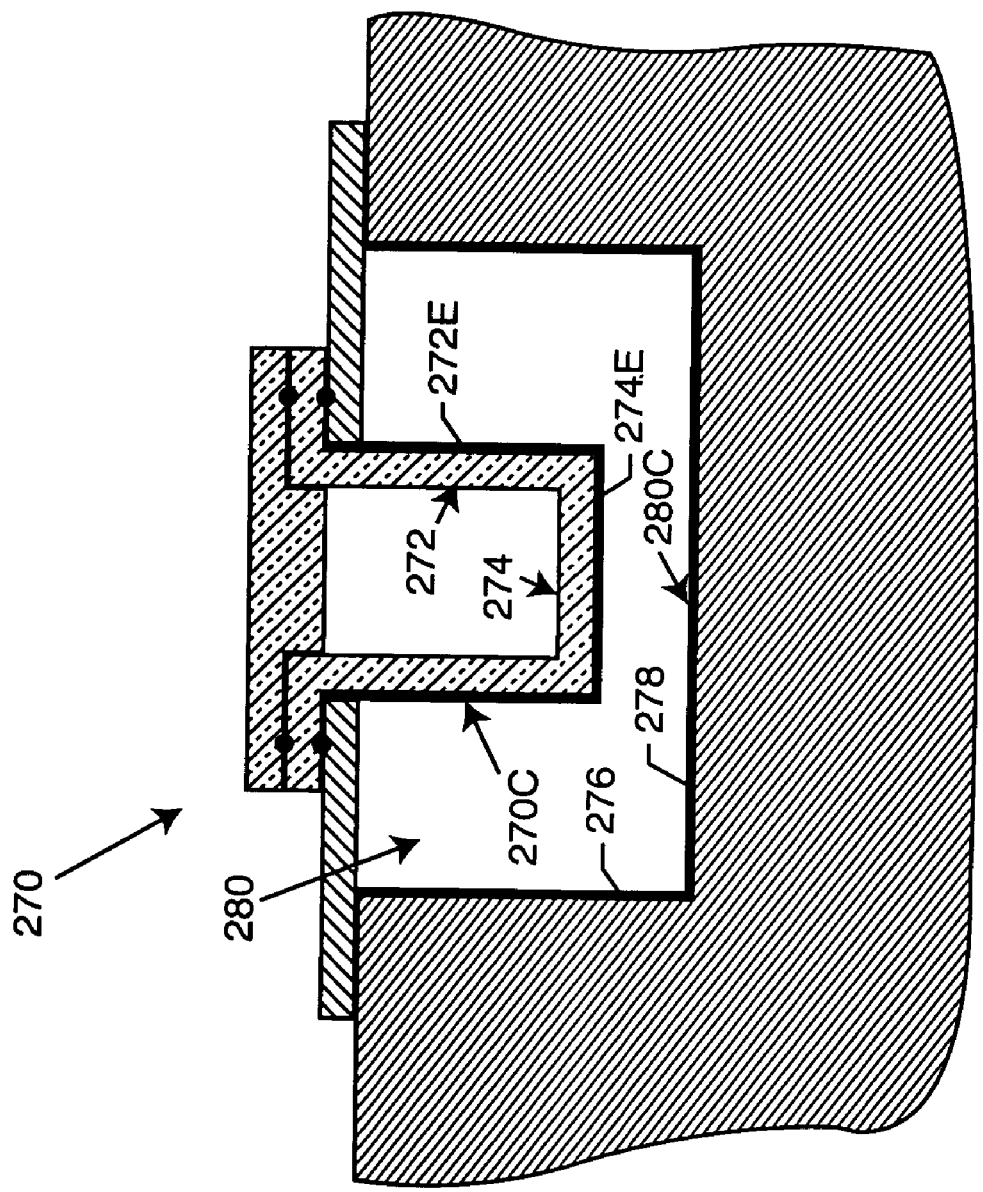
FIG. 4D shows the FIG. 4A configuration with a multi-layer dielectric coating on the exterior surfaces of the bulb wall and bottom, and on the lamp chamber wall and bottom.

FIG. 4D illustrates a bulb and lamp chamber embodiment wherein the exterior surfaces 272E, 274E, respectively, of generally cylindrical wall 272 and bottom 274 of self-enclosed bulb 270 are coated with a first thin-film, multi-layer dielectric coating 270C, and generally cylindrical wall surface 276 and generally planar bottom surface 278 of lamp chamber 280 are coated with a second thin-film, multi-layer dielectric coating 280C. Radiation exiting the wall 272 and bottom 274 not reflected from coated surfaces 272E and 274E, i.e., passing through coating 270C, may be reflected from the coated chamber surfaces 276, 278 back through coating 270C and into the bulb 270. It should be noted that the coatings on the bulb and chamber surfaces need not be of identical design, but may have their spectral characteristics tailored to optimize both thermal efficiency and light output.

Figure 5A:
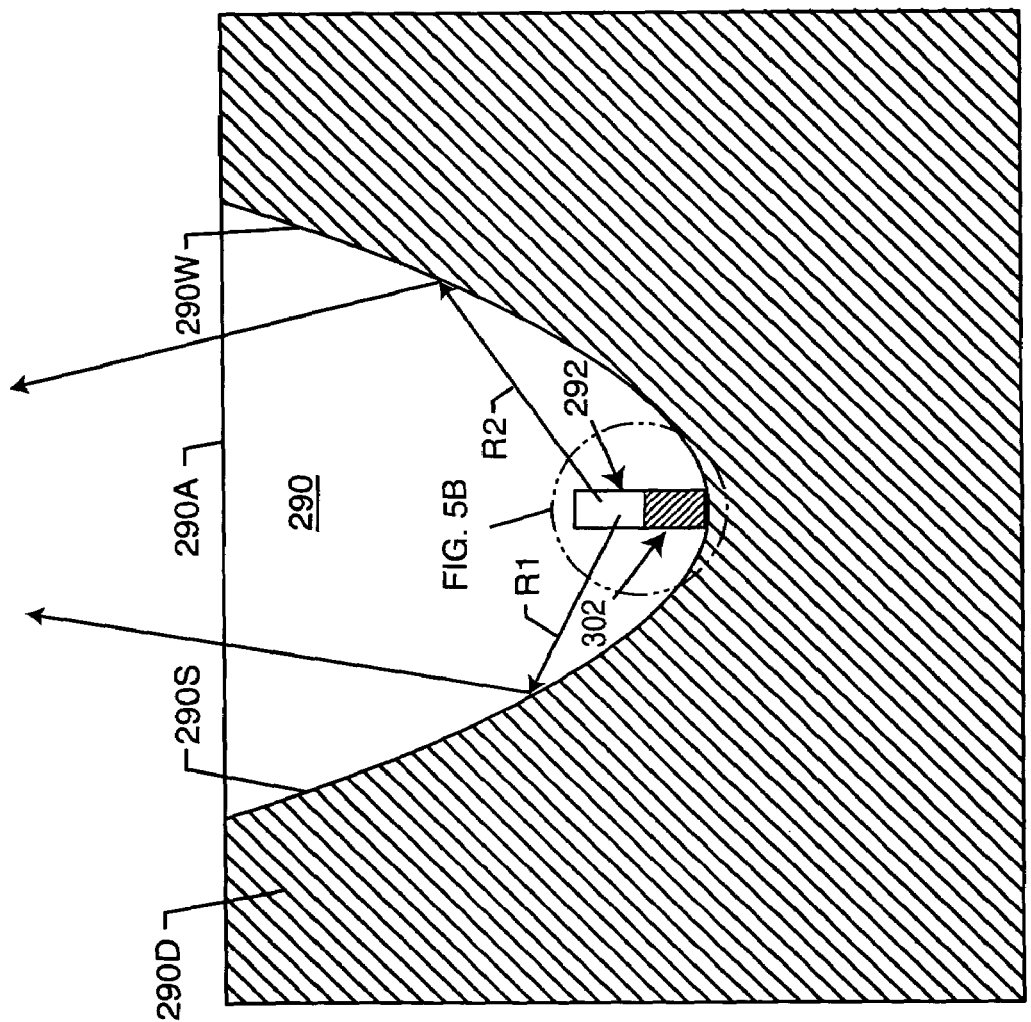
FIG. 5A illustrates a sectional view of a lamp chamber, open to air, wherein a self-enclosed cylindrical, transparent bulb is mounted on a pedestal attached to the lamp chamber bottom.
Figure 5B:
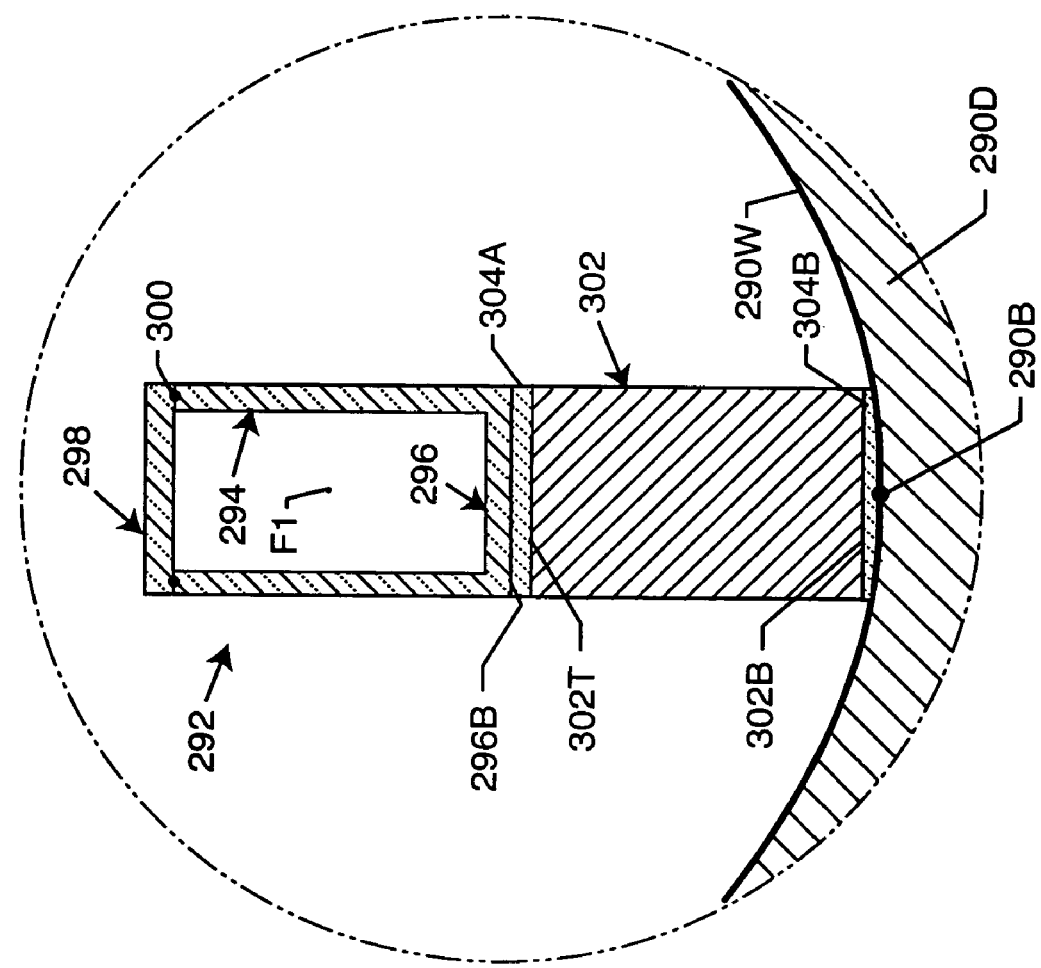
FIG. 5B is a detail view of the FIG. 5A bulb and pedestal.

Referring to FIGS. 5A and 5B, a lamp chamber 290 has a surface 290S bounding a surrounding wall 290W of dielectric material which may or may not be continuous with the dielectric material 290D forming the waveguide body, and an open aperture 290A. Surface 290S tapers symmetrically to a chamber bottom 290B, and is shaped to direct light emitted by the plasma in the bulb so as to satisfy ray-divergence specifications levied by the optical system receiving the lamp's output radiation. Such specifications would not necessarily call for either strictly convergent or strictly parallel rays; rays forming a limited numerical aperture are the most likely requirement. In practice, a paraboloidal or an ellipsoidal shape can be used as a starting design point for a lamp chamber surface. The surface shape would then be optimized using commercial ray-tracing software, taking into account the finite emission volume of the plasma in the bulb, geometric constraints imposed by a pedestal or other mount, and constraints imposed by manufacturing processes. Suitable software products include ZEMAX™, available from Zemax Development Corporation of San Diego, Calif., and CODE-V™, available from Optical Research Associates of Pasadena, Calif. FIG. 5A shows two rays R1, R2 emanating from self-enclosed bulb 292 and reflecting off surface 290S. Reflection is due to the natural reflectivity of the chamber wall material, which preferably is alumina. As shown in FIG. 5B, bulb 292 includes a generally cylindrical, transparent wall 294 attached to a bottom 296, and a window 298 hermetically sealed to wall 294 by a seal 300. Preferably, the wall, bottom and window are made of quartz. Bulb 292 is mounted on a ceramic pedestal 302 by attaching generally planar bottom surface 296B of bottom 296 to generally planar top surface 302T of pedestal 302 with a first layer 304A of high purity, high temperature, fast-cure ceramic adhesive such as RESBOND™ 940HT or 989, both alumina-oxide based compounds available from Cotronics Corp. of Brooklyn, N.Y. Bottom surface 302B of pedestal 302 is attached to wall 290W proximate to chamber bottom 290B with a second layer 304B of the ceramic adhesive.

Figure 5C:
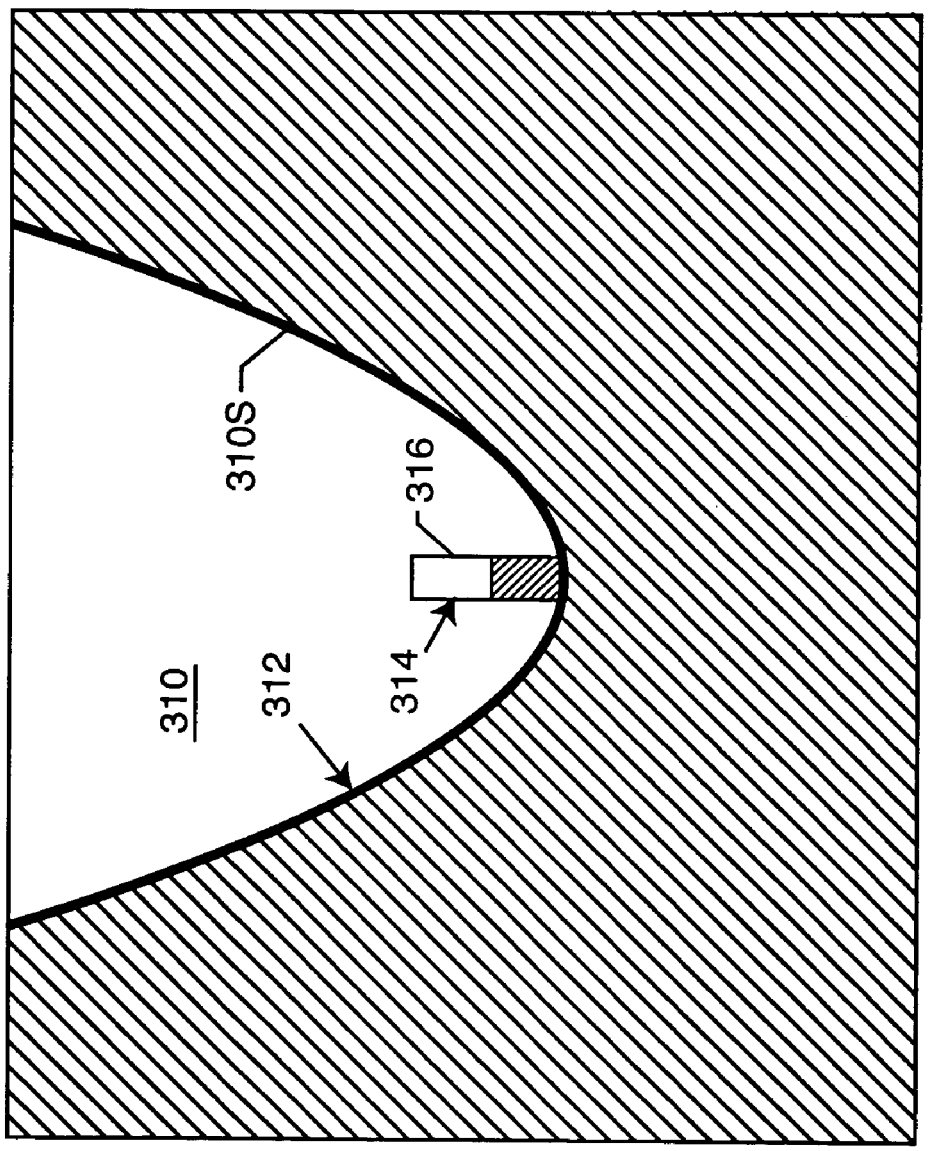
FIG. 5C shows the FIG. 5A configuration with a multi-layer dielectric coating on the lamp chamber surface.

FIG. 5C shows a modification of the FIG. 5A bulb and lamp chamber embodiment wherein the surface 310S of lamp chamber 310 is coated with a thin-film, multi-layer dielectric coating 312 such as described above. Radiation exiting bulb 314 through generally cylindrical, transparent wall 316 is reflected from coated surface 310S so heat energy cannot be recycled in the bulb.

Figure 5D:
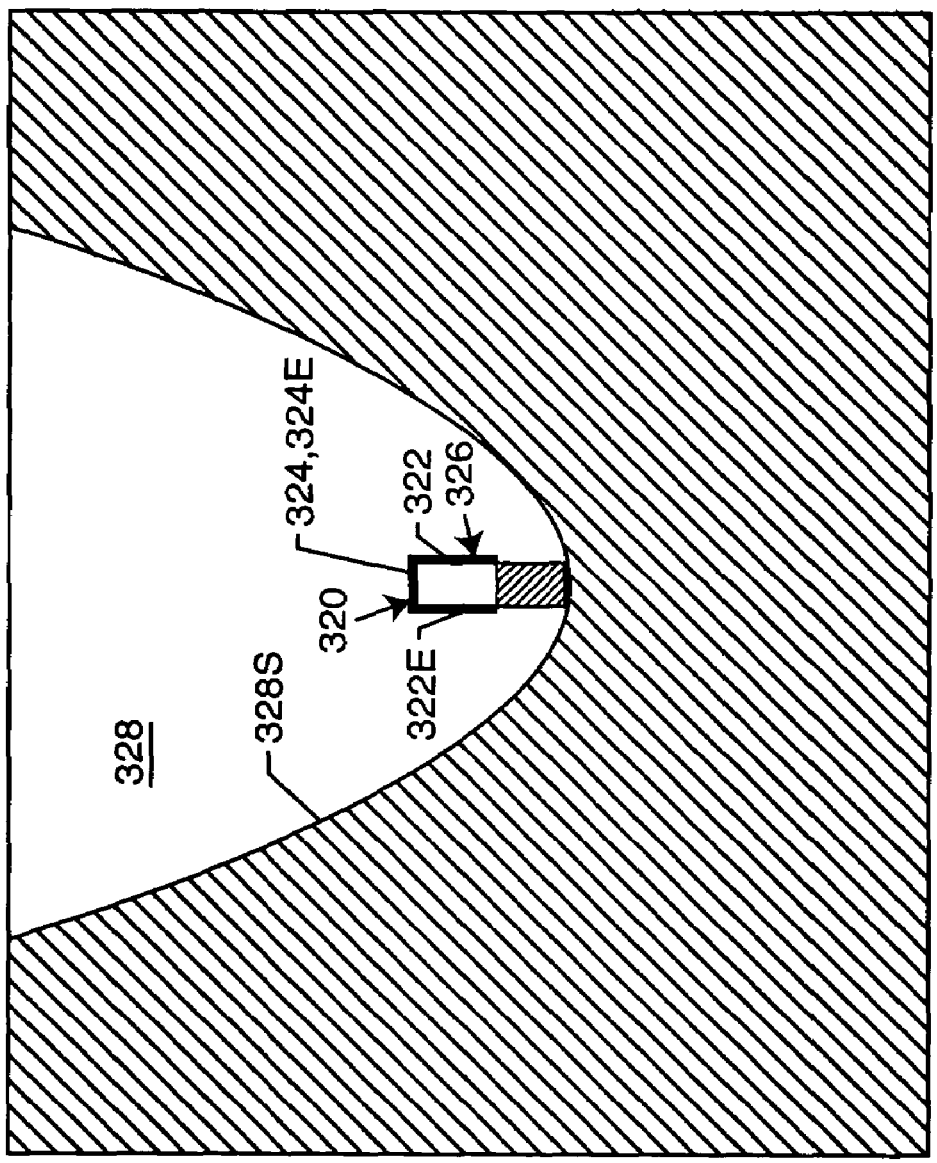
FIG. 5D shows the FIG. 5A configuration with a multi-layer dielectric coating on the exterior surfaces of the bulb wall and window.

FIG. 5D shows a modification of the FIG. 5A bulb and lamp chamber embodiment wherein the exterior surfaces 322E, 324E, respectively, of generally cylindrical, transparent wall 322 and window 324 of bulb 320 are coated with a thin-film, multi-layer dielectric coating 326. Coating 326 can be tailored so that most of the radiation from the plasma is reflected back into the bulb, providing high efficiency, while radiation in at least one selected spectral band escapes and is reflected from uncoated surface 328S of lamp chamber 328.

Figure 5E:
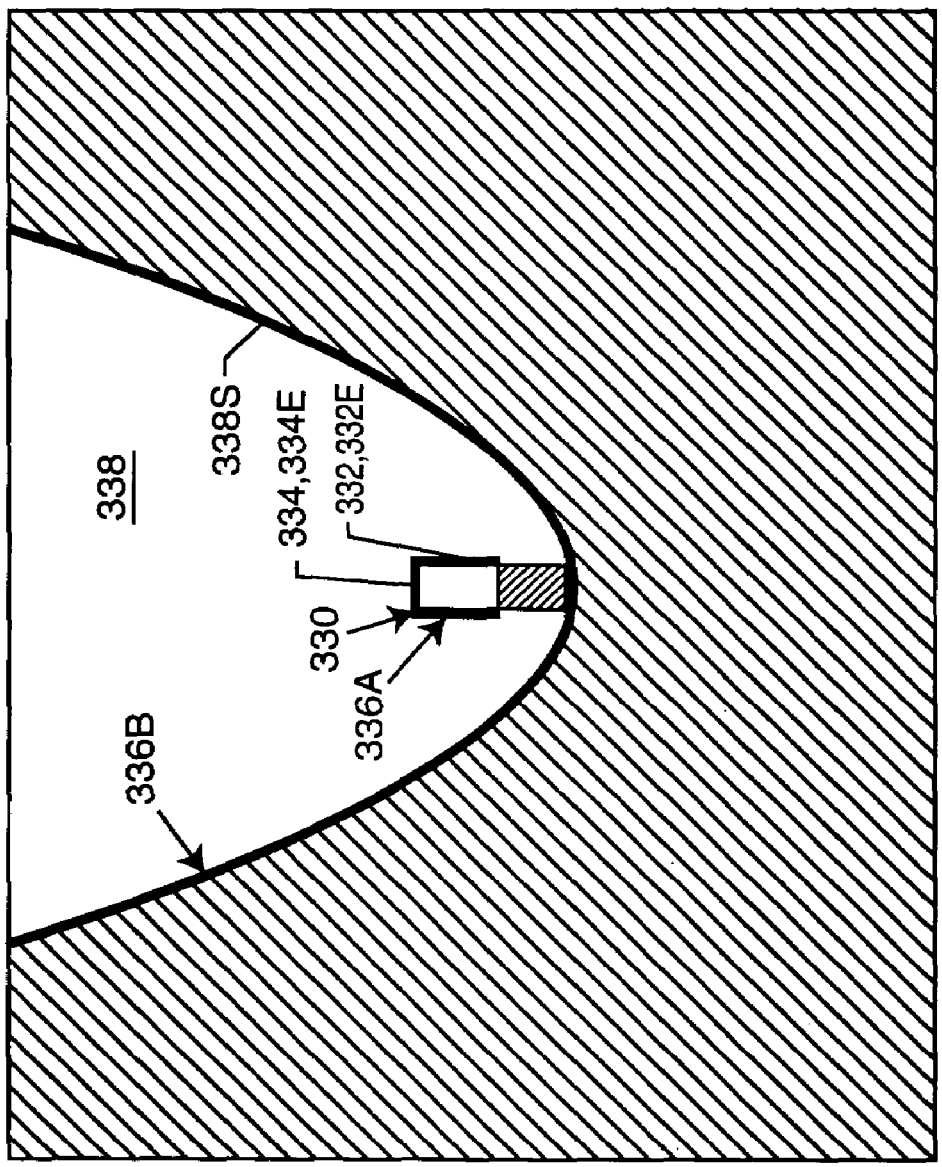
FIG. 5E shows the FIG. 5A configuration with a multi-layer dielectric coating on the exterior surfaces of the bulb wall and window, and on the lamp chamber surface.

FIG. 5E shows a modification of the FIG. 5A bulb and lamp chamber embodiment wherein the exterior surfaces 332E, 334E, respectively, of generally cylindrical, transparent wall 332 and window 334 of bulb 330 are coated with a thin-film, multi-layer dielectric first coating 336A, and surface 338S of lamp chamber 338 is coated with a thin-film, multi-layer dielectric second coating 336B. Coatings 336A and 336B can be tailored so that most of the excited plasma's emission spectrum is reflected back into the bulb to recycle heat energy, while those portion(s) of the spectrum transmitted through coating 336A are selectively reflected from coated surface 336B so that only optically useful light is directed outwardly. This embodiment provides high efficiency and also allows tailoring coatings 336A and 336B to provide the precise wavelength(s) or spectral band(s) desired.

Figure 5F:
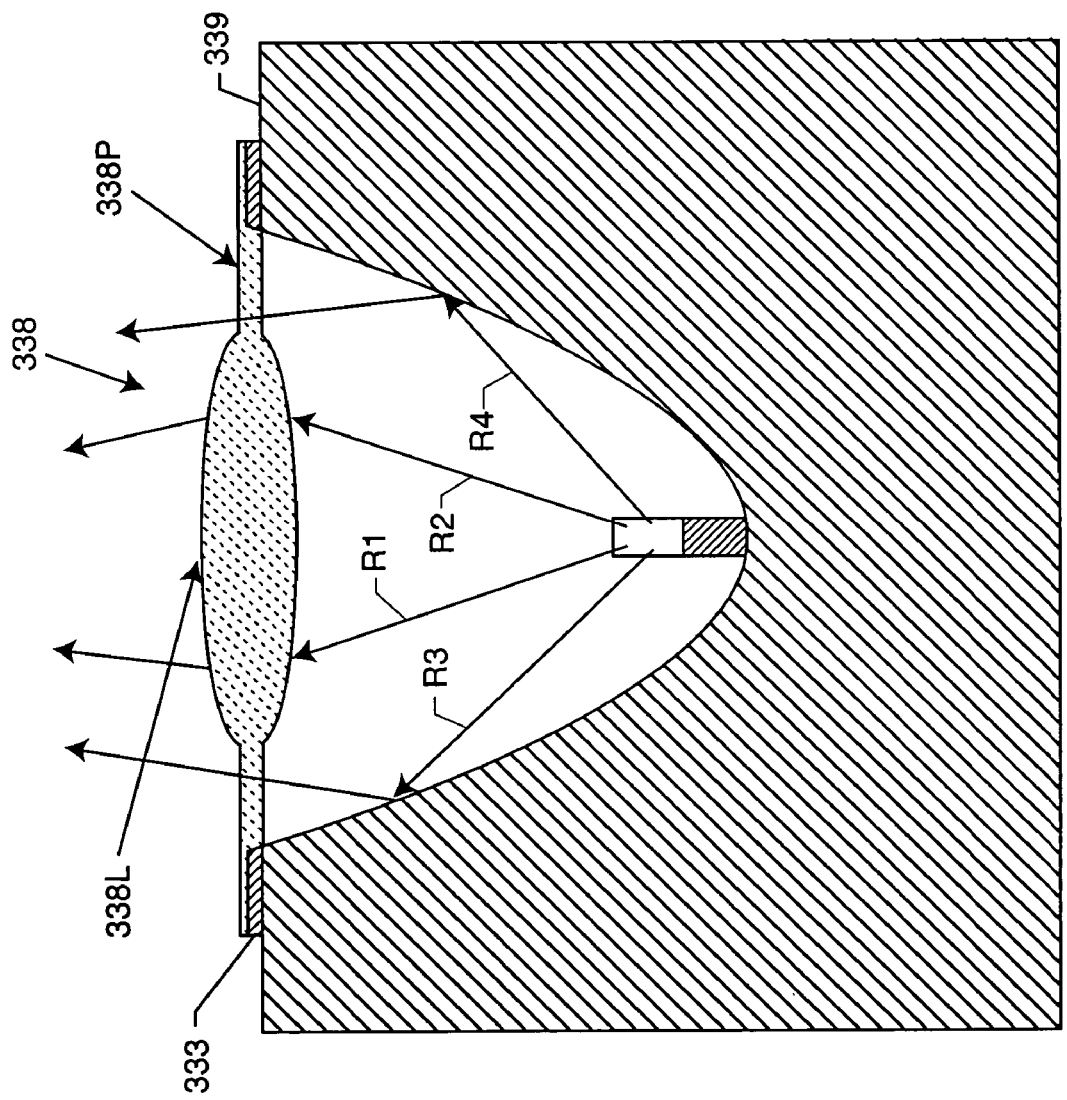
FIG. 5F shows the FIG. 5A configuration with a partial-lens, including a lens portion and a planar portion, covering the chamber aperture.

FIG. 5F shows a partial-lens cover 338 which can be used in conjunction with any of the FIGS. 5A-E embodiments. Cover 338, which totally covers the chamber aperture, includes an inner lens portion 338L and an outer planar portion 338P, each made of a transparent material such as quartz. Planar portion 338P is attached by an adhesive layer 333 to the waveguide wall surface 339 circumscribing the aperture. The optical prescription of the lens and the area-fraction of the lens vis-a-vis planar portions are design parameters determined using commerical ray-tracing software. Partial lens-cover 338 manipulates the divergence of rays emanating from the bulb. A fraction of the bulb's direct rays, shown schematically as rays R1, R2, are focused by lens portion 338L, while a fraction of the bulb's reflected rays, shown schematically as rays R3, R4, pass undeflected through planar portion 338P. A fraction of the lamp's direct rays will escape unfocused from planar portion 338P, while a fraction of the reflected rays will be wrongly focused by lens portion 338L. However, considering that the position of the bulb in the chamber and the chamber bottom shape can potentially be subject to form-factor constraints such that they cannot form geometries ideal for converging the bulb's output radiation, a partial-lens cover can in such circumstances improve a lamp's overall optical divergence properties.

Thin-film, multi-layer coatings applied to the exterior surfaces of plasma bulbs made of quartz or a similar material would undergo many cycles of heating to temperatures that could approach 1000° C. and cooling to room temperature. The longevity of such coatings remains to be determined. FIGS. 6A and 6B illustrate an embodiment which obviates this potential problem. A generally cylindrical, transparent bulb 340 made of quartz or a similar material is surrounded by first and second C-shaped half-cylinders 342A, 342B, respectively, having interior surfaces 344A, 344B, respectively, and pairs of first and second ends 346A, 348A and 346B, 348B, respectively. Surfaces 344A and 344B are coated with a thin-film, multi-layer coating 350. Half-cylinders 342A, 342B, which may or may not be transparent, are made of a material having a CTE similar to that of coating 350. Ends (346A, 346B) and (348A, 348B) are joined, using a high purity, high temperature, fast-cure ceramic adhesive such as RESBOND™ 940HT or 989 alumina-oxide based compound, to form a generally cylindrical sleeve 352 concentric about bulb 340. Preferably, sleeve 352 is separated from exterior surface 340E of bulb 340 by an air gap 354. Alternatively, there is no air gap. Because coating 350 is on surfaces 344A and 344B rather than on bulb surface 340E, the coating is not directly subjected to extreme temperature variation due to the bulb's heating-cooling cycle. Moreover, it is subjected to the mechanical stress of the matched-CTE sleeve rather than that of the bulb.

Figures 7A, 7B:
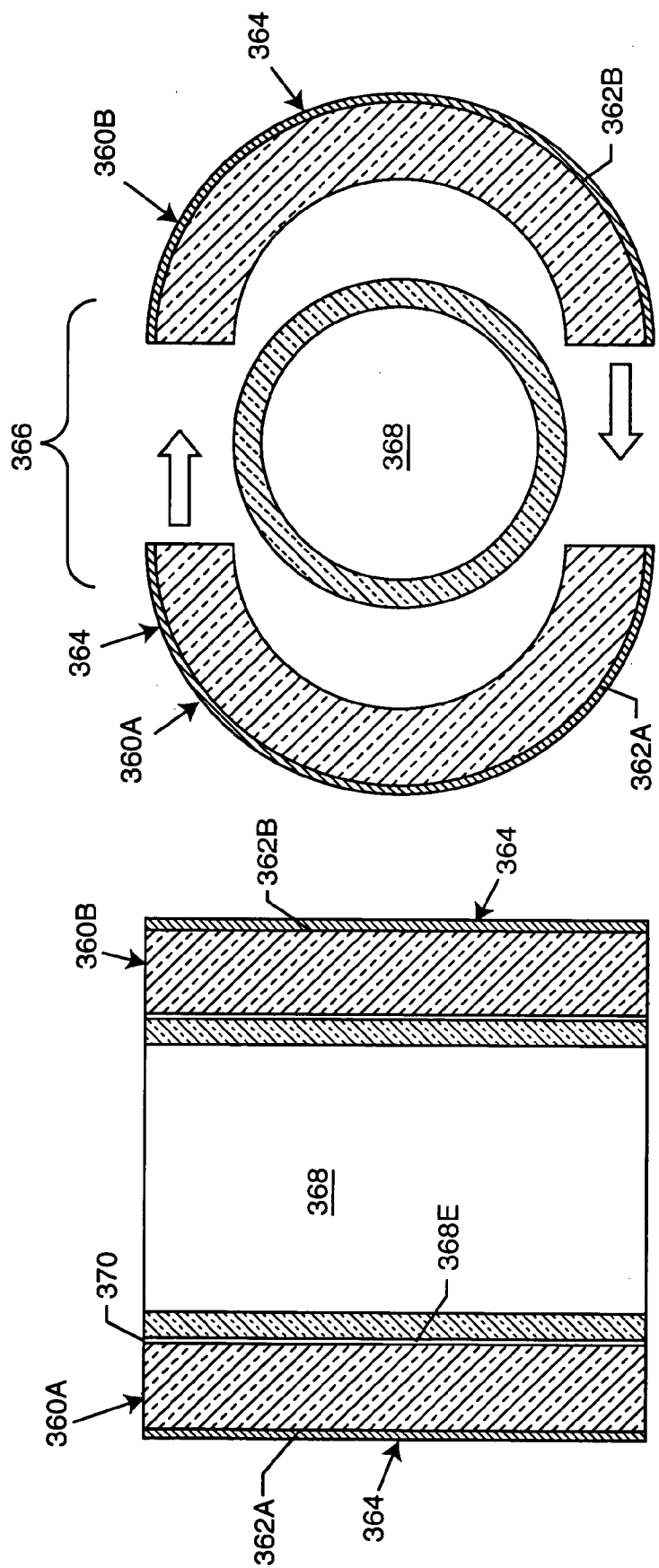
FIG. 7A is an elevational view of a bulb having a transparent, cylindrical wall concentric with and surrounded by a transparent dielectric sleeve split into two halves, and separated from the sleeve by an air gap. A multi-layer dielectric coating is on the exterior surface of each sleeve half.
FIG. 7B is an exploded plan view of the FIG. 7A configuration.

FIGS. 7A and 7B illustrate an embodiment similar to that in FIGS. 6A, 6B, wherein C-shaped half-cylinders 360A, 360B, respectively, are made of quartz or a similar transparent material and have exterior surfaces 362A, 362B, respectively, coated with a thin-film, multi-layer coating 364. A sleeve 366 formed by joining the half-cylinders 360A, 360B preferably is separated from exterior surface 368E of bulb 368 by an air gap 370. Alternatively, there is no air gap. Because coating 364 is insulated from bulb 368 by sleeve 366 and air gap 370, coating 364 is subjected to much less temperature variation than coating 350.

The two-piece sleeves shown in FIGS. 6A, 6B and 7A, 7B can circumvent a potential problem in the manufacture of the thin-film, multi-layer coating. Tailoring the reflective properties of a multi-layer coating depends on being able to finely control the thickness of the individual layers. While geometric constraints on the material beams used in deposition processes typically employed to apply such coatings may make it impractical to simultaneously coat all surfaces of a cylindrical sleeve, simultaneous coating of both half-cylinders can be achieved.

Figure 8B:
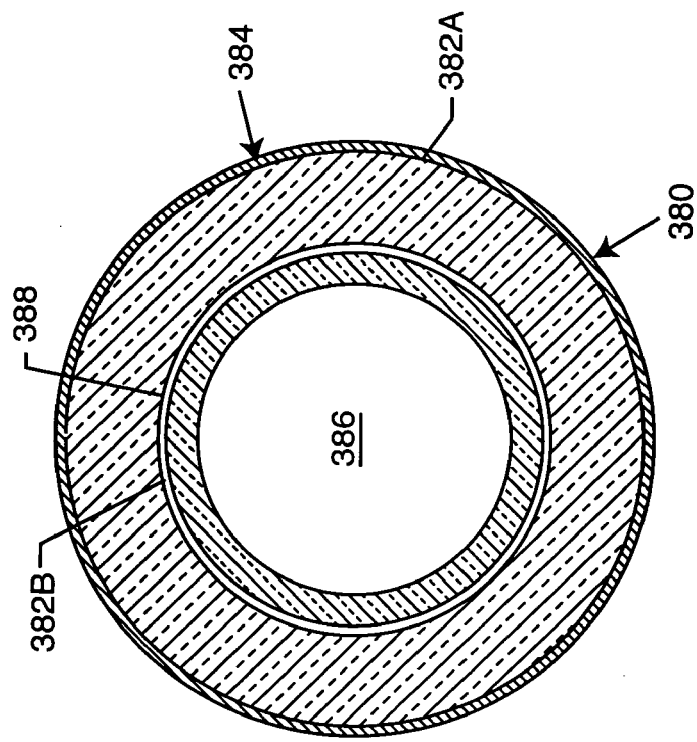
FIG. 8B is an exploded plan view of the FIG. 8A configuration.
Figure 8A:
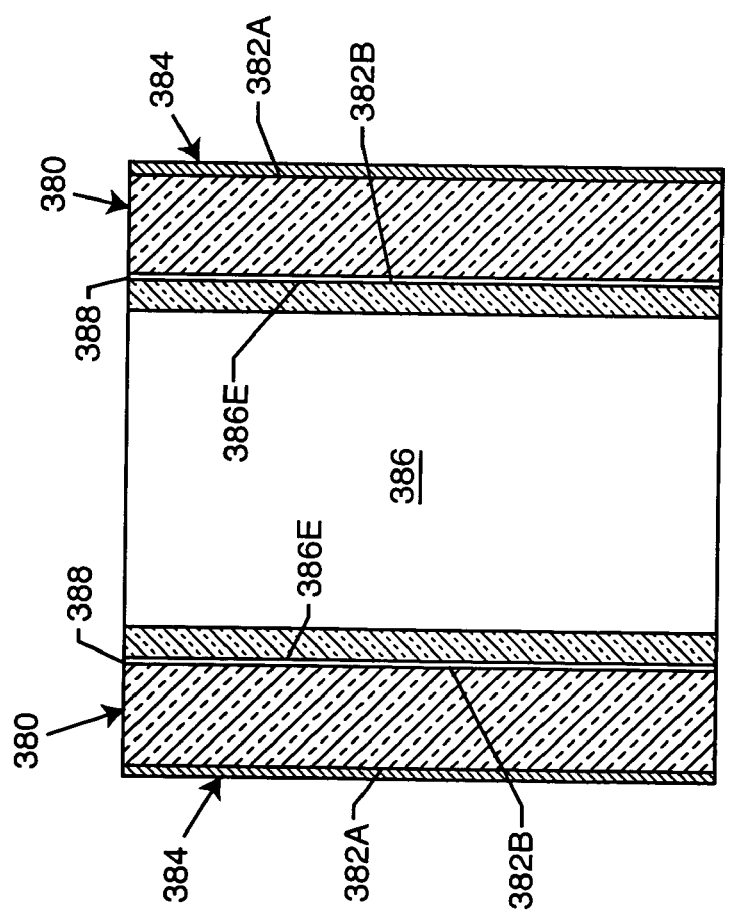
FIG. 8A is an elevational view of a bulb having a transparent, cylindrical wall concentric with and surrounded by a transparent dielectric one-piece sleeve, and separated from the sleeve by an air gap. A multi-layer dielectric coating is on the exterior surface of the sleeve.

FIGS. 8A and 8B illustrate an embodiment wherein a generally cylindrical, one-piece sleeve 380 made of quartz or a similar transparent material has an exterior surface 382A coated with a thin-film, multi-layer coating 384. Interior surface 382B of sleeve 380 preferably is separated from exterior surface 386E of bulb 386 by an air gap 388. Alternatively, there is no air gap. Coating 384 is insulated from bulb 386 by sleeve 380 and air gap 388, so is subjected to much less temperature variation than coating 350 and about as much temperature variation as coating 364.

We have found that for the bulb and lamp chamber embodiments shown in FIGS. 3A-B and 5A-F, whether or not the bulb is enclosed in any of the FIGS. 6A-B, 7A-B, 8A-B sleeves, intimate mechanical contact between the bulb and/or sleeve and the surrounding support structure is often insufficient to provide adequate waste heat removal through conduction. In such cases, use of at least one high purity, high temperature, fast-cure ceramic adhesive layer between a bulb and the support structure (see FIG. 5B) or between sleeve outer surfaces and the support structure is necessary to provide the required heat conduction. Preferred adhesives are RESBOND 940HT or 989. For the bulb and lamp chamber embodiments shown in FIGS. 4A-D, adequate waste heat removal can be achieved by using a bulb support structure having high thermal conductivity.

A DWIPL can consist of a single integrated assembly including: a waveguide body with one or more lamp chambers each containing either a bulb envelope sealed to the environment or a self-enclosed bulb; a driver circuit and driver circuit board; a thermal barrier separating the body and driver circuit; and an outer heatsink. Alternatively, separate packages are used for: (a) the lamp body and heatsink; and (b) the driver circuit and its heatsink. For a DWIPL utilizing two probes (see FIGS. 11A and 11B, and FIG. 6 of the '718 application), the body and driver circuit are connected by two RF power cables, one connecting the output of the driver circuit to the body, and the other providing feedback from the body to the driver circuit. The use of two separate packages allows greater flexibility in the distribution of lamp heat and lamp driver heat.

When microwave power is applied from the driver circuit to the lamp body, it heats the fill mixture, melting and then vaporizing the salt or halide, causing a large increase in the lamp chamber pressure. Depending on the salt or halide used, this pressure can become as high as 400 atmospheres, and the bulb temperature as high as 1000° C. Consequently, a seal attaching a window or lens to a lamp body side or the wall of a self-enclosed bulb must be extremely robust.

Figure 10B:
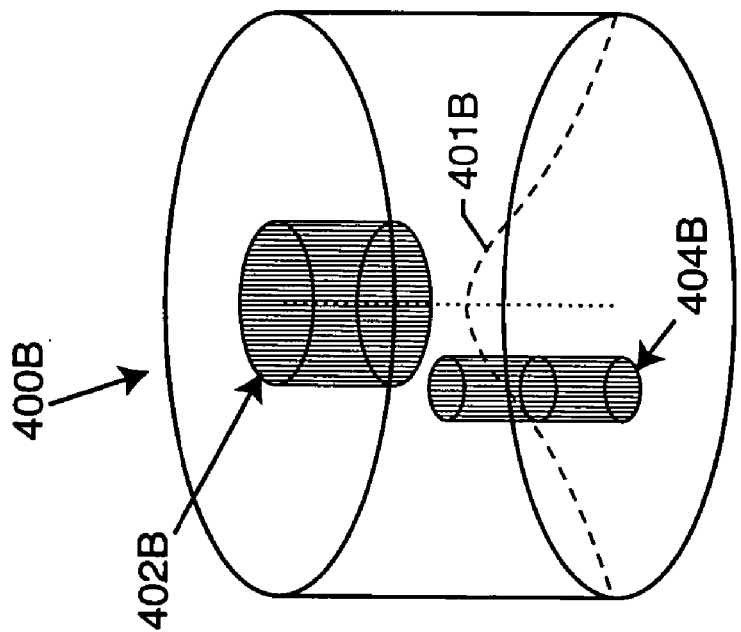
FIG. 10B schematically depicts the FIG. 10A DWIPL wherein the bulb is located at the electric field maximum of the FIG. 10A resonant mode, and a drive probe is offset from the maximum. The FIG. 10B probe is longer than the FIG. 10A probe to compensate for coupling loss due to the offset.
Figure 10A:
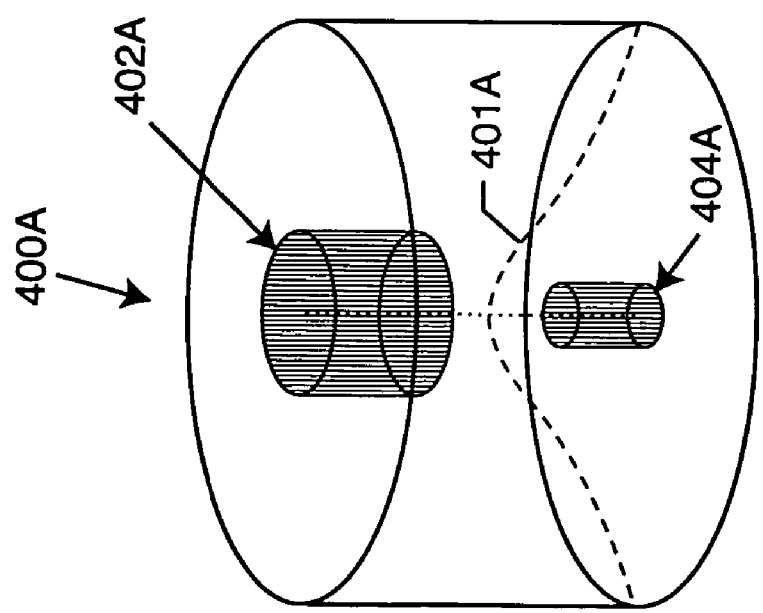
FIG. 10A schematically depicts a DWIPL having a cylindrical body wherein a bulb and a drive probe are located at the electric field maximum of a resonant mode.

Electromagnetically, a DWIPL is a resonant cavity having at least one drive probe supplying microwave power for energizing a plasma contained in at least one bulb. In the following portion of the detailed description "cavity" denotes a DWIPL body. As disclosed in the '718 application, a "bulb" may be a separate enclosure containing a fill mixture disposed within a lamp chamber, or the chamber itself may be the bulb. To provide optimal efficiency, a bulb preferably is located at an electric field maximum of the resonant cavity mode being used. However the bulb can be moved away from a field maximum at the cost of additional power dissipated by the wall and cavity. The location of the drive probe is not critical, as long as it is not at a field minimum, because the desired coupling efficiency can be achieved by varying probe design parameters, particularly length and shape. FIGS. 10A and 10B schematically show two cylindrical lamp configurations 400A, 400B, respectively, both operating at the fundamental cylindrical cavity mode, commonly known as $TM_{0,1,0}$, and having a bulb 402A, 402B, respectively, located at the single electric field maximum. Dashed curves 401A, 401B show, respectively, the electric field distribution in the cavity. In FIG. 10A, a drive probe 404A is located at the field maximum. In FIG. 10B, drive probe 404B is not located at the field maximum; however, it contains a longer probe which provides the same coupling efficiency as probe 404A. Although the $TM_{0,1,0}$ mode is used here as an example, higher order cavity modes, including but not limited to transverse electric field ("TE") and transverse magnetic field ("TM") modes, can also be used.

Drive probe design is critical for proper lamp operation. The probe must provide the correct amount of coupling between the microwave source and lamp chamber to maximize light emitting efficiency and protect the source. There are four major cavity loss mechanisms reducing efficiency: chamber wall dissipation, dielectric body dissipation, plasma dissipation, and probe coupling loss. As defined herein, probe coupling loss is the power coupled out by the drive probe and other probes in the cavity. Probe coupling loss is a major design consideration because any probe can couple power both into and out of the cavity. If the coupling between the source and cavity is too small, commonly known as "under-coupling", much of the power coming from the source will not enter the cavity but be reflected back to the source. This will reduce light emission efficiency and microwave source lifetime. If initially the coupling between the source and cavity is too large, commonly known as "over-coupling", most of the power from the source will enter the cavity. However, the cavity loss mechanisms will not be able to consume all of the power and the excess will be coupled out by the drive probe and other probes in the cavity. Again, light emission efficiency and microwave source lifetime will be reduced. In order to maximize light emission efficiency and protect the source, the drive probe must provide an appropriate amount of coupling such that reflection from the cavity back to the source is minimized at the resonant frequency. This condition, commonly known as "critical coupling", can be achieved by adjusting the configuration and location of the drive probe. Probe design parameters depend on the losses in the cavity, which depend on the state of the plasma and the temperature of the lamp body. As the plasma state and/or body temperature change, the coupling and resonant frequency will also change. Moreover, inevitable inaccuracies during DWIPL manufacture will cause increased uncertainty in the coupling and resonant frequency.

It is not practical to adjust probe physical parameters while a lamp is operating. In order to maintain as close to critical coupling as possible under all conditions, a feedback configuration is required (see FIG. 6 of the '718 application), such as lamp configurations 410A, 410B shown, respectively, in FIGS. 11A and 11B for a rectangular prism-shaped cavity and a cylindrical cavity. A second "feedback" probe 412A, 412B, respectively, is introduced into a cavity 414A, 414B, respectively. Feedback probe 412A, 412B, respectively, is connected to input port 416A, 416B, respectively, of a combined amplifier and control circuit (ACC) 418A, 418B, respectively, and a drive probe 420A, 420B, respectively, is connected to ACC output port 422A, 422B, respectively. Each configuration forms an oscillator. Resonance in the cavity enhances the electric field strength needed to create the plasma and increases the coupling efficiency between the drive probe and bulb. Both the drive probe and feedback probe may be located anywhere in the cavity except near an electric field minimum for electric field coupling, or a magnetic field minimum for magnetic field coupling. Generally, the feedback probe has a lesser amount of coupling than the drive probe because it samples the electric field in the cavity with minimum increase in coupling loss.

From a circuit perspective, a cavity behaves as a lossy narrow bandpass filter. The cavity selects its resonant frequency to pass from the feedback probe to the drive probe. The ACC amplifies this preferred frequency and puts it back into the cavity. If the amplifier gain is greater than the insertion loss at the drive probe entry port vis-a-vis insertion loss at the feedback probe entry port, commonly known as $S_{21}$, oscillation will start at the resonant frequency. This is done automatically and continuously even when conditions, such as plasma state and temperature, change continuously or discontinuously. Feedback enables manufacturing tolerances to be relaxed because the cavity continually "informs" the amplifier of the preferred frequency, so accurate prediction of eventual operating frequency is not needed for amplifier design or DWIPL manufacture. All the amplifier needs to provide is sufficient gain in the general frequency band in which the lamp is operating. This design ensures that the amplifier will deliver maximum power to the bulb under all conditions.

Figure 11B:
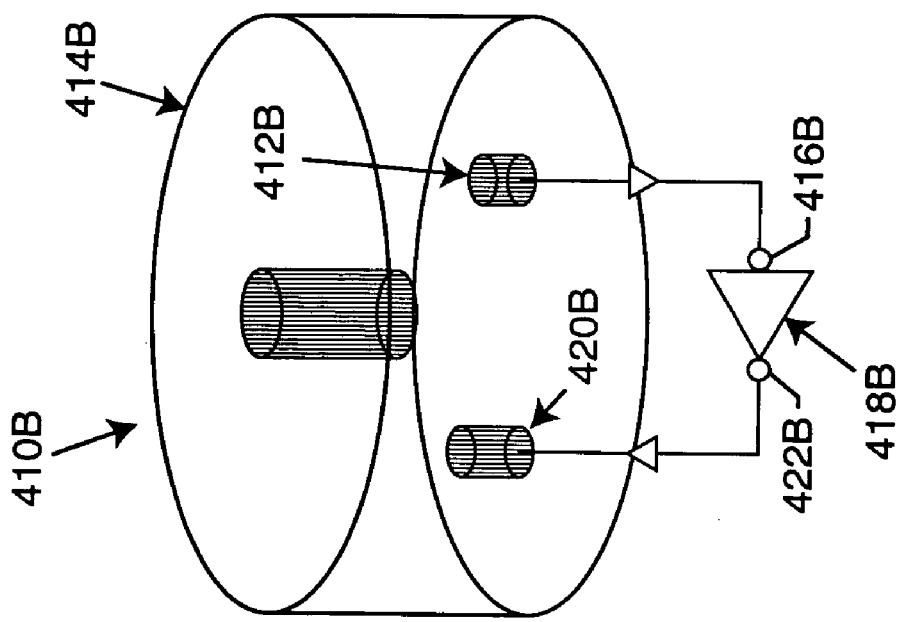
FIG. 11B schematically depicts a DWIPL having a cylindrical body wherein are disposed a bulb, and a drive probe and a feedback probe connected by a combined amplifier and control circuit.
Figure 11A:
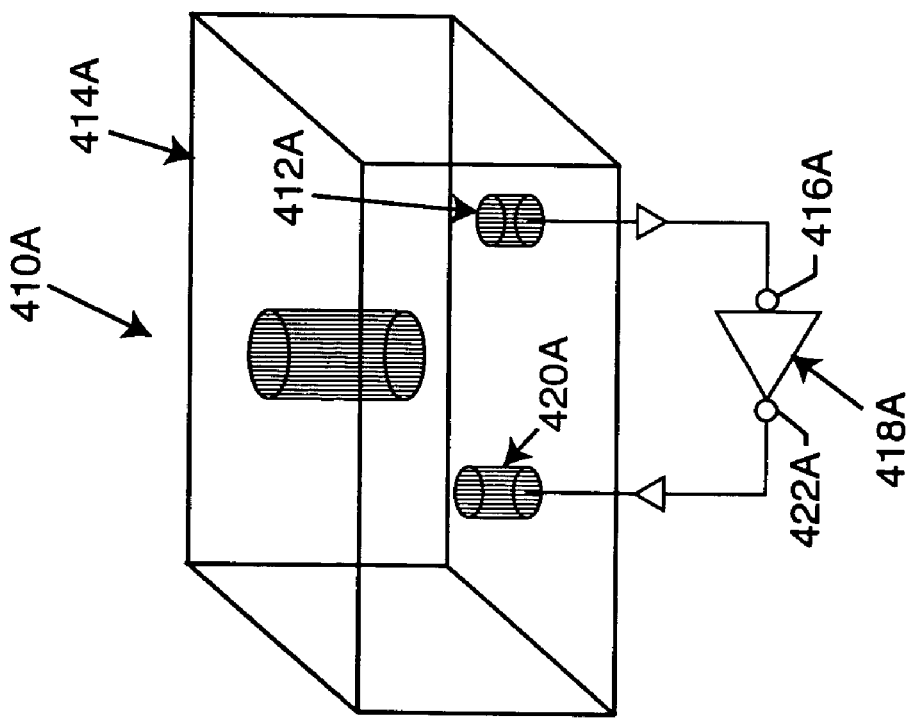
FIG. 11A schematically depicts a DWIPL having a rectangular prism-shaped body wherein are disposed a bulb, and a drive probe and a feedback probe connected by a combined amplifier and control circuit.

In order to maximize light emission efficiency, a drive probe is optimized for a plasma that has reached its steady state operating point. This means that prior to plasma formation, when losses in a cavity are low, the cavity is over-coupled. Therefore, a portion of the power coming from the microwave source does not enter the cavity and is reflected back to the source. The amount of reflected power depends on the loss difference before and after plasma formation. If this difference is small, the power reflected before plasma formation will be small and the cavity will be near critical coupling. A feedback configuration such as shown in FIG. 11A or 11B will be sufficient to break down the gas in the bulb and start the plasma formation process. However, in most cases the loss difference before and after plasma formation is significant and the drive probe becomes greatly over-coupled prior to plasma formation. Because much of the power is reflected back to the amplifier, the electric field strength may not be large enough to cause gas breakdown. Also, the large amount of reflected power may damage the amplifier or reduce its lifetime.

Figure 12:
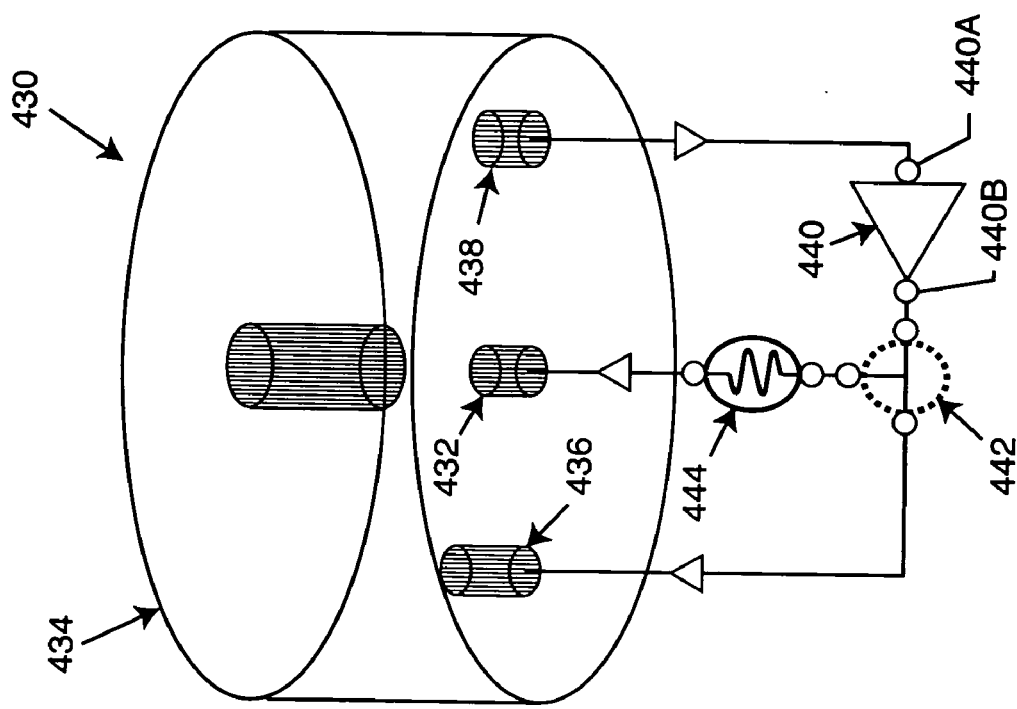
FIG. 12 schematically depicts a first embodiment of a DWIPL utilizing a start probe. The DWIPL has a cylindrical body wherein are disposed a bulb, a drive probe, a feedback probe, and the start probe. The feedback probe is connected to the drive probe by a combined amplifier and control circuit, and a splitter, and is connected to the start probe by the amplifier and control circuit, the splitter, and a phase shifter.

FIG. 12 shows a lamp configuration 430 which solves the drive probe over-coupling problem wherein a third "start" probe 432, optimized for critical coupling before plasma formation, is inserted into a cavity 434. Start probe 432, drive probe 436, and feedback probe 438 can be located anywhere in the cavity except near a field minimum. Power from output port 440B of an ACC 440 is split into two portions by a splitter 442: one portion is delivered to drive probe 436; the other portion is delivered to start probe 432 through a phase shifter 444. Probe 438 is connected to input port 440A of ACC 440. Both the start and drive probes are designed to couple power into the same cavity mode, e.g., $TM_{0,1,0}$ for a cylindrical cavity as shown in FIG. 12. The splitting ratio and amount of phase shift between probes 436 and 432 are selected to minimize reflection back to the amplifier. Values for these parameters are determined by network analyzer S-parameter measurements and/or simulation software such as High Frequency Structure Simulator (HFSS) available from Ansoft Corporation of Pittsburgh, Pa. In summary, the start probe is critically coupled before plasma formation and the drive probe is critically coupled when the plasma reaches steady state. The splitter and phase shifter are designed to minimize reflection back to the combined amplifier and control circuit.

Figure 13:
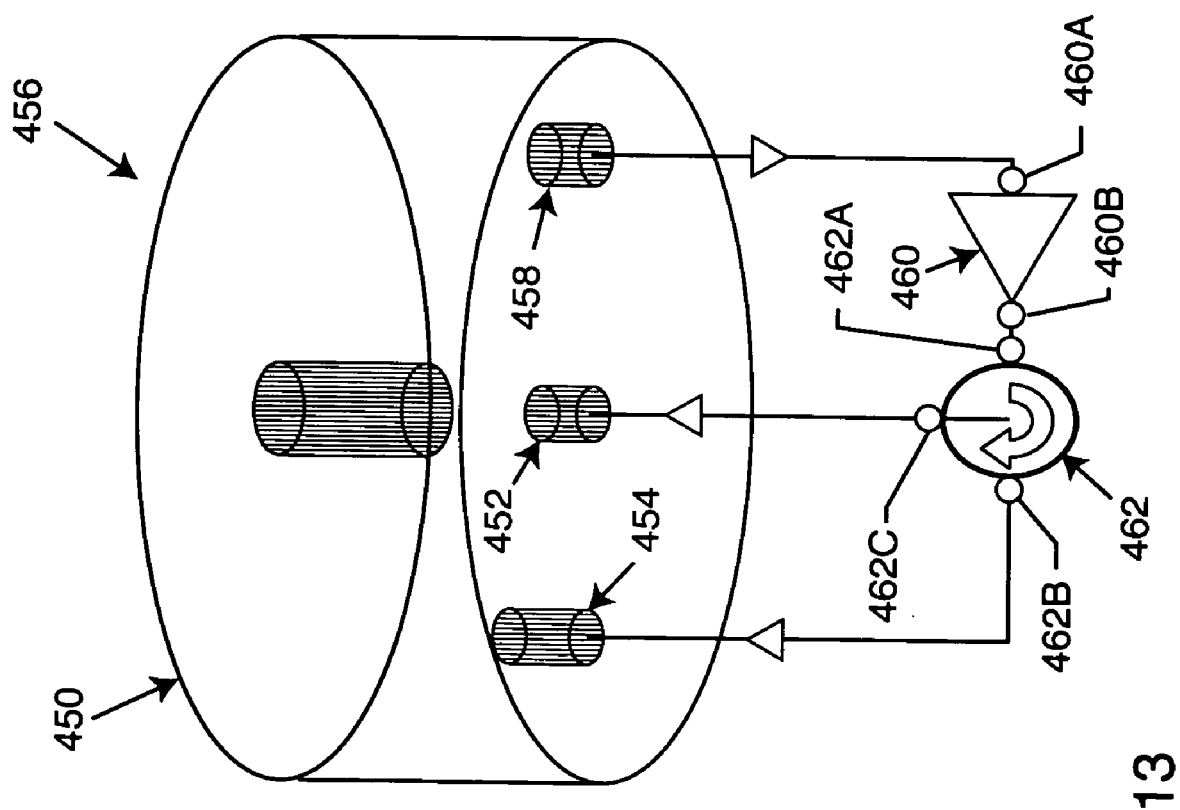
FIG. 13 schematically depicts a second embodiment of a DWIPL utilizing a start probe. The DWIPL has a cylindrical body wherein are disposed a bulb, a drive probe, a feedback probe, and the start probe. The feedback probe is connected to the drive probe and the start probe by a combined amplifier and control circuit, and a circulator.

FIG. 13 shows a second lamp configuration 450 which solves the drive probe over-coupling problem. Both start probe 452 and drive probe 454 are designed to couple power into the same cavity mode, e.g., $TM_{0,1,0}$ for a cylindrical cavity such as cavity 456. Configuration 450 further includes a feedback probe 458 connected to input port 460A of an ACC 460. The three probes can be located anywhere in the cavity except near a field minimum. Power from output port 460B of ACC 460 is delivered to a first port 462A of a circulator 462 which directs power from port 462A to a second port 462B which feeds drive probe 454. Prior to plasma formation, there is a significant amount of reflection coming out of the drive probe because it is over-coupled before the plasma reaches steady state. Such reflection is redirected by circulator 462 to a third port 462C which feeds the start probe 452. Before plasma formation, the start probe is critically coupled so that most of the power is delivered into the cavity 456 and start probe reflection is minimized. Only an insignificant amount of power goes into port 462C and travels back to ACC output port 460B. Power in the cavity increases until the fill mixture breaks down and begins forming a plasma. Once the plasma reaches steady state, the drive probe 454 is critically coupled so reflection from the drive probe is minimized. At that time, only an insignificant amount of power reaches the now under-coupled start probe 452. Although the start probe now has a high reflection coefficient, the total amount of reflected power is negligible because the incident power is insignificant. In summary, the start probe is critically coupled before plasma formation and the drive probe is critically coupled when the plasma reaches steady state. The circulator directs power from port 462A to 462B, from port 462B to port 462C, and from port 462C to port 462A.

Figure 14B:
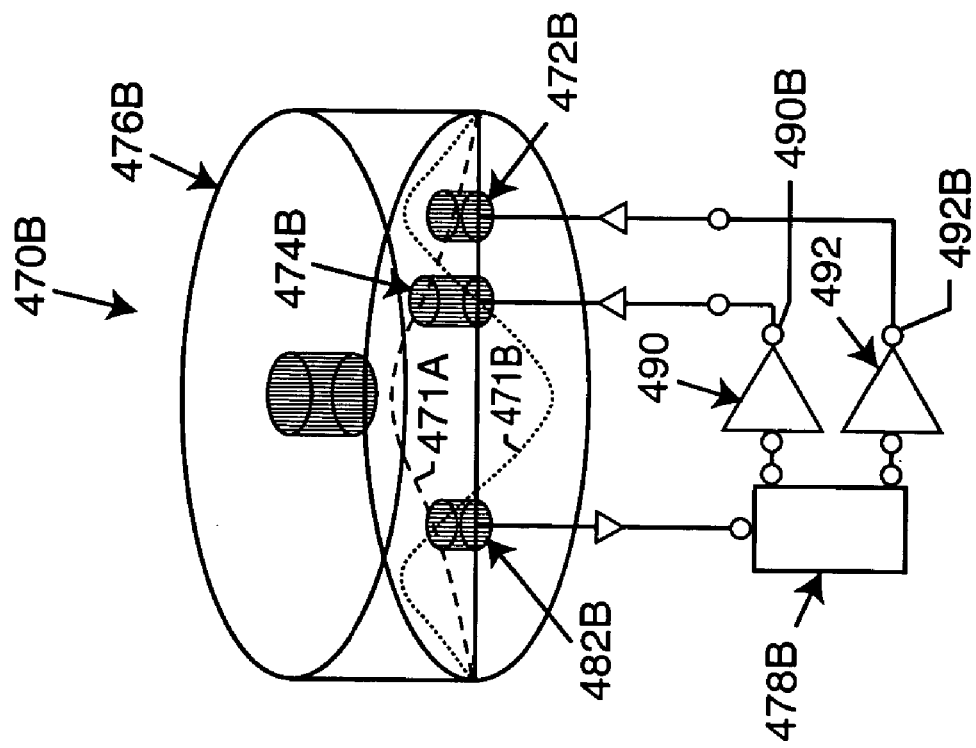
FIG. 14B schematically depicts an alternative configuration of the FIG. 14A embodiment wherein the feedback probe is connected to the drive probe by a diplexer and a first combined amplifier and control circuit, and to the start probe by the diplexer and a second combined amplifier and control circuit.
Figure 14A:
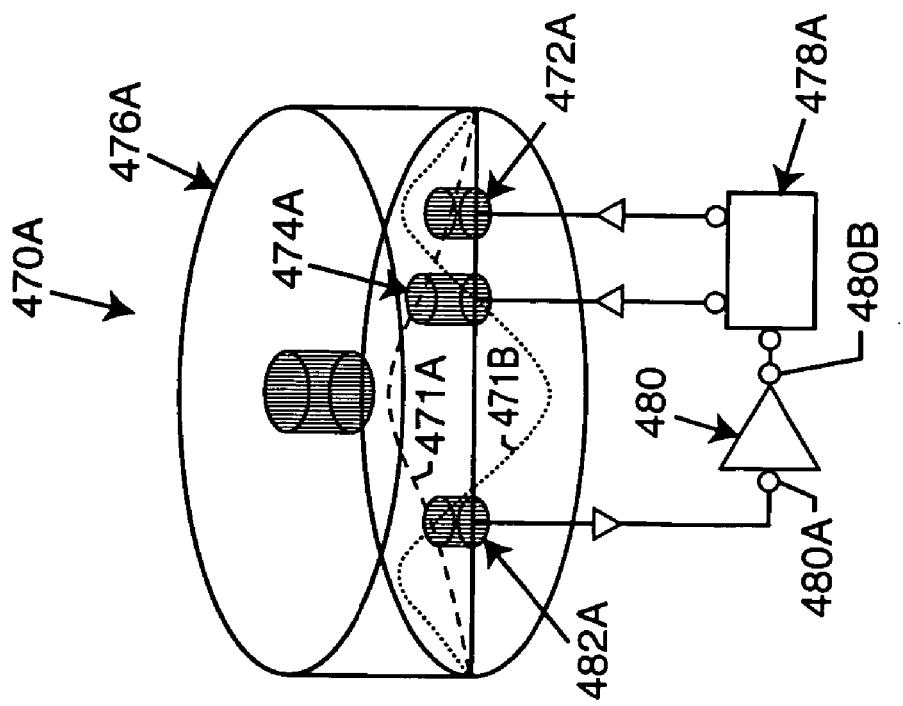
FIG. 14A schematically depicts a third embodiment of a DWIPL utilizing a start probe. The DWIPL has a cylindrical body wherein are disposed a bulb, a drive probe, a feedback probe, and the start probe. The feedback probe is connected to the drive probe and the start probe by a combined amplifier and control circuit, and a diplexer.

FIGS. 14A and 14B show third and fourth lamp configurations 470A, 470B which solve the drive probe over-coupling problem. A "start" cavity mode is used before plasma formation, and a separate "drive" cavity mode is used to power the plasma to its steady state and maintain that state. Start probe 472A, 472B, respectively, operates in the start cavity mode, and drive probe 474A, 474B, respectively, operates in the drive cavity mode. As indicated by dashed curves 471A and 471B, preferably the drive cavity mode is the fundamental cavity mode and the start cavity mode is a higher order cavity mode. This is because normally it requires more power to maintain the steady state plasma with the desired light output than to break down the gas for plasma formation. Therefore it is more economical to design a DWIPL so the high power microwave source operates at a lower frequency. For a cylindrical cavity such as cavities 476A and 476B, the start probe 472A, 472B, respectively, can be critically coupled at the resonant frequency of the $TM_{0,2,0}$ mode before plasma formation, and the drive probe 474A, 474B, respectively, can be coupled at the resonant frequency of the $TM_{0,1,0}$ mode after the plasma reaches steady state. The feedback probe can be located anywhere in the cavity except near a field minimum of the drive cavity mode or a field minimum of the start cavity mode. The start probe can be located anywhere in the cavity except near any field minima of the start cavity mode. The drive probe should be located near or at a field minimum of the start cavity mode but not near a field minimum of the drive cavity mode. This minimizes the coupling loss of the drive probe before plasma formation so that the electric field in the cavity can reach a higher value to break down the gas. A diplexer 478A, 478B, respectively, is used to separate the two resonant frequencies. In FIG. 14A, a single ACC 480 connected at its output 480B to diplexer 478A is used to power both cavity modes. The two frequencies are separated by diplexer 478A and fed to the start probe 472A and drive probe 474A. Feedback probe 482A is connected to input port 480A of ACC 480. In FIG. 14B, two separate amplifiers 490, 492 with output ports 490B, 492B, respectively, are used to power the two cavity modes independently. Diplexer 478B separates the two frequencies coming out of feedback probe 482B. In summary, the start probe operates in one cavity mode and the drive probe operates in a different mode. The feedback probe can be located anywhere in the cavity except near a field minimum of either mode. The start probe can be located anywhere in the cavity except near a field minimum of the start cavity mode. The drive probe should be located near or at a field minimum of the start cavity mode but not near a field minimum of the drive cavity mode.

An alternative to the approach shown in FIG. 14B is to split the feedback probe 482B into two feedback probes, thereby eliminating the need for diplexer 478B. The first feedback probe is located at a field minimum of the start cavity mode to couple out only the drive cavity mode, which is then amplified by ACC 490 connected at its output 490B to drive probe 474B. The second feedback probe is located at a field minimum of the drive cavity mode to couple out only the start cavity mode, which is then amplified by ACC 492 connected at its output 492B to start probe 472B. Two separate feedback loops are implemented, with the function of the diplexer separating the drive and start cavity modes being replaced by proper placement of the two feedback probes.

Figure 15B:
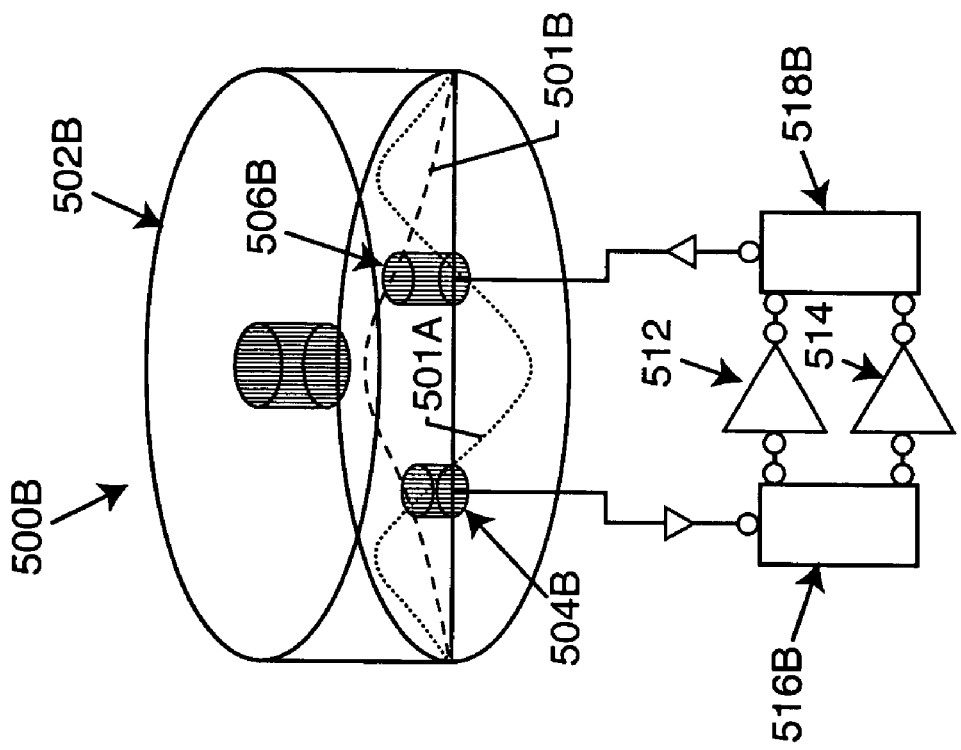
FIG. 15B schematically depicts an alternative configuration of the FIG. 15A embodiment wherein the feedback probe is connected to the drive probe by first and second diplexers and first and second combined amplifiers and control circuits.
Figure 15A:
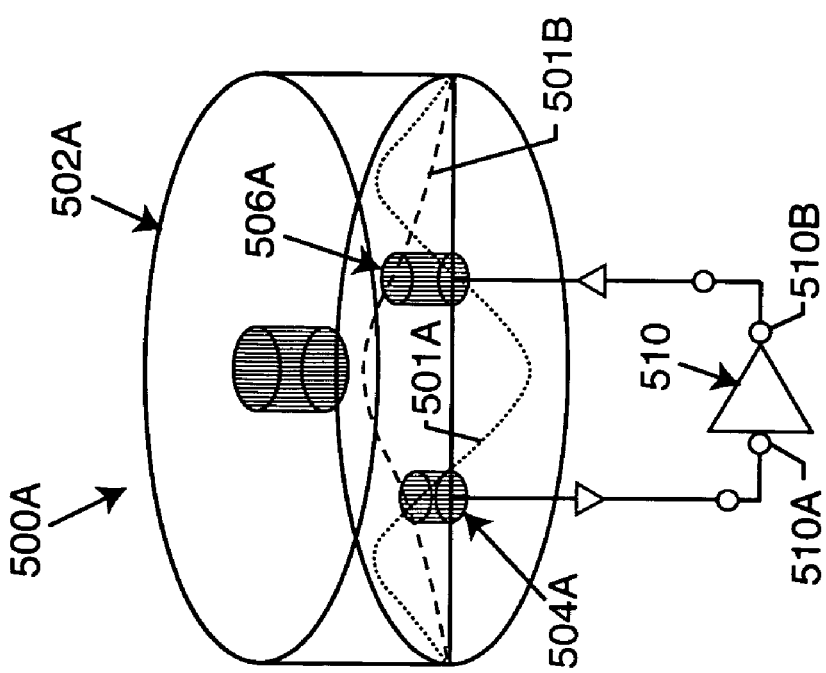
FIG. 15A schematically depicts a DWIPL wherein a start resonant mode is used before plasma formation and a drive resonant mode is used to power the plasma to steady state. The DWIPL has a cylindrical body wherein are disposed a bulb, a drive probe, and a feedback probe. A combined amplifier and control circuit connects the drive and feedback probes.

FIGS. 15A and 15B show lamp configurations 500A, 500B, respectively, which do not include a start probe but utilize two separate cavity modes. As indicated by curves 501A and 501B, respectively, in cavities 502A and 502B, a relatively high order start cavity mode is used before plasma formation and a relatively low order drive cavity mode is used to power the plasma to steady state and maintain the state. Preferably, for economy and efficiency, the drive cavity mode again is the fundamental cavity mode and the start cavity mode is a higher order cavity mode. For example, the $TM_{0,2,0}$ mode of a cylindrical lamp cavity can be used before plasma formation, and the $TM_{0,1,0}$ mode can be used to maintain the plasma in steady state. By utilizing two cavity modes, it is possible to design a single drive probe that is critically coupled both before plasma formation and after the plasma reaches steady state, thereby eliminating the need for a start probe. The feedback probe 504A, 504B, respectively, can be located anywhere in the cavity except near a field minimum of either cavity mode. The drive probe 506A, 506B, respectively, should be located near a field minimum of the start cavity mode but not near a field minimum of the drive cavity mode. By placing the drive probe near but not at a field minimum of the start cavity mode, the drive probe can be designed to provide the small amount of coupling needed before plasma formation and the large amount of coupling required after the plasma reaches steady state when the plasma loss greatly increases. In FIG. 15A, a single ACC 510 having input and output ports 510A, 510B, respectively, is used to power both cavity modes. In FIG. 15B, two separate ACC's 512, 514 are used to power the two cavity modes independently. A first diplexer 516B separates the two frequencies coming out of feedback probe 504B and a second diplexer 518B combines the two frequencies going into drive probe 506B. In summary, the drive probe is critically coupled at the start cavity mode resonant frequency before plasma formation and critically coupled at the drive cavity mode resonant frequency when the plasma reaches steady state. The feedback probe can be located anywhere in the cavity except near a field minimum of either cavity mode. The drive probe should be located near a field minimum of the start cavity mode but not near a field minimum of the drive cavity mode.

The '718 application disclosed a technique for drive probe construction wherein a metallic microwave probe is in intimate contact with the high dielectric material of the lamp body. This method has a drawback in that the amount of coupling is very sensitive to the exact dimensions of the probe. A further drawback is that due to the large temperature variation before plasma formation and after the plasma reaches steady state, a mechanism such as a spring is needed to maintain contact between the probe and body. These constraints complicate the manufacturing process and consequently increase production cost. A technique which avoids both problems is to surround a metallic microwave probe extended into a lamp body with a dielectric material having a high breakdown voltage. (Due to the large amount of power delivered within a limited space, the electric field strength near the probe's tip will be very high; therefore a high breakdown voltage material is required.) Typically, this material has a lower dielectric constant than that of the dielectric material forming the lamp body. The material acts as a "buffer" which desensitizes the dependency of coupling on probe dimensions, thereby simplifying fabrication and reducing cost. Preferred buffer materials are TEFLON™ and mullite, a refractory ceramic. The amount of coupling between the microwave source and body can be adjusted by varying the location and dimensions of the probe, and the dielectric constant of the material. In general, if the probe length is less than a quarter of the operating wavelength, a longer probe will provide greater coupling than a shorter probe. Also, a probe placed at a location with a higher field will provide greater coupling than a probe placed at a location where the field is relatively low. This technique also is applicable to a start probe or a feedback probe. The probe location, shape and dimensions can be determined using network analyzer S-parameter measurements and/or simulation software such as HFSS.

Figure 16:
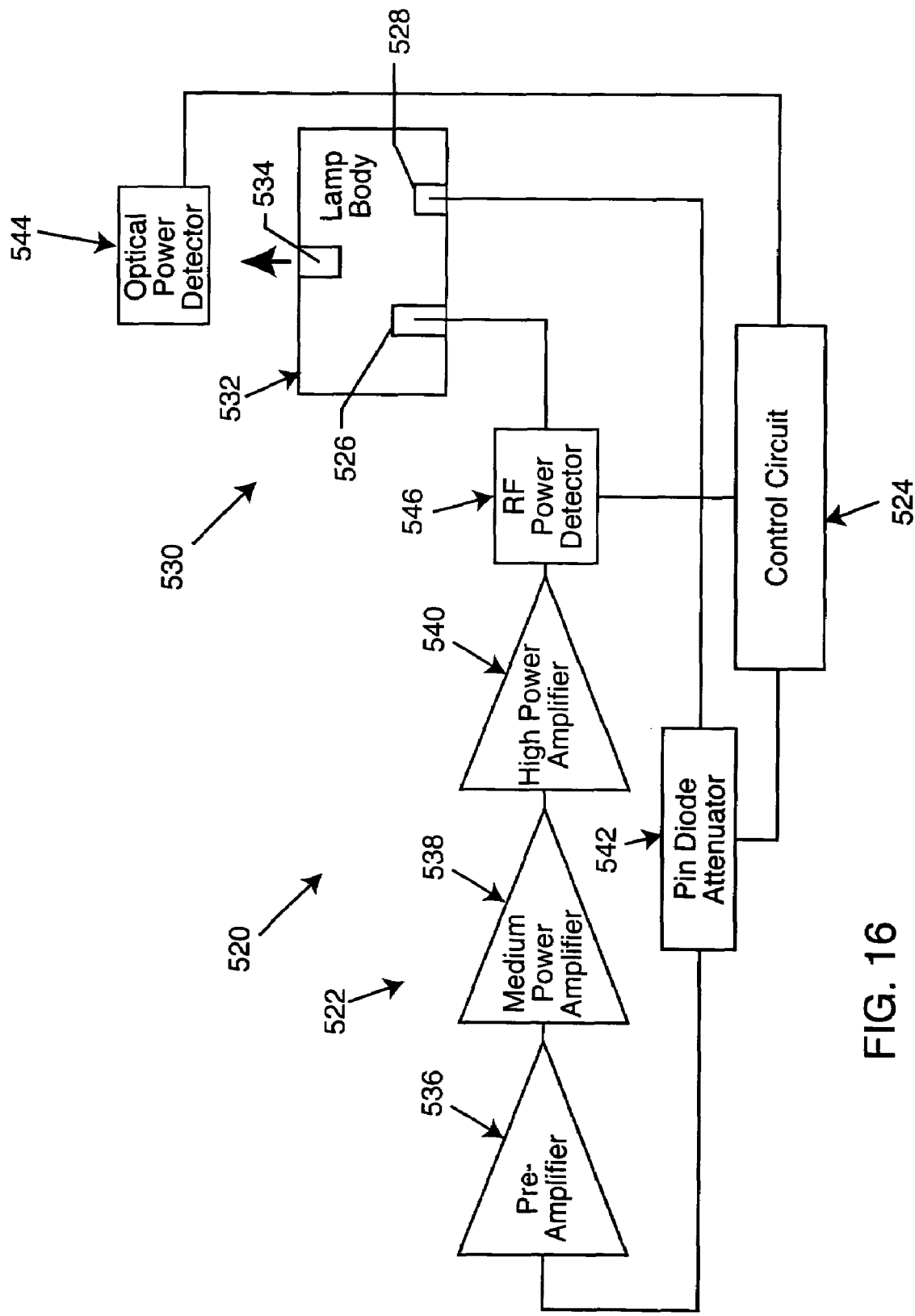
FIG. 16 is a block diagram of a first configuration of the FIGS. 11A, 11B, 15A and 15B combined amplifier and control circuit.

FIG. 16 shows a circuit 520 including an amplifier 522 and a control circuit 524, suitable for DWIPLs having only a drive probe 526 and feedback probe 528 such as shown in FIGS. 11A, 11B, 15A and 15B, and exemplified here by lamp 530. The function of amplifier 522 is to convert dc power into microwave power of an appropriate frequency and power level so that sufficient power can be coupled into lamp body 532 and lamp chamber 534 to energize a fill mixture and form a light-emitting plasma.

Preferably, amplifier 522 includes a preamplifier stage 536 with 20 to 30 dB of gain, a medium power amplifier stage 538 with 10 to 20 dB of gain, and a high power amplifier stage 540 with 10 to 18 dB of gain. Preferably, stage 536 uses the Motorola MHL21336, 3G Band RF Linear LDMOS Amplifier, stage 538 uses the Motorola MRF21030 Lateral N-Channel RF Power MOSFET; and stage 540 uses the Motorola MRF21125 Lateral N-Channel RF Power MOSFET. These devices as well as complete information for support and bias circuits are available from Motorola Semiconductor Products Sector in Austin, Tex. Alternatively, stages 536, 538 and 540 are contained in a single integrated circuit. Alternatively, stages 536 and 538, and control circuit 524 are packaged together, and high power stage 540 is packaged separately.

Amplifier 522 further includes a PIN diode attenuator 542 in series with stages 536, 538 and 540, preferably connected to preamplifier stage 536 to limit the amount of power which the attenuator must handle. Attenuator 542 provides power control for regulating the amount of power supplied to lamp body 532 appropriate for starting the lamp, operating the lamp, and controlling lamp brightness. Since the amplifier chain formed by stages 536, 538 and 540 has a fixed gain, varying the attenuation during lamp operation varies the power delivered to body 532. Preferably, the attenuator 542 acts in combination with control circuit 524, which may be analog or digital, and an optical power detector 544 which monitors the intensity of the light emitted and controls attenuator 542 to maintain a desired illumination level during lamp operation, even if power conditions and/or lamp emission characteristics change over time. Alternatively, an RF power detector 546 connected to drive probe 526, amplifier stage 540 and control circuit 524 is used to control the attenuator 542. Additionally, circuit 524 can be used to control brightness, i.e., controlling the lamp illumination level to meet end-application requirements. Circuit 524 includes protection circuits and connects to appropriate sensing circuits to provide the functions of over-temperature shutdown, over-current shutdown, and over-voltage shutdown. Circuit 524 can also provide a low power mode in which the plasma is maintained at a very low power level, insufficient for light emission but sufficient to keep the fill mixture gas ionized. Circuit 524 also can shut down the lamp slowly by increasing the attenuation. This feature limits the thermal shock a lamp repeatedly experiences and allows the fill mixture to condense in the coolest portion of the lamp chamber, promoting easier lamp starting.

Alternatively, attenuator 542 is combined with an analog or digital control circuit to control the output power at a high level during the early part of the lamp operating cycle, in order to vaporize the fill mixture more quickly than can be achieved at normal operating power. Alternatively, attenuator 542 is combined with an analog or digital control circuit which monitors transmitted and/or reflected microwave power levels through an RF power detector and controls the attenuator to maintain the desired power level during normal lamp operation, even if the incoming power supply voltage changes due to variations in the ac supply or other loads.

Figure 17:
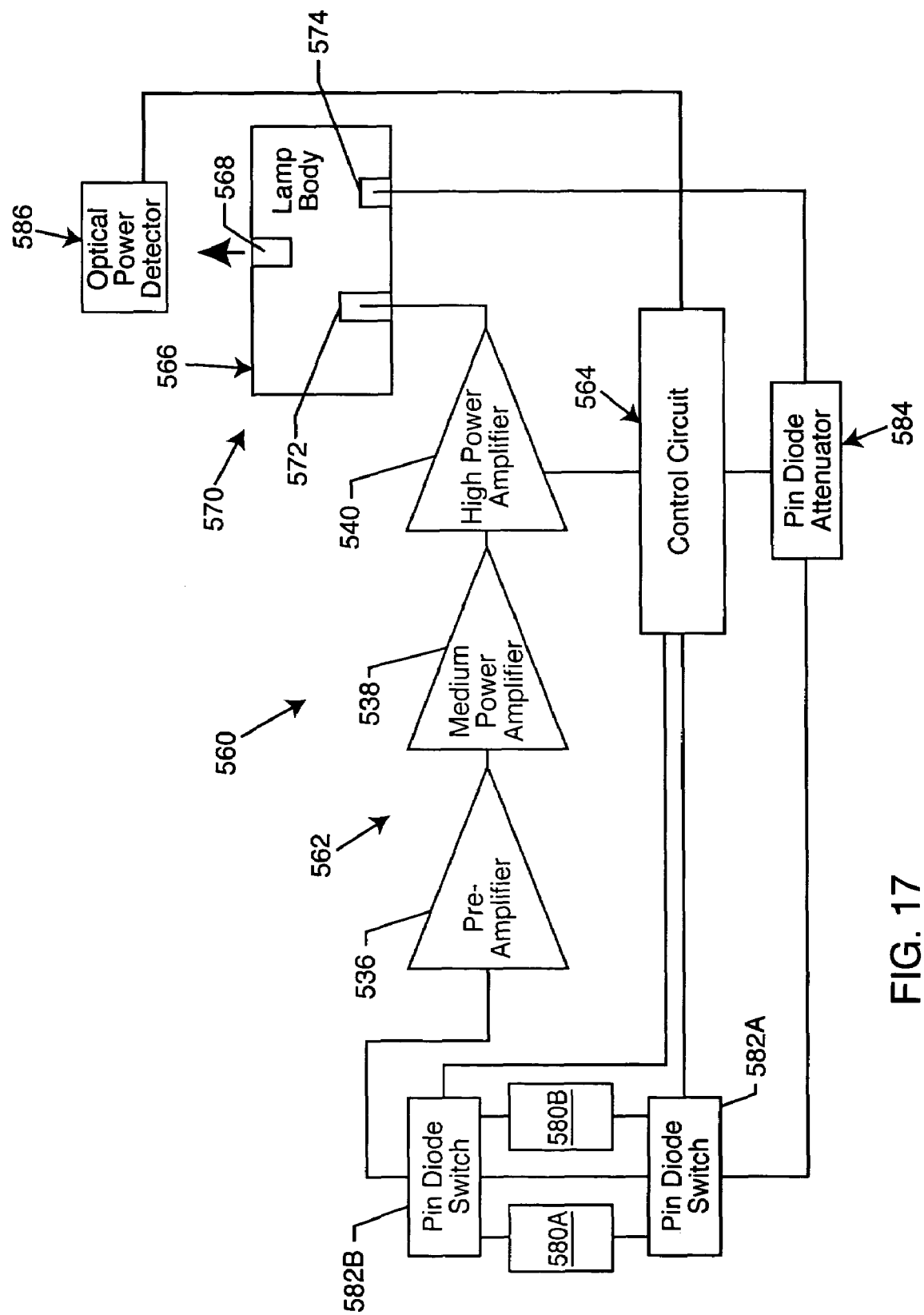
FIG. 17 is a block diagram of a second configuration of the FIGS. 11A, 11B, 15A and 15B combined amplifier and control circuit.

FIG. 17 shows an alternative circuit 560 including an amplifier 562 and a control circuit 564, suitable for supplying and controlling power to the body 566 and lamp chamber 568 of a DWIPL 570 having a drive probe 572 and feedback probe 574, such as shown in FIGS. 11A, 11B, 15A and 15B. A "starting" bandpass filter 580A and an "operating" bandpass filter 580B, in parallel and independently selectable and switchable, are in series with the FIG. 16 amplifier chain and preferably, as in FIG. 16, on the input side of the chain. Filters 580A and 580B filter out frequencies corresponding to undesired resonance modes of body 566. By selecting and switching into the circuit a suitable filter bandpass using first and second PIN diode switches 582A, 582B, the DWIPL 570 can operate only in the cavity mode corresponding to the selected frequency band, so that all of the amplifier power is directed into this mode. A pin diode attenuator 584 is connected between pin diode switch 582A and feedback probe 574. By switching in filter 580A, a preselected first cavity mode is enabled for starting the lamp. Once the fill mixture gas has ionized and the plasma begun forming, a selected second cavity mode is enabled by switching in filter 580B. For a short time, both filters provide power to the lamp to ensure that the fill mixture remains a plasma. During the period when both filters are switched in, both cavity modes propagate through body 566 and the amplifier chain. When a predetermined condition has been met, such as a fixed time delay or a minimum power level, filter 580A is switched out, so that only the cavity mode for lamp operation can propagate through the amplifier chain. Control circuit 564 selects, deselects, switches in, and switches out filters 580A and 580B, following a predetermined operating sequence. An optical power detector 586 connected to control circuit 564 performs the same function as detector 544 in the FIG. 16 embodiment.

Figure 18:
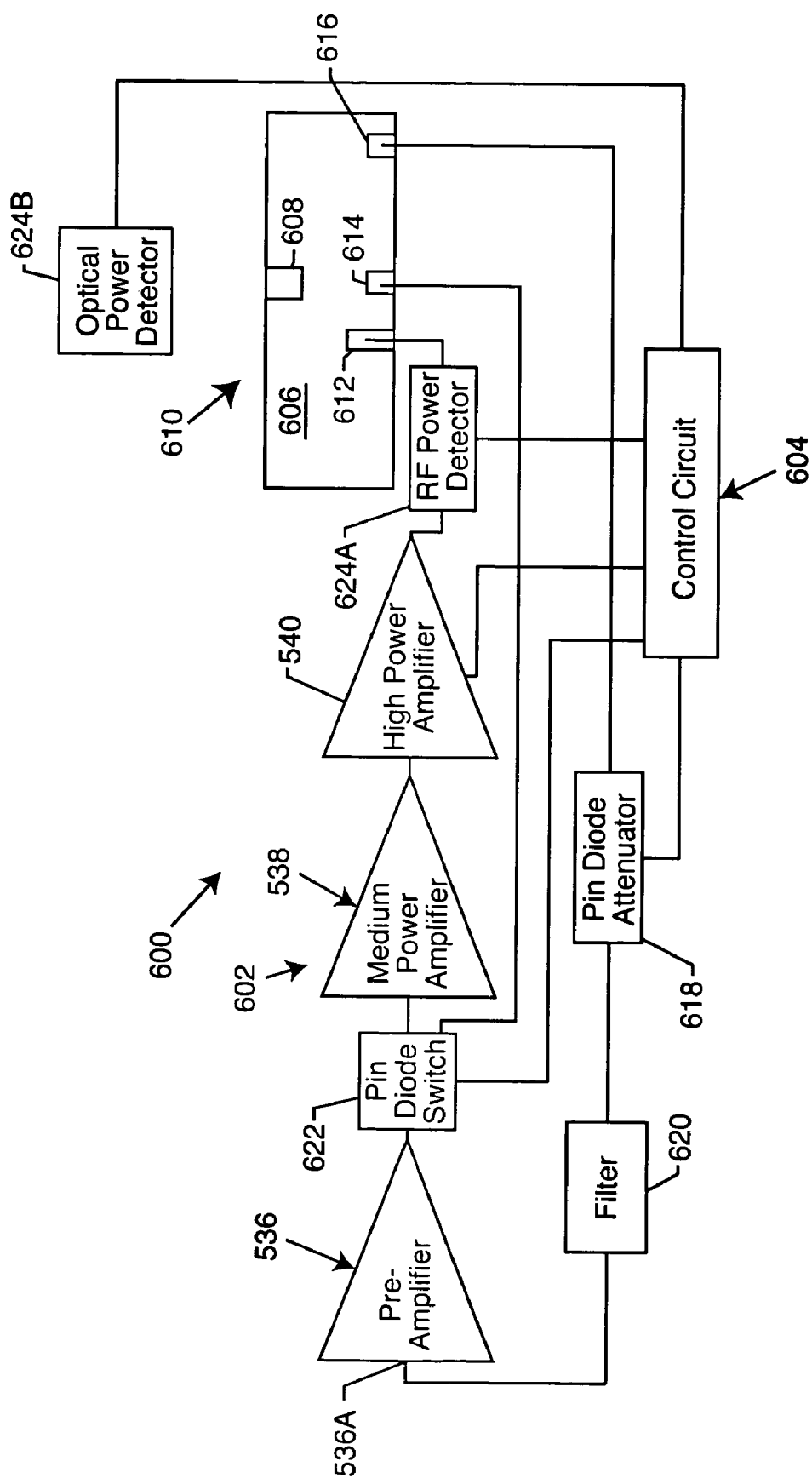
FIG. 18 is a block diagram of a configuration of the FIGS. 12, 13, 14A and 14B combined amplifier and control circuit.

FIG. 18 shows a circuit 600 including an amplifier 602 and an analog or digital control circuit 604, suitable for supplying and controlling power to the body 606 and lamp chamber 608 of a DWIPL 610 having a drive probe 612, a feedback probe 616 and a start probe 614, such as shown in FIGS. 12, 13, 14A and 14B. The feedback probe 616 is connected to input 536A of preamplifier 536 through a PIN diode attenuator 618 and a filter 620. The start probe 614 is designed to be critically coupled when lamp 610 is off. To start the lamp, a small amount of microwave power is directed into start probe 614 from preamplifier stage 536 or medium power stage 538 of the amplifier chain. The power is routed through a bipolar PIN diode switch 622 controlled by control circuit 604. Switch 622 is controlled to send RF microwave power to start probe 614 until the fill mixture gas becomes ionized. A sensor 624A monitors power usage within body 576, and/or a sensor 624B monitors light intensity indicative of gas ionization. A separate timer control circuit, which is part of control circuit 604, allocates an adequate time for gas breakdown. Once the gas has been ionized, control circuit 604 turns on switch 622 which routes microwave power to high power stage 540 which provides microwave power to drive probe 612. For a short time, start probe 614 and drive probe 612 both provide power to the lamp to ensure that the fill mixture remains a plasma. When a predetermined condition has been met, such as a fixed time period or an expected power level, control circuit 604 turns off switch 622 thereby removing power to start probe 614 so that the plasma is powered only by drive probe 612. This provides maximum efficiency.

To enhance the Q-value (i.e., the ratio of the operating frequency to the resonant frequency bandwidth) of the DWIPL 610 during starting, the control circuit 604 can bias the transistors of high power stage 540 to an impedance that minimizes leakage out of probe 612 into stage 540. To accomplish this, circuit 604 applies a dc voltage to the gates of the transistors to control them to the appropriate starting impedance.

While several embodiments for carrying out the invention have been shown and described, it will be apparent to those skilled in the art that additional modifications are possible without departing from the inventive concepts detailed herein. It is to be understood, therefore, there is no intention to limit the invention to the particular embodiments disclosed. On the contrary, it is intended that the invention cover all modifications, equivalences and alternative constructions falling within the spirit and scope of the invention as expressed in the appended claims.

What is claimed is:

1. A lamp comprising:
   a waveguide having a body, the body comprising at least one dielectric material and having at least one surface determined by a waveguide outer surface, the dielectric material having a dielectric constant greater than approximately 2;
   a power source for providing power at a frequency that resonates within the body, wherein the frequency is within the range of about 0.25 GHz to 30 GHz;
   a first probe coupled to the body to provide the power into the body from the power source at the resonant frequency;
   the body having a lamp chamber depending from said waveguide outer surface;
   a bulb containing a fill mixture which when receiving power from the resonating body forms a light-emitting plasma;
   the bulb including at least one transparent wall forming an elongate side of the bulb;
   at least a portion of the wall positioned within the lamp chamber spaced apart from the body of the waveguide, the wall positioned within the lamp chamber such that light is transmitted through the wall into the lamp chamber and from the lamp chamber out of the waveguide body.

2. The lamp of claim 1 wherein the bulb is a discrete, self-enclosed structure, comprising:
   the at least one wall consisting essentially of a dielectric material substantially transparent to visible and infrared radiation emitted by the plasma, the wall having a thickness determined by an interior surface and an exterior surface;
   a transparent bottom attached to the wall, having a thickness determined by an interior surface and an exterior surface; and
   a window having a thickness determined by a bottom surface and a top surface, the window hermetically sealed to the wall, the bottom and the window consisting essentially of said dielectric material, the window substantially transparent to visible light emitted by the plasma.

3. The lamp of claim 1, wherein the bulb bottom has a bottom in thermal contact with the lamp chamber.

4. The lamp of claim 1, wherein the wall of the bulb is coated with a thin-film, multi-layer dielectric coating.

5. The lamp of claim 1, wherein the wall of the bulb is coated with a first thin-film, multi-layer dielectric coating, and a surface of the lamp chamber is coated with a second thin-film, multi-layer dielectric coating.

6. The lamp of claim 1, wherein the space between the wall of the bulb and the surface of the lamp chamber is filled with air.

7. The lamp of claim 1, wherein the bulb is supported in the lamp chamber by a bulb support coupled to a surface of the lamp chamber.

8. The lamp of claim 1, wherein the lamp chamber is shaped to reflect the light transmitted though the wall out of the waveguide body.

9. The lamp of claim 1, wherein the wall extends at an upper end in a lip, the lip sealed to a support structure attached to an outer surface of the waveguide, the bulb extending from the support structure into the lamp chamber.

10. The lamp of claim 9, wherein the wall of the bulb is coated with a thin-film, multi-layer dielectric coating.

11. The lamp of claim 1, wherein the distance between the wall of the bulb and the surface of the lamp chamber is greater than the width of the bulb.

12. The lamp of claim 11, wherein the space between the wall of the bulb and the surface of the lamp chamber is filled with air.

13. The lamp of claim 1, wherein the distance between the wall of the bulb and the surface of the lamp chamber is greater than the thickness of the wall of the bulb.

14. The lamp of claim 13, wherein a ceramic is positioned between the wall of the bulb and the surface of the lamp chamber.

15. The lamp of claim 1, further comprising an opaque dielectric material between the wall of the bulb and the surface of the lamp chamber, the opaque dielectric material coated with a thin-film, multi-layer coating.

16. The lamp of claim 15, wherein the coating is separated from the wall of the bulb by an air gap.

17. The lamp of claim 15, wherein the coating is contiguous to the exterior surface of the wall of the bulb wall.

18. The lamp of claim 1, comprising collection optics proximate the lamp chamber for collecting the light transmitted though the wall from the lamp chamber.

19. The lamp of claim 18, wherein the lamp chamber is shaped to reflect the light transmitted though the wall out of the waveguide body.

20. The lamp of claim 1, wherein a dielectric material is positioned between the wall of the bulb and the surface of the lamp chamber.

21. The lamp of claim 20, wherein the dielectric material forms a sleeve around the bulb.

22. The lamp of claim 20, wherein the dielectric material comprises ceramic.

23. The lamp of claim 20, wherein the dielectric material comprises alumina-oxide.

24. The lamp of claim 20, wherein the dielectric material is coated with a thin-film, multi-layer dielectric coating.

25. The lamp of claim 1, wherein the lamp chamber has a surface that tapers symmetrically and has a shape configured to direct light received from the bulb out of the lamp chamber.

26. The lamp of claim 25, wherein the surface of the lamp chamber is coated with a thin-film, multi-layer dielectric coating.

27. The lamp of claim 25, wherein the shape of the lamp chamber provides a ray divergence with a limited numerical aperture.

28. The lamp of claim 25, wherein the shape of the lamp chamber provides a parallel ray divergence.

29. The lamp of claim 25, wherein the shape of the lamp chamber is selected to satisfy ray divergence specifications of an optical system.

30. The lamp of claim 25, wherein the shape of the surface of the lamp chamber approximates a shape selected from the group consisting of ellipsoids and paraboloids.

31. The lamp of claim 30, wherein the surface of the lamp chamber is coated with a thin-film, multi-layer dielectric coating.

32. The lamp of claim 30, wherein the surface of the lamp chamber is coated with a first thin-film, multi-layer dielectric coating, and the wall of the bulb is coated with a second thin-film, multi-layer dielectric coating.

* * * * *